US012656819B2

(12) United States Patent
Cha

(10) Patent No.: US 12,656,819 B2
(45) Date of Patent: Jun. 16, 2026

(54) FOLDABLE DISPLAY APPARATUS INCLUDING BOTTOM PLATE AND HEAT DISSIPATION

(71) Applicant: LG DISPLAY CO., LTD., Seoul (KR)

(72) Inventor: Jongseok Cha, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 316 days.

(21) Appl. No.: 18/540,157

(22) Filed: Dec. 14, 2023

(65) Prior Publication Data

US 2024/0219964 A1     Jul. 4, 2024

(30) Foreign Application Priority Data

Dec. 30, 2022     (KR) ........................ 10-2022-0190198

(51) Int. Cl.
  *G06F 1/16*       (2006.01)
  *F16C 11/04*      (2006.01)
  *H04M 1/02*       (2006.01)

(52) U.S. Cl.
  CPC ............ *G06F 1/1641* (2013.01); *F16C 11/04* (2013.01); *G06F 1/1681* (2013.01); *H04M 1/0216* (2013.01)

(58) Field of Classification Search
  CPC ...... G06F 1/203; G06F 1/1681; G06F 1/1652; G06F 1/1641; G06F 1/1637; G06F 1/1618; H05K 7/20954; H04M 1/0268; H04M 1/0237; H04M 1/022; H04M 1/0216
  See application file for complete search history.

(56) References Cited

U.S. PATENT DOCUMENTS

| | | | | |
|---|---|---|---|---|
| 2009/0213292 A1* | 8/2009 | Park | ........................ | H10K 59/87 349/58 |
| 2014/0217382 A1* | 8/2014 | Kwon | ................ | H10K 50/8426 257/40 |
| 2014/0307396 A1* | 10/2014 | Lee | ................... | G02F 1/133305 29/830 |
| 2017/0263891 A1* | 9/2017 | Oh | ......................... | H01L 25/18 |
| 2018/0178493 A1 | 6/2018 | Fujioka et al. | | |
| 2019/0369668 A1 | 12/2019 | Kim et al. | | |
| 2019/0393433 A1 | 12/2019 | Dagn et al. | | |

(Continued)

FOREIGN PATENT DOCUMENTS

| | | |
|---|---|---|
| CN | 108712535 A | 10/2018 |
| CN | 113287079 A | 8/2021 |

(Continued)

OTHER PUBLICATIONS

Partial Search Report dated May 21, 2024 issued by the European Patent Office in prosecuting the corresponding EP application No. 23218541.3.

(Continued)

*Primary Examiner* — Abhishek M Rathod

(74) *Attorney, Agent, or Firm* — Morgan, Lewis & Bockius LLP

(57)     ABSTRACT

The disclosure provides a foldable display apparatus. The foldable display apparatus is capable of folding or unfolding. According to the disclosure, the foldable display apparatus includes a bottom plate that may include a first part having a first height and a second part having a second height; an up-down plate having a length in an axial direction; and a roller assembly including a roller and a roller stopper.

18 Claims, 35 Drawing Sheets

(56)     References Cited

U.S. PATENT DOCUMENTS

| | | |
|---|---|---|
| 2020/0221587 A1 | 7/2020 | An |
| 2020/0348732 A1 | 11/2020 | Kang et al. |
| 2021/0116964 A1 | 4/2021 | Moon et al. |
| 2021/0257518 A1* | 8/2021 | Suh .................... H10H 29/142 |
| 2022/0061170 A1* | 2/2022 | Kim ................... H04M 1/0268 |
| 2022/0061195 A1* | 2/2022 | Lee ...................... H05K 1/189 |
| 2022/0337684 A1 | 10/2022 | Park et al. |
| 2022/0374058 A1 | 11/2022 | Kim et al. |
| 2023/0171931 A1* | 6/2023 | Qian .................... H05K 1/189 |
| | | 361/679.01 |

FOREIGN PATENT DOCUMENTS

| | | |
|---|---|---|
| JP | H03-105880 U | 11/1991 |
| JP | 2013-174692 A | 9/2013 |
| JP | 2018-105909 A | 7/2018 |
| JP | 2019-211778 A | 12/2019 |
| JP | 2022-531211 A | 7/2022 |
| JP | 2022-535202 A | 8/2022 |
| KR | 10-2022-0056483 A | 5/2022 |

OTHER PUBLICATIONS

Office Action dated Nov. 26, 2024 issued in with corresponding to Japanese Patent Application No. 2023-220352.

* cited by examiner

FOLDABLE DISPLAY APPARATUS INCLUDING BOTTOM PLATE AND HEAT DISSIPATION

CROSS REFERENCE TO RELATED APPLICATION

The present application claims priority benefit to Korean Patent Application No. 10-2022-0190198 filed on Dec. 30, 2022, the entire contents of which are hereby expressly incorporated herein for all purposes.

BACKGROUND

Technical Field

This disclosure relates to a display apparatus, more particularly, for example, without limitation, to a foldable display apparatus capable of folding or unfolding a display apparatus.

Discussion of the Related Art

Display apparatuses are gradually miniaturized in order to satisfy consumers' purchase needs. Miniaturization of the display apparatus can strengthen design features, enhance portability, and show high technology of the display apparatus, so many manufacturers are making efforts for the miniaturization.

In particular, recently, a so-called foldable display apparatus capable of folding or unfolding a display apparatus that has been folded in reverse has been developed. The foldable display apparatus can be folded or unfolded based on a hinge device. The foldable display apparatus is applied to a small display apparatus such as a smart phone and is also applied to a medium display apparatus such as a tablet PC or a laptop computer.

The description provided in the description of the related art section should not be assumed to be prior art merely because it is mentioned in or associated with the description of the related art section. The description of the related art section may include information that describes one or more aspects of the subject technology, and the description in this section does not limit the invention.

SUMMARY

The inventors have recognized requirements on the performances of the foldable display apparatus described above and limitations on improving folding wrinkles.

Accordingly, embodiments of the present disclosure are directed to a foldable display apparatus that substantially obviates one or more of the problems due to limitations and disadvantages of the related art.

An aspect of the present disclosure is to provide a foldable display apparatus including a hinge device.

An aspect of the present disclosure is to provide a fastening structure of a hinge and peripheral components.

An aspect of the present disclosure is to provide a foldable display apparatus that eliminates folding wrinkles.

An aspect of the present disclosure is to provide a foldable display apparatus that is rigid in an in-folding state.

An aspect of the present disclosure is to provide a foldable display apparatus capable of blocking heat generated from an integrated circuit from being transferred to a panel.

An aspect of the present disclosure is to provide a display apparatus with reduced thickness.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a foldable display apparatus comprises: a panel assembly including a panel including a first display area, a second display area, and a folding area, and one or more plates disposed on a lower portion of the panel; an in-folding hinge assembly that is disposed in the folding area under the panel assembly and includes a hinge cover; and first and second cover frames that are coupled to the in-folding hinge assembly, wherein the one or more plates include a bottom plate, the bottom plate includes a first part having a first height and a second part having a second height lower than the first height.

According to the present disclosure, an up-down plate that ascends and descends according to folding and unfolding operations of a foldable display apparatus is provided. The folding wrinkles that may occur in the panel when folding is repeated by the up-down plate can be resolved.

According to the present disclosure, a roller assembly that presses a hinge device using a roller in an unfolding state of a foldable display apparatus is provided. The unfolding state can be firmly maintained by the roller assembly.

According to the present disclosure, a coupling structure of various components included in a hinge device is provided. Due to the coupling structure of various components, miniaturization and rigidity of the hinge device can be achieved.

According to the present disclosure, a bottom plate may include a first part and a second part. An integrated circuit is disposed on the lower portion of the second part, and a heat dissipation sheet is disposed in the second part. Accordingly, heat generated by the integrated circuit may be prevented from being transferred to the panel.

According to the present disclosure, the first part and the second part are different in height from each other. A heat dissipation sheet is disposed in the accommodation space formed by the different heights. Accordingly, the heat dissipation sheet can be disposed without reducing the thickness of the display apparatus.

According to the present disclosure, a vertical wall is disposed in the second part. The rigidity may be lowered by the reduced height of the bottom plate, and the rigidity may be supplemented by the vertical wall.

According to the present disclosure, a heat dissipation sheet includes a first adhesive surface and second adhesive surface surrounding a heat dissipation material. When the heat dissipation material is a graphite material including dust, foreign matter due to dust may be prevented.

According to the present disclosure, the second adhesive surface may be in contact with a plurality of heat dissipation materials. Since the second adhesive surface is integrally formed, deterioration in heat dissipation function that may occur when the heat dissipation material is divided into a plurality of pieces may be prevented.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

Figure 1:
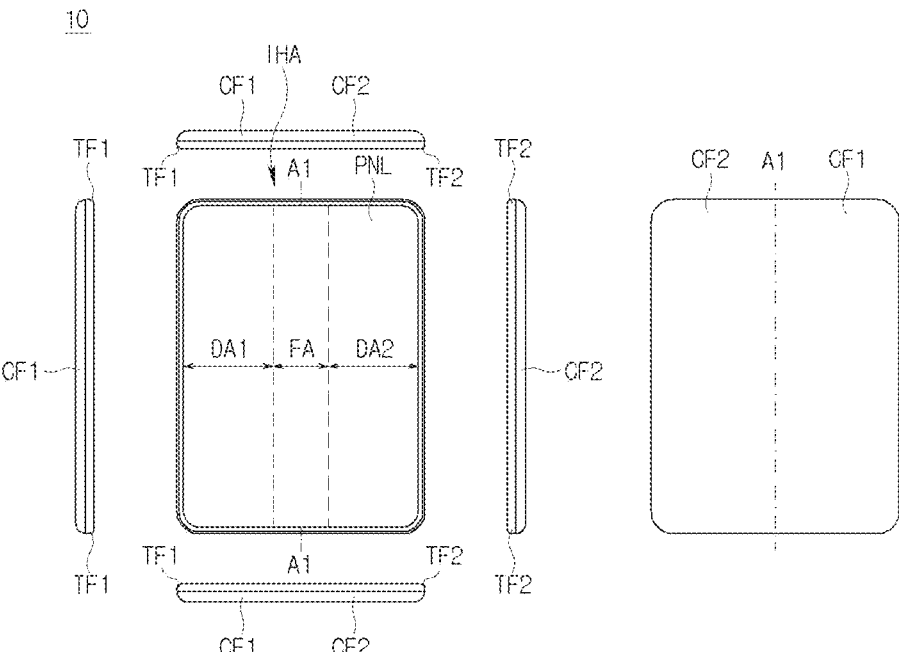
FIG. 1 is a view illustrating an unfolding state of a display apparatus 10 according to various exemplary embodiments of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and convenience.

DETAILED DESCRIPTION

Advantages and features of this disclosure and methods of accomplishing the same may be understood more readily by reference to the detailed description of embodiments that will be made hereinafter with reference to the accompanying drawings. This disclosure may, however, be embodied in many different forms and should not be construed as being limited to the exemplary embodiments set forth herein; rather, these exemplary embodiments are provided so that this disclosure will be thorough and complete and will fully convey the concept of the invention to those skilled in the art, and the present invention will only be defined by the appended claims.

The shapes, sizes, ratios, angles, numbers and the like illustrated in the drawings to describe embodiments of this disclosure are merely exemplary, and thus, the disclosure is not limited thereto. Throughout the specification, the same reference numerals refer to the same components. In addition, detailed descriptions of well-known technologies may be omitted in the disclosure to avoid obscuring the subject matter of the disclosure. When terms such as "include," "have," "comprise," "contain," "constitute," "make up of," "formed of," and "consist of" are used in this specification, it should be understood that unless "only" is specifically used, additional elements can be included. Unless otherwise explicitly stated, when a component is expressed in the singular form, it is intended to encompass the plural form as well.

In interpreting the elements, it is construed to include a margin of error or tolerance even in the absence of explicit description.

When describing the positional relationship, for example, when the relationship between two parts is described as "on", "above", "over", "below", "under", "beside", "beneath", "near", "close to," "adjacent to", "on a side of", "next" or the like, unless "directly" or "immediately" is used, one or more other parts may be located between the two parts.

Spatially relative terms, such as "under," "below," "beneath", "lower," "over," "upper" and the like, may be used herein for ease of description to describe one element or feature's relationship to another element (s) or feature (s) as illustrated in the figures. It will be understood that the spatially relative terms can encompass different orientations of an element in use or operation in addition to the orientation depicted in the figures. For example, if an element in the figures is inverted, elements described as "below" or "beneath" other elements or features would then be oriented "over" the other elements or features. Thus, the exemplary term "below" can encompass both an orientation of below and above. Similarly, the exemplary term "above" or "over" can encompass both an orientation of "above" and "below".

In describing a time relationship, for example, when the temporal order is described as 'after˜,' 'subsequent˜,' 'next˜,' "following," 'before˜,' and the like a case which is not continuous may be included unless 'just' or 'directly' is used.

Although the terms "first", "second", "A", "B", "(a)", "(b)" and the like are used to describe various components, these components are not limited by these terms. These terms are merely used for distinguishing one component from the other components. Therefore, the first component mentioned hereinafter may be the second component in the technical sense of the disclosure.

In addition, terms, such as first, second, A, B, (a), (b), or the like may be used herein when describing components of the present disclosure. Each of these terminologies is not used to define an essence, order, or sequence of a corresponding component but used merely to distinguish the corresponding component from other components. In the case that it is described that a certain structural element or layer is "connected", "coupled", "adhered" or "joined" to another structural element or layer, it is typically interpreted that another structural element or layer may be "connected", "coupled", "adhered" or "joined" to the structural element or layer directly or indirectly.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

A term "apparatus" used herein may refer to a display apparatus including a display panel and a driver for driving the display panel. Examples of the display apparatus may include a light emitting device, and the like. In addition, examples of the apparatus may include a notebook computer, a television, a computer monitor, an automotive device, a wearable device, and an automotive equipment device, and a set electronic device (or apparatus) or a set device (or apparatus), for example, a mobile electronic device such as a smartphone or an electronic pad, which are complete products or final products respectively including the light emitting device and the like, but embodiments of the present disclosure are not limited thereto.

Like reference numerals generally denote like elements throughout the specification.

A size and a thickness of each component illustrated in the drawing are illustrated for convenience of description, and the present disclosure is not limited to the size and the thickness of the component illustrated.

The respective features of various embodiments of the disclosure may be partially or overall coupled to or combined with each other, and may be variously inter-operated with each other and driven technically. The embodiments of the disclosure may be carried out independently from each other, or may be carried out together in co-dependent relationship.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein.

Hereinafter, a display apparatus according to exemplary embodiments of the present disclosure will be described with reference to the accompanying drawings.

Figure 2:
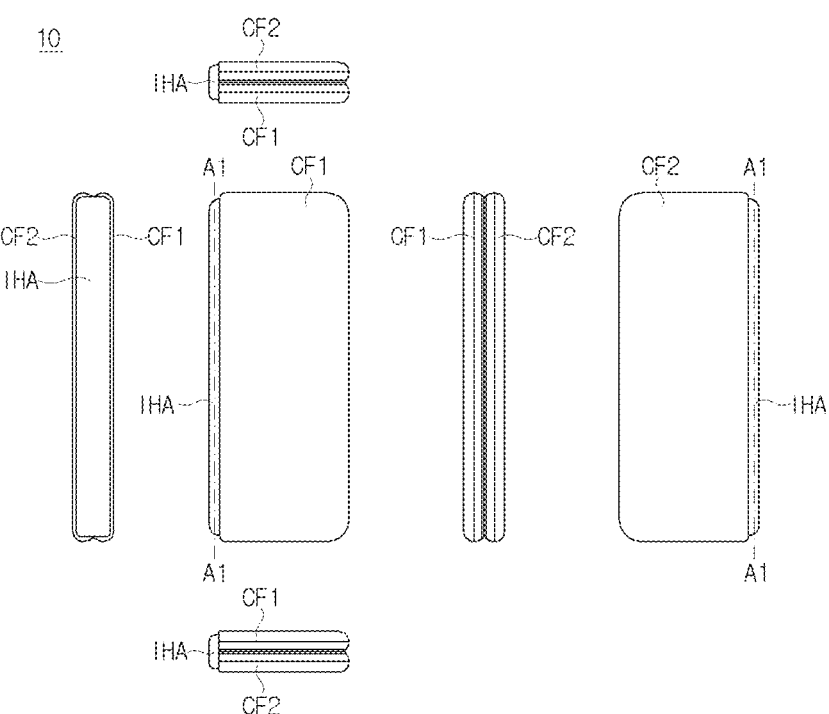
FIG. 2 is a view illustrating a folding state of a display apparatus 10 according to various exemplary embodiments of the present disclosure.

1—FIG. 1 is a view illustrating an unfolding state of a display apparatus 10 according to various embodiments of the present disclosure. FIG. 2 is a view illustrating a folding state of the display apparatus 10 according to various exemplary embodiments of the present disclosure. All the components of each display apparatus according to all embodiments of the present disclosure are operatively coupled and configured.

Referring to FIG. 1, the front, upper, lower, right, left, and rear surfaces of the display apparatus 10 in an unfolding state are illustrated. Referring to FIG. 2, the front, upper, lower, right, left, and rear surfaces of the display apparatus 10 in a folding state are illustrated.

Referring to FIG. 1, the display apparatus 10 includes a panel PNL including a first display area DA1, a second display area DA2, and a folding area FA. The panel PNL is integrally formed to display an image over the first display area DA1, the second display area DA2, and the folding area FA.

The display apparatus 10 includes an in-folding hinge assembly IHA that can rotate in an in-folding manner based on a folding axis A1. The in-folding hinge assembly IHA may not be substantially observed from the front and rear surfaces of the display apparatus 10 in an unfolding state. This is because the in-folding hinge assembly IHA is disposed on the rear side of the display apparatus 10 and is covered by a cover frame CF.

The in-folding hinge assembly IHA may have a shape elongated along the folding axis A1. The in-folding hinge assembly IHA may be disposed within the folding area FA. The folding area FA is an area where the panel PNL is folded by the in-folding hinge assembly IHA. However, present disclosure is not limited thereto, other connection manner is possible in addition to the in-folding hinge assembly IHA, as long as the first display area DA1 and the second display area DA2 are areas can be connected and folded/unfolded. The first display area DA1 and the second display area DA2 are areas symmetrical to each other with respect to the folding area FA. The first display area DA1 is an area positioned on one side of the folding axis A1, and the second display area DA2 is an area positioned on the other side of the folding axis A1. As shown in FIG. 1, the first display area DA1 is positioned on left side of the folding axis A1, and the second display area DA2 is positioned on right side of the folding axis A1, but the embodiments of the present disclosure are not limited thereto. For example, the first display area DA1 may be positioned on upper side of the folding axis A1, and the second display area DA2 may be positioned on lower side of the folding axis A1.

Figure 3:
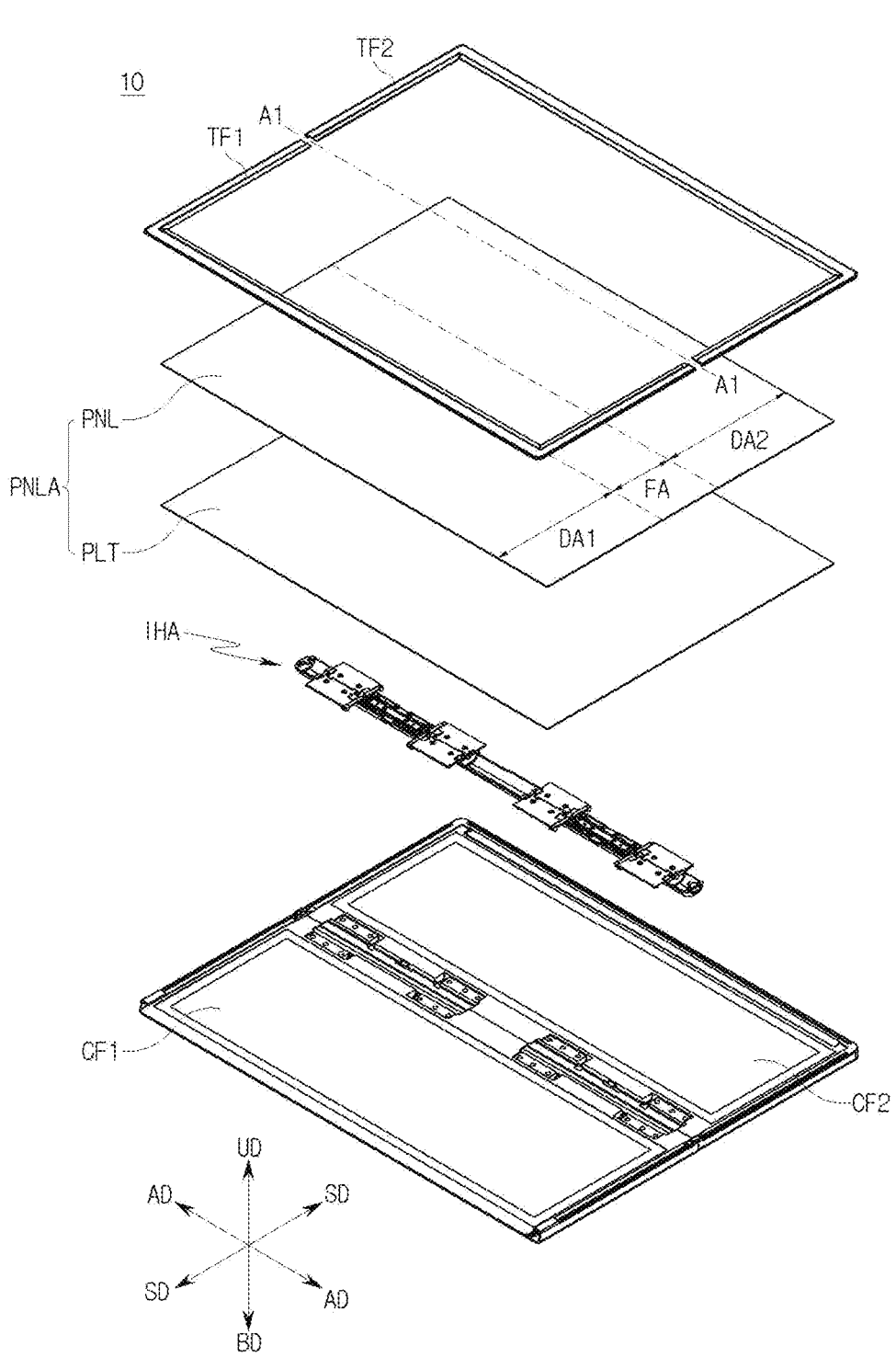
FIG. 3 is an exploded perspective view of a display apparatus 10 according to various exemplary embodiments of the present disclosure.

A top frame TF may be disposed on the front surface of the display apparatus 10. The top frame TF may be disposed to cover an edge of the panel PNL. The front surface of the display apparatus 10 refers to a surface on which an image is displayed by the panel PNL. Since the display apparatus 10 is folded based on the folding axis A1, the top frame TF may include two top frames TF1 and TF2 physically separated from each other. The top frame TF includes a first top frame TF1 disposed on one side of the folding axis A1 and a second top frame TF2 disposed on the other side of the folding axis A1. A height from the rear surface to top frame TF of the display apparatus 10 may be greater than or substantially the same as a thickness to the panel PNL. Therefore, when observed from the side, the panel PNL may not be visible. The first top frame TF1 and the second top frame TF2 are as illustrated in FIG. 3, the first top frame TF1 corresponds to one portion of the folding area FA and the first display area DA1, and the second top frame TF2 corresponds to the other portion of the folding area FA and the second display area DA2, but the embodiments of the present disclosure are not limited thereto.

The side and rear surfaces of the display apparatus 10 may be covered by the cover frame CF. The rear surface of the display apparatus 10 is a surface opposite to the front surface, and the side surface refers to a surface between the front and rear surfaces. Since the display apparatus 10 is folded based on the folding axis A1, the cover frame CF may include two cover frames CF1 and CF2 physically separated from each other. The cover frame CF includes a first cover frame CF1 disposed on one side of the folding axis A1 and a second cover frame CF2 disposed on the other side of the folding axis A1. The first cover frame CF1 and the second cover frame CF2 are as illustrated in FIG. 3, the first cover frame CF1 corresponds to one portion of the folding area FA and the first display area DA1, and the second cover frame CF2 corresponds to the other portion of the folding area FA and the second display area DA2, but the embodiments of the present disclosure are not limited thereto.

The in-folding hinge assembly IHA is disposed close to the rear surface of the display apparatus 10 and is disposed along the folding axis A1. The in-folding hinge assembly IHA may be disposed to be covered by the cover frames CF1 and CF2 in an unfolding state. In the unfolding state, the in-folding hinge assembly IHA of the display apparatus 10 may be disposed not to be visible from the outside. Alternatively, in the unfolding state, only a minimum portion of the in-folding hinge assembly IHA of the display apparatus 10 may be visible from the outside.

Although not illustrated, a camera module capable of capturing images may be disposed on the front, rear, and/or side surfaces of the display apparatus 10. In addition, buttons capable of controlling functions of the display apparatus 10 or components capable of performing functions may be disposed on the front, rear, and/or side surfaces of the display apparatus. For example, a volume button, a power button, a mode conversion button, a speaker, a microphone, an antenna, a flash, and the like may be disposed, and the embodiments of the present disclosure are not limited thereto.

Although not illustrated, the display apparatus 10 may include sensors that sense an operating state or an external environment. For example, the display apparatus 10 may include a gesture sensor, a grip sensor, a color sensor, an infrared sensor, an illuminance sensor, an ultrasonic sensor, an iris recognition sensor, a distance detection sensor, a LiDAR sensor, and the like, and the embodiments of the present disclosure are not limited thereto.

Although not illustrated, the display apparatus 10 may include connectors capable of receiving external signals. For example, the display apparatus 10 may include a charging connector, a USB connector, an earphone jack connector, and the like, and the embodiments of the present disclosure are not limited thereto.

Referring to FIG. 2, when the display apparatus 10 is folded, the panel PNL is folded so that the first display area DA1 and the second display area DA2 face each other with respect to the folding axis A1. The in-folding hinge assembly IHA may be exposed to the outside as the cover frames CF1 and CF2 are rotated and folded.

In the folding state, the panel PNL is not visible from the outside. Only the cover frames CF1 and CF2 and in-folding hinge assembly IHA of the display apparatus 10 are visible from the outside.

According to various embodiments, the cover frames CF1 and CF2 are not limited to the shapes and combinations illustrated in FIGS. 1 and 2, and may be implemented in other shapes or in combination with parts. According to an exemplary embodiment, the first cover frame CF1 and the second cover frame CF2 may be disposed on both sides of the folding axis A1 and have a generally symmetrical shape with respect to the folding axis A1, but the embodiments of the present disclosure are not limited thereto. According to some embodiments, the first cover frame CF1 and the second cover frame CF2 may be asymmetrically disposed with respect to the folding axis A1 and have an asymmetrical shape. According to some embodiments, an angle or distance formed between the first cover frame CF1 and the second cover frame CF2 may vary according to the folding state, unfolding state, and intermediate state of the display apparatus 10. According to an exemplary embodiment, each of the first cover frame CF1 and the second cover frame CF2 may be physically separated into a frame covering only the rear surface of the display apparatus 10 and a frame covering only the side surface of the display apparatus 10, but the embodiments of the present disclosure are not limited thereto, for example, each of the first cover frame CF1 and the second cover frame CF2 may be formed integrally, that is, a frame covering the rear surface of the display apparatus 10 and a frame covering the side surface of the display apparatus 10 may be formed integrally.

According to various embodiments, the first cover frame CF1 and the second cover frame CF2 may form an inner accommodation space through structural coupling. The in-folding hinge assembly IHA and the panel PNL may be accommodated in the inner accommodation space.

According to various embodiments, components for driving the display apparatus 10 may be disposed in the inner accommodation space. For example, a battery, a control printed circuit board, a flat cable, a flexible printed circuit board, and the like may be disposed in the inner accommodation space.

According to various embodiments, the size of the portion exposed to the outside of the in-folding hinge assembly IHA may be different according to the folding angle of the display apparatus 10. For example, in the case where the display apparatus 10 is in a folding state, a large portion of the in-folding hinge assembly IHA may be exposed between the first cover frame CF1 and the second cover frame CF2. In the case where the display apparatus 10 is in an unfolding state, the in-folding hinge assembly IHA may be substantially covered by the first cover frame CF1 and the second cover frame CF2. In the case where the display apparatus 10 is in an intermediate state between the folding state and the unfolding state, a relatively small portion of the in-folding hinge assembly IHA may be exposed between the first cover frame CF1 and the second cover frame CF2.

According to various embodiments, in the case where the display apparatus 10 is in an unfolding state, an angle formed between the first cover frame CF1 and the second cover frame CF2 may be or substantially be 180 degrees. Accordingly, an angle formed between the first display area DA1 and the second display area DA2 may be or substantially be 180 degrees. Thus, the panel PNL may be completely flat.

According to various embodiments, in the case where the display apparatus 10 is in an intermediate state between a folding state and an unfolding state, folding may be stopped at any folding angle. This may be referred to as a so-called free stop. For example, folding may be freely stopped at folding angle such as 30°, 50°, 90°, 120°, 150° and the like, and the embodiments of the present disclosure are not limited thereto.

According to various embodiments, the cover frame CF and the top frame TF may be formed of glass or polymer. The cover frame CF and the top frame TF may be transparent or opaque. For example, the cover frame CF and the top frame TF may be formed of coated or colored glass, ceramic, polymer, aluminum, stainless steel, magnesium, or a combination thereof. when the cover frame CF and the top frame TF is formed of a polymer, the polymer may be made of any one of polyimide (PI), polyethylene terephthalate (PET), acrylonitrile-butadiene-styrene copolymer (ABS), polymethyl methacrylate (PMMA), polyethylene naphthalate (PEN), polycarbonate (PC), polyethersulfone (PES), polyarylate (PAR), polysulfone (PSF), cyclic olefin copolymer (COC), triacetylcellulose (TAC), polyvinyl alcohol (PVA), polystyrene (PS) and the like, and the present disclosure is not limited thereto.

FIG. 3 is an exploded perspective view of a display apparatus 10 according to various exemplary embodiments of the present disclosure.

In the present disclosure, a direction along the folding axis A1 in which the display apparatus 10 is folded is defined as an axial direction AD. A direction starting from the first display area DA1 and passing through the folding area FA and arriving at the second display area DA2 in the display apparatus 10 is defined as a side direction SD. A direction in which the panel PNL of the display apparatus 10 faces is defined as an upward direction UD. A direction opposite to the upward direction UD is defined as a downward direction BD.

The top frame TF is disposed at the top of the display apparatus 10 in the upward direction UD. The top frame TF includes a first top frame TF1 disposed on one side and a second top frame TF2 disposed on the other side, based on the folding axis A1. The top frame TF is disposed to cover the edge of the panel PNL. The top frame TF may protect the panel PNL from external impact. The top frame TF may form a bezel of the display apparatus 10.

A panel assembly PNLA is disposed on the lower portion of the top frame TF. The panel assembly PNLA includes a panel PNL and one or more plates PLTs. The panel PNL may include a flexible substrate, a circuit element layer disposed on the flexible substrate and including transistors, a light emitting layer disposed on the circuit element layer and including light emitting elements, an encapsulation layer disposed on the light emitting layer, a touch layer disposed on the encapsulation layer or disposed inside the encapsulation layer, a polarizer to reduce reflective visibility on the front surface, a cover glass disposed on the upper portion of the touch layer, and the like. The panel PNL may include a first display area DA1, a folding area FA, and a second display area DA2. One or more plates PLTs may include various plates disposed on the lower portion of the panel PNL to support the panel PNL. For example, the one or more plates may include a back plate to support the panel PNL, a top plate disposed on the lower portion of the back plate and formed of a SUS material, a bottom plate disposed on the lower portion of the top plate, formed with a pattern on a folding portion and formed of a SUS material, a heat dissipation sheet with heat dissipation function, a middle plate to cover non-leveled planes due to various configurations of the hinge assembly, and the like.

A display element and various driving elements for driving the display element may be disposed in the first display area DA1 and the second display area DA2 of the panel PNL. For example, when the display apparatus 10 is an organic light emitting display apparatus, the display element may be configured by a light emitting diode including a first electrode, an organic layer, and a second electrode. Further, various driving elements for driving the display element, such as transistors, capacitors, or wiring lines may be disposed in the first display area DA1 and the second display area DA2. For example, the transistors may include switching transistors and driving transistors, the active layer of the switching transistor and the driving transistor may be formed of an oxide semiconductor material, an amorphous semiconductor material, a polycrystalline semiconductor material, or an organic semiconductor material, but the present disclosure is not limited thereto.

The oxide semiconductor material may have an excellent effect of preventing a leakage current and relatively inexpensive manufacturing cost. The oxide semiconductor may be made of a metal oxide such as zinc (Zn), indium (In), gallium (Ga), tin (Sn), and titanium (Ti) or a combination of a metal such as zinc (Zn), indium (In), gallium (Ga), tin (Sn), or titanium (Ti) and its oxide. Specifically, the oxide semiconductor may include zinc oxide (ZnO), zinc-tin oxide (ZTO), zinc-indium oxide (ZIO), indium oxide (InO), titanium oxide (TiO), indium-gallium-zinc oxide (IGZO), indium-zinc-tin oxide (IZTO), indium zinc oxide (IZO), indium gallium tin oxide (IGTO), and indium gallium oxide (IGO), but is not limited thereto.

The polycrystalline semiconductor material has a fast movement speed of carriers such as electrons and holes and thus has high mobility, and has low energy power consumption and superior reliability. The polycrystalline semiconductor may be made of polycrystalline silicon (poly-Si), but is not limited thereto.

The amorphous semiconductor material may be made of amorphous silicon (a-Si), but is not limited thereto.

The organic semiconductor material may include metal-organic compounds, but is not limited thereto.

The transistors may be thin film transistors TFTs.

Further, Pixels PX for displaying images may be disposed in the first display area DA1 and the second display area DA2 of the panel PNL. Also, a plurality of gate lines GL and a plurality of data lines DL may be disposed in the first display area DA1 and the second display area DA2 of the panel PNL.

The in-folding hinge assembly IHA is disposed on the lower portion of the panel assembly PNLA. The in-folding hinge assembly IHA is disposed on the lower portion of the folding area FA. The in-folding hinge assembly IHA may have a long shape along the axial direction AD. The in-folding hinge assembly IHA may perform a folding operation in which one side and the other side rotate with respect to the folding axis A1. A detailed description of the in-folding hinge assembly (IHA) will be described later with reference to FIGS. 4A, 4B, 4C, and 4D and the like.

The cover frame CF is disposed on the lower portion of the in-folding hinge assembly IHA. An accommodation groove in which a portion of the in-folding hinge assembly IHA may be seated may be formed on the upper surface of the cover frame CF. The cover frame CF includes the first cover frame CF1 disposed on one side and the second cover frame CF2 disposed on the other side, based on the folding axis A1. The cover frame CF may be a housing defining side and rear surfaces of the display apparatus 10. The cover frame CF may protect the display apparatus 10 from external impact. The cover frame CF may be coupled to the in-folding hinge assembly IHA. For example, the first cover frame CF1 may be coupled to the lever wing HM-1 (see FIG. 5A) of the in-folding hinge assembly IHA. The second cover frame CF2 may be coupled to the other lever wing HM-1 (see FIG. 5A). A pair of lever wings HM-1 may rotate on the basis of axes symmetrical to each other with respect to the folding axis A1. According to the rotation operation of the lever wings HM-1, the cover frames CF1 and CF2 connected to the lever wings may be rotated. Depending on the rotation of the cover frames CF1 and CF2, the folding and unfolding of the display apparatus 10 may be implemented.

Figure 4A:
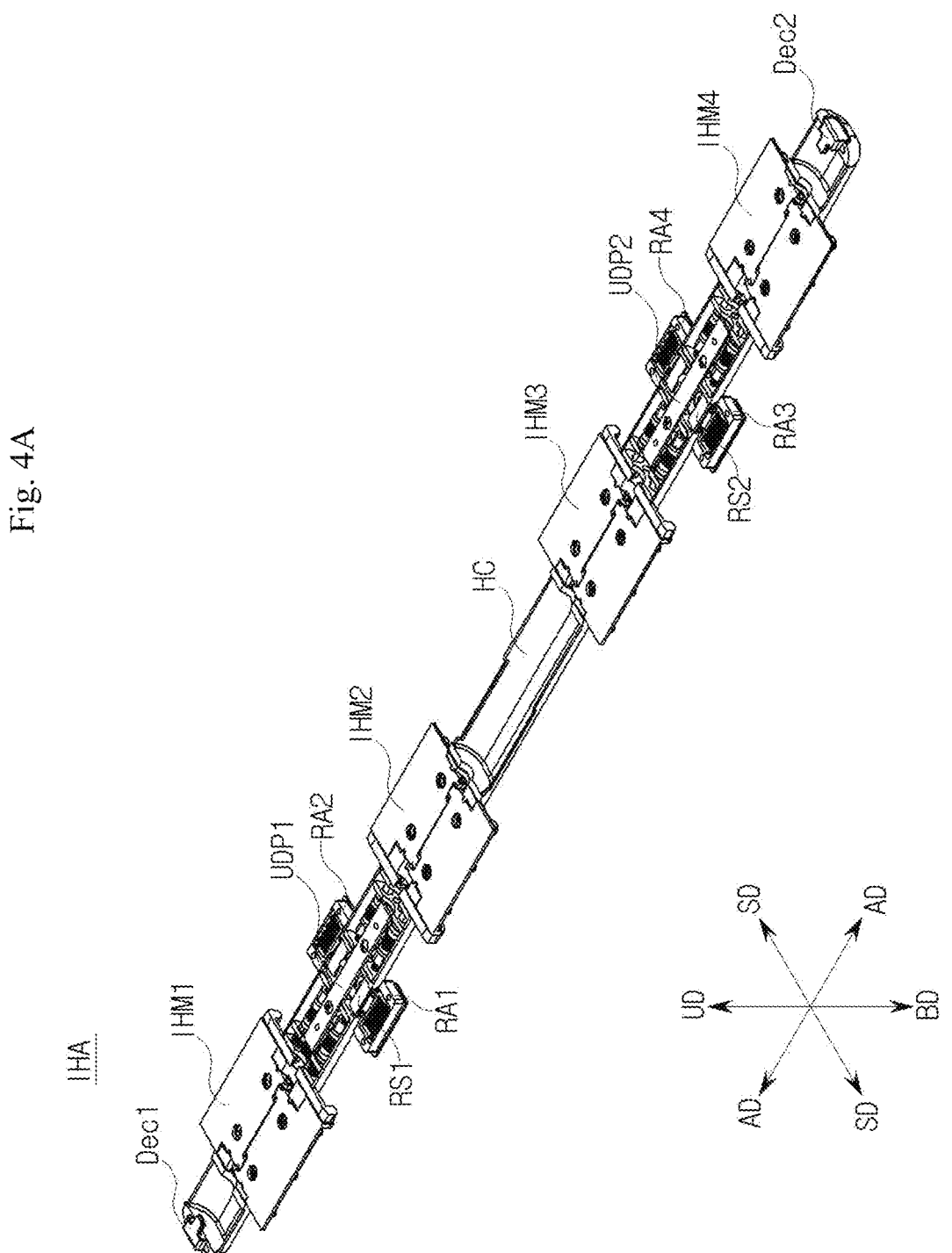
FIG. 4A is a perspective view of an in-folding hinge assembly IHA viewed from a top surface according to an exemplary embodiment of the present disclosure.

FIG. 4A is a perspective view of an in-folding hinge assembly IHA viewed from a top surface according to an exemplary embodiment of the present disclosure.

Figure 4B:
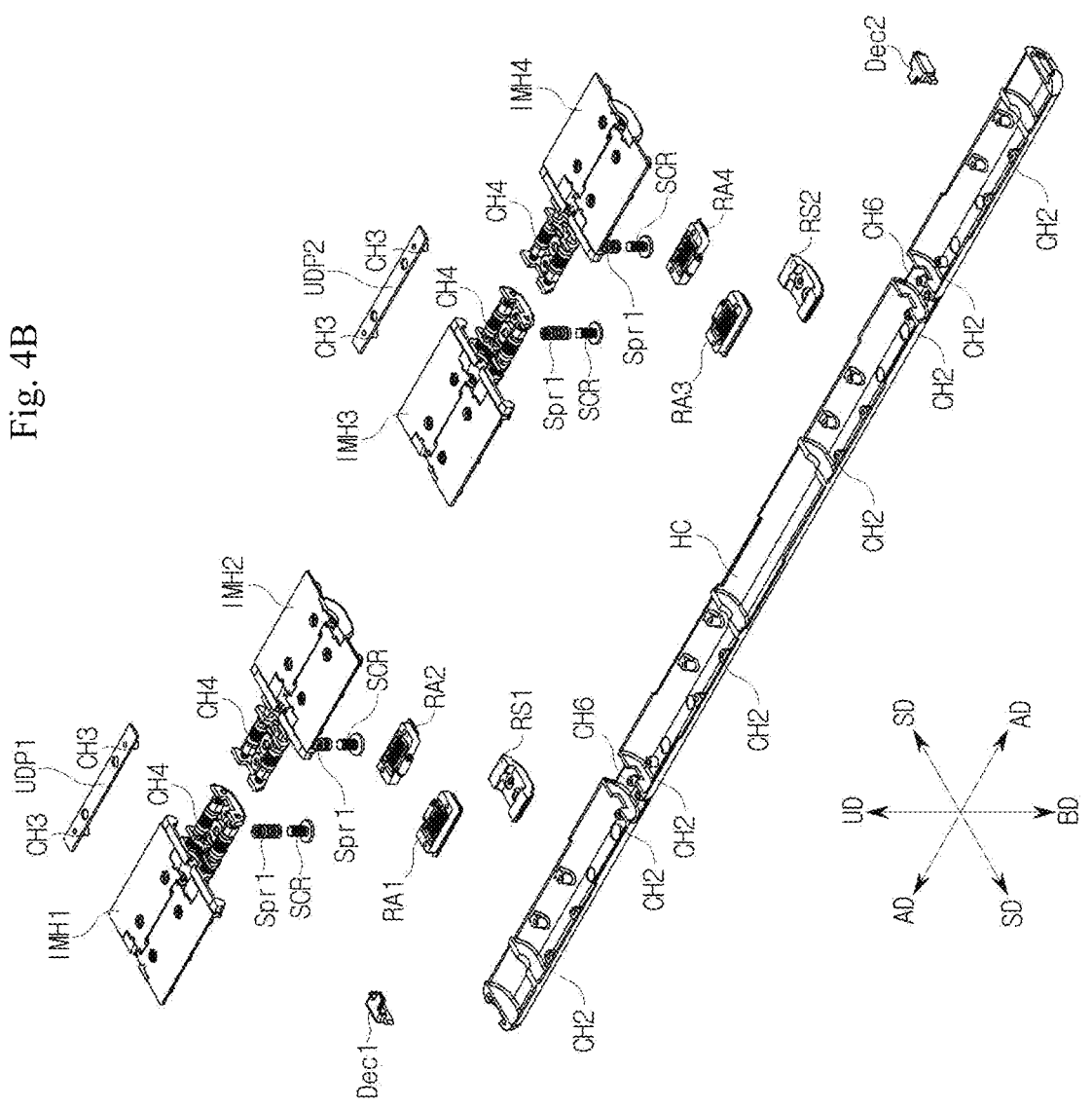
FIG. 4B is an exploded perspective view of an in-folding hinge assembly IHA according to an exemplary embodiment of the present disclosure.

FIG. 4B is an exploded perspective view of an in-folding hinge assembly IHA according to an exemplary embodiment of the present disclosure.

Figure 4C:
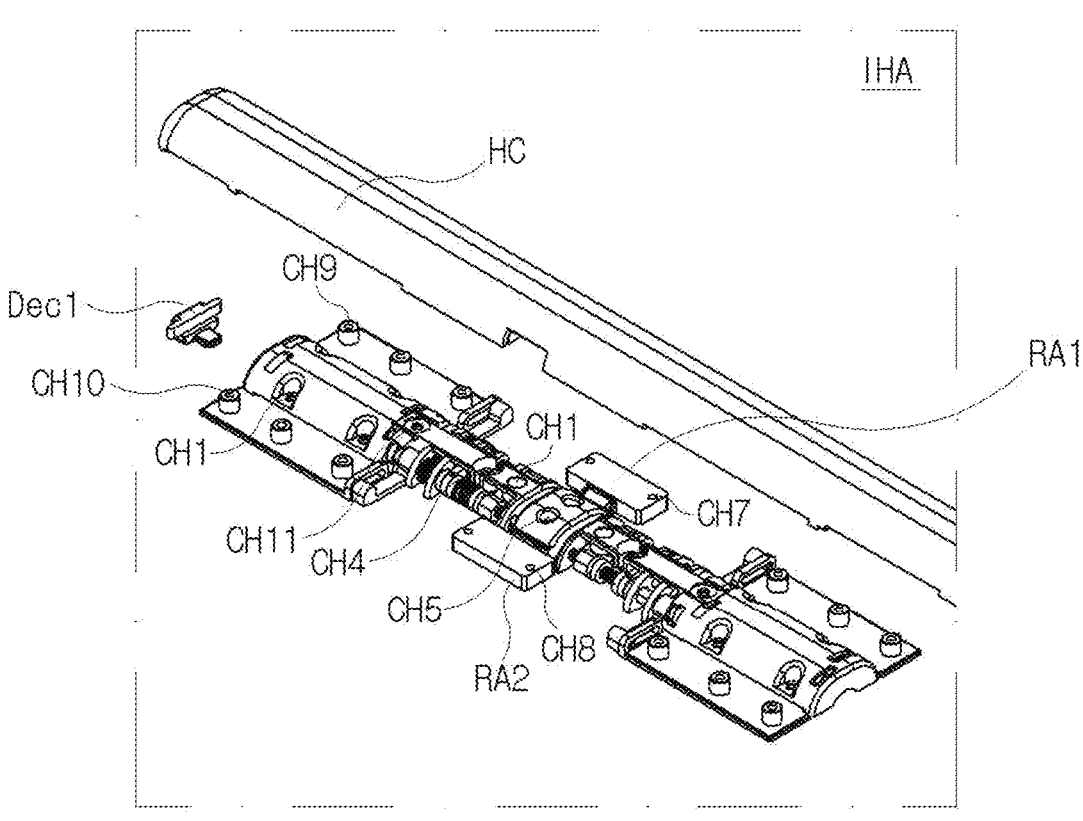
FIG. 4C is a perspective view of an in-folding hinge assembly IHA viewed from a rear surface according to an exemplary embodiment of the present disclosure.
Figure 4C:
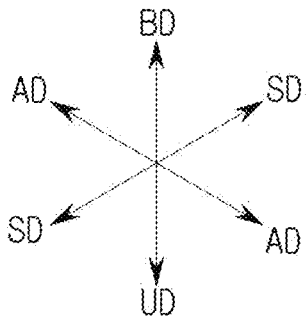

FIG. 4C is a perspective view of an in-folding hinge assembly IHA viewed from a rear surface according to an exemplary embodiment of the present disclosure.

Figure 4D:
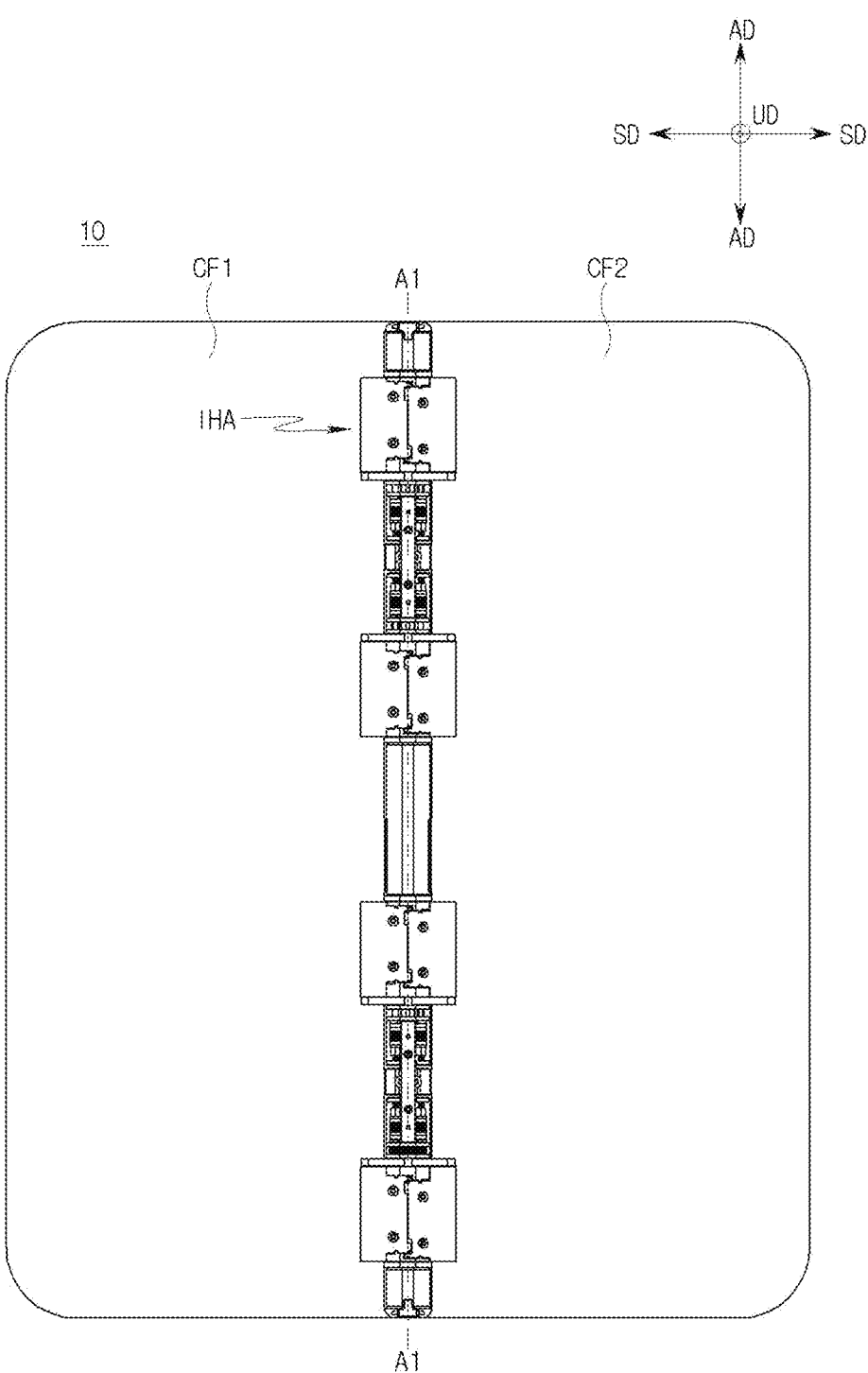
FIG. 4D is a front view of a display apparatus 10 viewed from a front surface according to an exemplary embodiment of the present disclosure.

FIG. 4D is a front view of a display apparatus 10 viewed from a front surface according to an exemplary embodiment of the present disclosure.

FIGS. 4A to 4D illustrate an unfolding state of the display apparatus 10. Referring to FIGS. 4A to 4D, the in-folding hinge assembly (IHA) according to an exemplary embodiment of the present disclosure will be described. For clarity of explanation, unnecessary components are omitted.

Referring to FIGS. 4A and 4B, the in-folding hinge assembly IHA may have a length along the axial direction AD. The in-folding hinge assembly IHA includes a deco pin Dec, an in-folding hinge module IHM, an up-down plate UDP, a roller assembly RA, a roller stopper RS, and a hinge cover HC.

The hinge cover HC may have a length along the axial direction AD. The hinge cover HC does not rotate during folding and in-folding. The hinge cover HC may have a half cylinder shape or a substantially half cylinder shape. For example, the inner and outer shapes of the hinge cover HC may have a half cylinder shape. For another example, the inner shape of the hinge cover HC may have a half cylinder shape, and the outer shape of the hinge cover HC may have another shape (e.g., a rectangle, an oval shape, etc., but the embodiments of the present disclosure are not limited thereto).

Other components may be accommodated in the accommodation space formed inside the hinge cover HC. In particular, the in-folding hinge module IHM is accommodated inside the hinge cover HC. The lever wing HM-1 (see FIG. 5A) of the in-folding hinge module IHM rotates according to folding and in-folding. In order to guide the rotation of the lever wing HM-1, the inside of the hinge cover HC may have a half cylinder shape. A plurality of partition walls partitioning the inner space of the hinge cover HC may be formed to ensure that the components accommodated in the accommodation space of the hinge cover HC are firmly fixed. The components to be accommodated may be firmly fixed by being sandwiched between the plurality of partition walls, or being sandwiched between an inner wall of the hinge cover HC and the plurality of partition walls. The hinge cover HC may include a plurality of fastening holes. Other components and the hinge cover HC may be coupled to each other through a plurality of fastening holes. Accordingly, other components may be fixed to the hinge cover HC. For example, the hinge cover HC and other components may be coupled to each other by inserting screws into the plurality of fastening holes, but the embodiments of the present disclosure are not limited thereto.

The deco pins Dec may be disposed at one end and the other end of the hinge cover HC in the longitudinal direction. Referring to FIG. 4A, a deco pin Dec1 disposed at one end of the hinge cover HC and a deco pin Dec2 disposed at the other end of the hinge cover HC along the axial direction AD are illustrated. When the in-folding hinge assembly IHA is observed from the outside of the display apparatus 10, the deco pin Dec may improve aesthetics. The deco pin Dec may be formed in various colors and various shapes. The deco pin Dec may be fixed to the hinge cover HC through a slit shape.

The in-folding hinge module IHM may be seated in the accommodation space inside the hinge cover HC. Referring to FIG. 4A, four in-folding hinge modules IHM1, IHM2, IHM3, and IHM4 seated inside the hinge cover HC along the axial direction AD are illustrated. The technical idea of the present disclosure is not limited to the number of in-folding hinge modules IHM, for example, the number of in-folding hinge modules IHM is n, where n is an integer. Some configurations of the in-folding hinge module IHM include configurations that rotate during folding and in-folding and configurations that do not rotate during folding and in-folding. Representatively, the lever wing HM-1 (see FIG. 5A) may rotate during folding and in-folding. The wing bottom HM-2 (see FIG. 5A) and the shaft bottom HM-6 may be fixed without rotating during folding and in-folding. The surface of the in-folding hinge module IHM in the downward direction BD may be coupled to the cover frames CF1 and CF2 (see FIG. 3). When the in-folding hinge module IHM rotates during folding and in-folding, the cover frames CF1 and CF2 may also rotate. As the cover frames CF1 and CF2 rotate, the display apparatus 10 may be folded or in-folded.

Referring to FIG. 4C, the in-folding hinge module IHM may include a plurality of fastening holes CH1 formed in the downward direction BD. FIG. 4C illustrates five fastening holes CH1 as an exemplary number for one in-folding hinge module IHM. Referring to FIG. 4B, the hinge cover HC may include a plurality of fastening holes CH2. FIG. 4B illustrates five fastening holes CH2 as an exemplary number corresponding to one in-folding hinge module IHM in the hinge cover HC. The in-folding hinge module IHM may be fixed to the hinge cover HC through the plurality of fastening holes CH1 and CH2. For example, the number of each of the fastening holes CH1 and CH2 is not limited to five, the number of each of the fastening holes CH1 and CH2 may be m, where m is an integer.

Also, the in-folding hinge module IHM may include a plurality of fastening holes CH9 and CH10. The in-folding hinge module IHM may be coupled to the cover frame CF through the plurality of fastening holes CH9 and CH10. FIG. 4C illustrates three fastening holes CH9 and three fastening holes CH10 as exemplary numbers for one in-folding hinge module IHM. For example, the first cover frame CF1 (see FIG. 3) may include a plurality of fastening holes corresponding to the fastening holes CH9. The in-folding hinge module IHM and the first cover frame CF1 may be coupled to each other through the fastening holes CH9. The second cover frame CF2 (see FIG. 3) may include a plurality of fastening holes corresponding to the fastening holes CH10. The in-folding hinge module IHM and the second cover frame CF2 may be coupled to each other through the fastening holes CH10. The number of each of the fastening holes CH9 and CH10 is not limited to three, the number of each of the fastening holes CH9 and CH10 may be p, where p is an integer. A detailed description of the in-folding hinge module IHM will be described later with reference to FIGS. 5A, 5B and 5C and the like.

The up-down plate UDP may have a length along the axial direction AD. FIG. 4A illustrates two up-down plates UDP1 and UDP2 as an exemplary number for the in-folding hinge assembly IHA. The up-down plate UDP does not rotate during folding and in-folding. The up-down plate UDP ascends in the upward direction UD when unfolded. The up-down plate UDP descends in the downward direction BD when folded. When the up-down plate UDP ascends during unfolding, the panel assembly PNLA disposed on the upper portion of the up-down plate UDP may be supported by the up-down plate UDP. By supporting the panel assembly PNLA, the folding area FA of the panel PNL may be substantially flat. Accordingly, folding wrinkles that may be formed in the folding area FA of the panel PNL may be removed.

The up-down plate UDP may be disposed between the in-folding hinge modules IHMs adjacent to each other. For example, the up-down plate UDP1 may be disposed between the in-folding hinge module IHM1 and the in-folding hinge module IHM2. The up-down plate UDP2 may be disposed between the in-folding hinge module IHM3 and the in-folding hinge module IHM4.

The up-down plate UDP is coupled to the in-folding hinge module IHM to be able to ascend and descend. Referring to FIGS. 4B and 4C, the up-down plate UDP may include fastening holes CH3. As an exemplary number, two fastening g holes CH3 are illustrated. The in-folding hinge module IHM1 and the in-folding hinge module IHM2 collectively may include two fastening holes CH4 as an exemplary number. When the fastening hole CH3 and the fastening hole CH4 are coupled to each other, the spring Spr1 and the fixing screw SCR are coupled together. Through their structural coupling, the up-down plate UDP is coupled to the in-folding hinge module IHM each other so that the up-down plate UDP may be ascended and descended. In addition, the number of each of the fastening holes CH3 and CH4 is not limited to two, the number of each of the fastening holes CH3 and CH4 may be more than two, and the number of the fastening hole CH3 and the number of the fastening hole CH4 may be same. A detailed description of the up-down plate UDP will be described later with reference to FIGS. 7A, 7B, 7C, 7D, 7E, 7F and 7G and the like.

The technical spirit of the present disclosure is not limited to the terms. For example, the spring Spr1 may be replaced with another component having an elastic force. The fixing screw SCR may be replaced with other components capable of fastening.

The roller assemblies RA are respectively disposed on both sides of the axial direction AD. As an exemplary number, two roller assemblies RA1 and RA2 are illustrated for two in-folding hinge modules IHM1 and IHM2. The roller assembly RA1 is disposed on one side relative to the axial direction AD. The roller assembly RA2 is disposed on the other side relative to the axial direction AD.

The roller assembly RA is coupled to the cover frame CF. The roller assembly RA1 is coupled to the first cover frame CF1. The roller assembly RA2 is coupled to the second cover frame CF2. Therefore, the roller assembly RA rotates together with the cover frame CF during folding and in-folding.

On the same basis, the roller assembly RA3 is coupled to the first cover frame CF1, and the roller assembly RA4 is coupled to the second cover frame CF2. The roller assembly RA generates force to bring the cover frames CF1 and CF2 into close contact with each other in an unfolding state. In addition, the number of roller assembly RA is not limited to four, for example, three or more roller assembly RA may be disposed for each of the first cover frame CF1 and the second cover frame CF2.

The roller stopper RS is disposed in the accommodation space of the hinge cover HC. The roller stopper RS is disposed between the pair of roller assemblies RA1 and RA2. As an exemplary number, one roller stopper RS1 is illustrated for two roller assemblies RA1 and RA2. The roller stopper RS1 is disposed between the roller assembly RA1 and the roller assembly RA2. The roller stopper RS2 is disposed between the roller assembly RA3 and the roller assembly RA4. In addition, the number of roller stopper RS is not limited to two, for example, the number of roller stopper RS may correspond to half of the number of roller assembly RA, when each roller stopper is used for couple each two roller assembly RA.

The roller stopper RS is subjected to a pushing force in the axial direction AD generated by the roller assembly RA. By generating supporting force between the roller assembly RA and the roller stopper RS, the holding force for maintaining the display apparatus 10 in an unfolding state increases. For example, the display apparatus 10 may be flat or substantially flat (i.e, display apparatus 10 is unfolded at 180 or substantially 180 degrees) in an unfolding state by the roller assembly RA and the roller stopper RS. Therefore, the transition from the unfolding state to the folding state may be started only when a folding force greater than a predetermined force is applied to the display apparatus 10. In addition, since the display apparatus 10 is unfolded at a 180 degrees or substantially 180 degrees angle, the up-down plate UDP may ascend to the maximum. Accordingly, folding wrinkles that may occur in the folding area FA of the panel PNL may be completely or maximally removed.

Referring to FIG. 4C, for one roller stopper RS, the roller stopper RS includes two fastening holes CH5 as an exemplary number in the downward direction BD. Referring to FIG. 4B, for one roller stopper RS, the hinge cover HC includes two fastening holes CH6 as an exemplary number in the upward direction. By combining the fastening holes CH5 and CH6, the roller stopper RS may be seated inside the hinge cover HC. The number of each of fastening holes CH5 and fastening holes CH6 is not limited to two, the number of fastening holes CH5 may be three or more, and the number of fastening holes CH5 and the number of fastening holes CH6 may be same.

Referring to FIG. 4C, the roller assembly RA includes a plurality of fastening holes CH7 and CH8. Two fastening holes CH7 are illustrated as an exemplary number for one roller assembly RA1, and two fastening holes CH8 are illustrated as an exemplary number for one roller assembly RA2. Fastening holes corresponding to the plurality of fastening holes CH7 are formed in the first cover frame CF1 (see FIG. 3). The roller assembly RA1 may be coupled to the first cover frame CF1 through the plurality of fastening holes CH7, for example, the number of fastening holes CH7 may be three or more. Fastening holes corresponding to the plurality of fastening holes CH8 are formed in the second cover frame CF2 (see FIG. 3). The roller assembly RA2 may be coupled to the second cover frame CF2 through the plurality of fastening holes CH8, for example, the number of fastening holes CH8 may be three or more.

A detailed description of the roller assembly RA and the roller stopper RS will be described later with reference to FIGS. 7A to 7G and the like.

Referring to FIG. 4D, the in-folding hinge assembly IHA is coupled to the cover frame CF each other. Specifically, the first cover frame CF1 and the in-folding hinge assembly IHA are coupled to each other on one side of the folding axis A1. The second cover frame CF2 and the in-folding hinge assembly IHA are coupled to each other on the other side of the folding shaft A1. In the in-folding hinge assembly IHA, some components of the in-folding hinge assembly IHA rotate based on the folding axis A1. For example, a pair of lever wings (HM-1, see FIG. 5A) of the in-folding hinge assembly (IHA) rotates to face each other. Due to a folding operation of the in-folding hinge assembly IHA, the first cover frame CF1 and the second cover frame CF2 may be folded to face each other. Due to the unfolding operation of the in-folding hinge assembly IHA, the first cover frame CF1 and the second cover frame CF2 may be unfolded at 180 degrees to each other in the side direction SD.

The panel assembly PNLA (see FIG. 3) may be disposed in the upward direction UD of the in-folding hinge assembly IHA and cover frame CF. The panel assembly PNLA includes one or more plates PLTs disposed on the lower portion of the panel assembly PNLA and a panel PNL disposed on the upper portion of the panel assembly PNLA.

Due to the folding operation of the in-folding hinge assembly IHA, the first display area DA1 (see FIG. 3) and the second display area DA2 (see FIG. 3) may be folded to face each other. Due to the unfolding operation of the in-folding hinge assembly IHA, the first display area DA1 and the second display area DA2 may be unfolded so as to be 180 degrees from each other in the side direction SD. In addition, due to the rising operation of the up-down plate UDP of the in-folding hinge assembly IHA, the panel assembly PNLA may be supported by the up-down plate UDP during unfolding. Accordingly, folding wrinkles that may be formed in the folding area FA of the panel PNL (see FIG. 3) may be improved. In addition, the panel PNL may be unfolded substantially at 180 degrees when unfolded by the holding force generated by the roller assembly RA and roller stopper RS of the in-folding hinge assembly IHA.

Figure 5A:
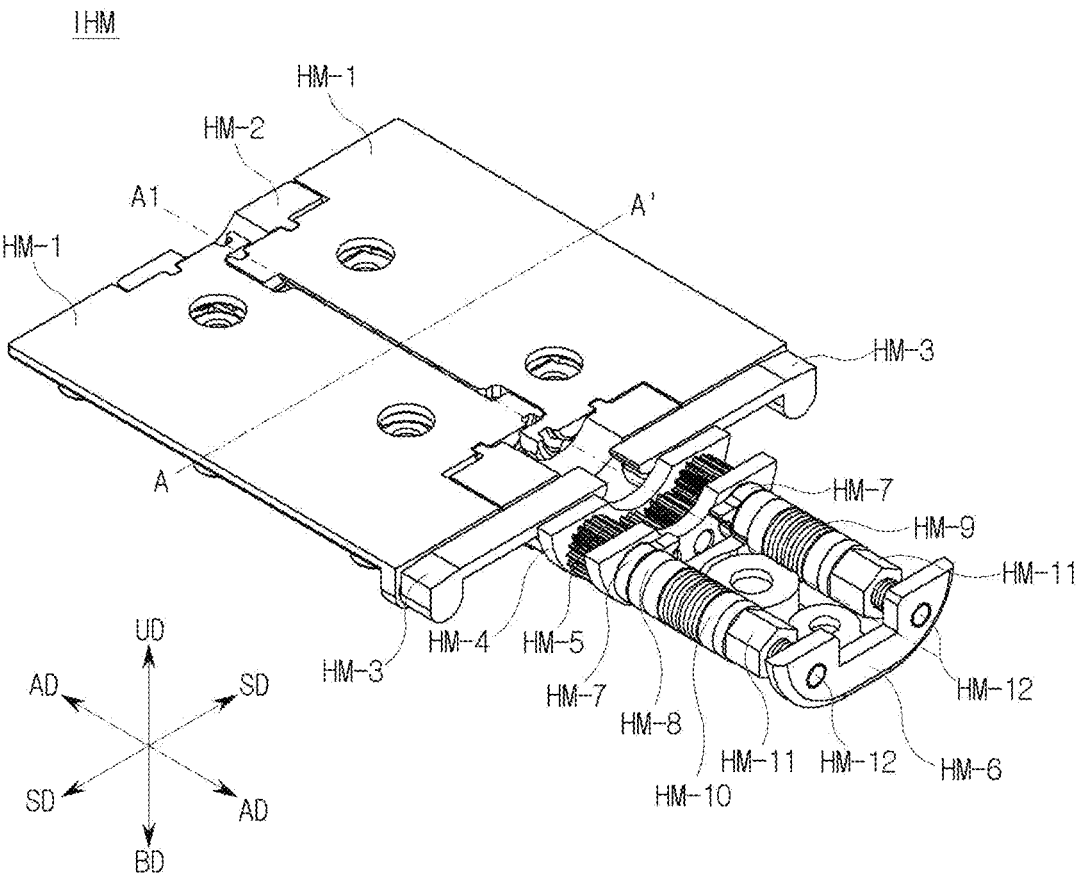
FIG. 5A is a perspective view of an in-folding hinge module IHM viewed from a top surface according to exemplary an embodiment of the present disclosure.

FIG. 5A is a perspective view of an in-folding hinge module IHM viewed from a top surface according to an exemplary embodiment of the present disclosure.

Figure 5B:
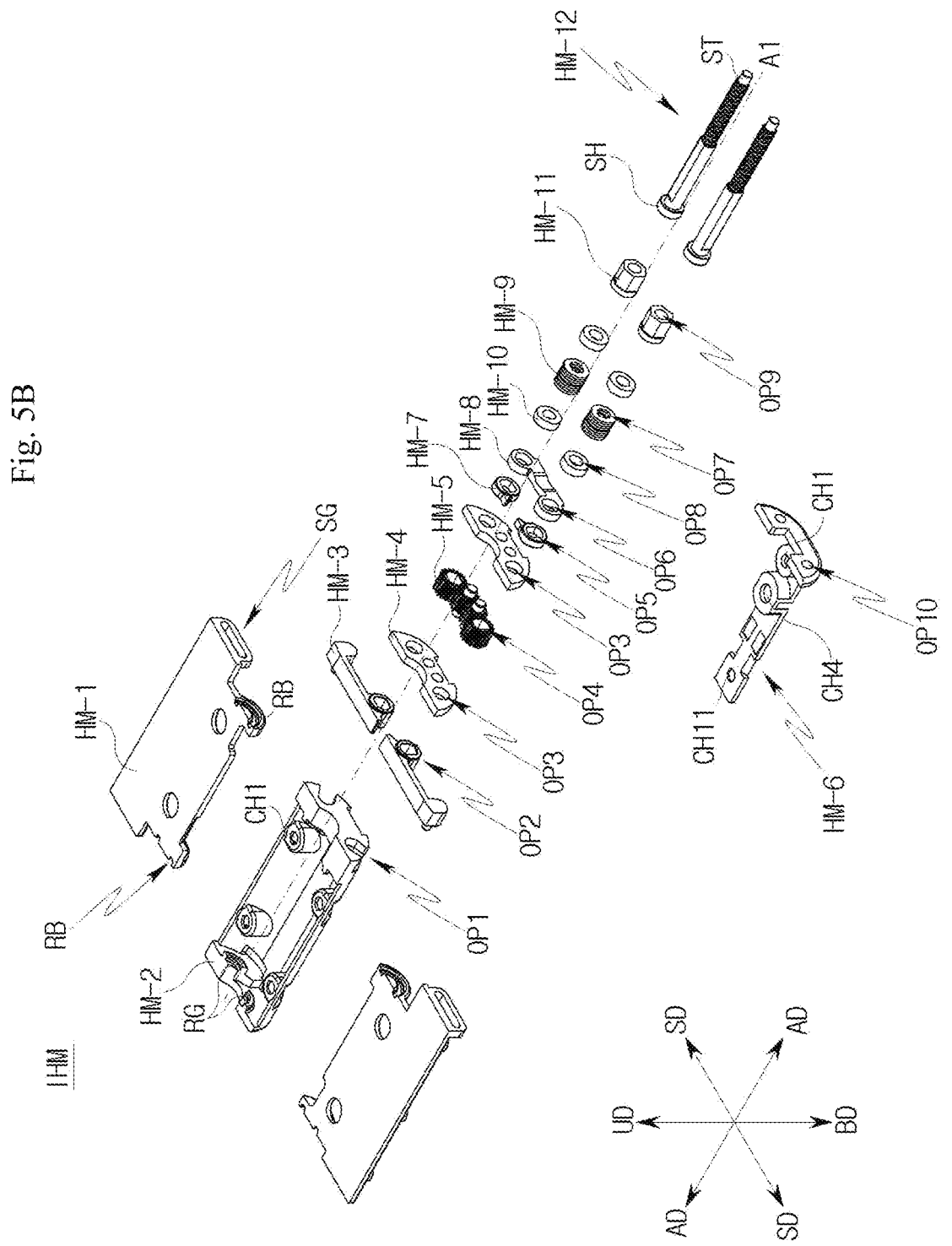
FIG. 5B is an exploded perspective view of an in-folding hinge module IHM according to an exemplary embodiment of the present disclosure.

FIG. 5B is an exploded perspective view of an in-folding hinge module IHM according to an exemplary embodiment of the present disclosure.

Figure 5C:
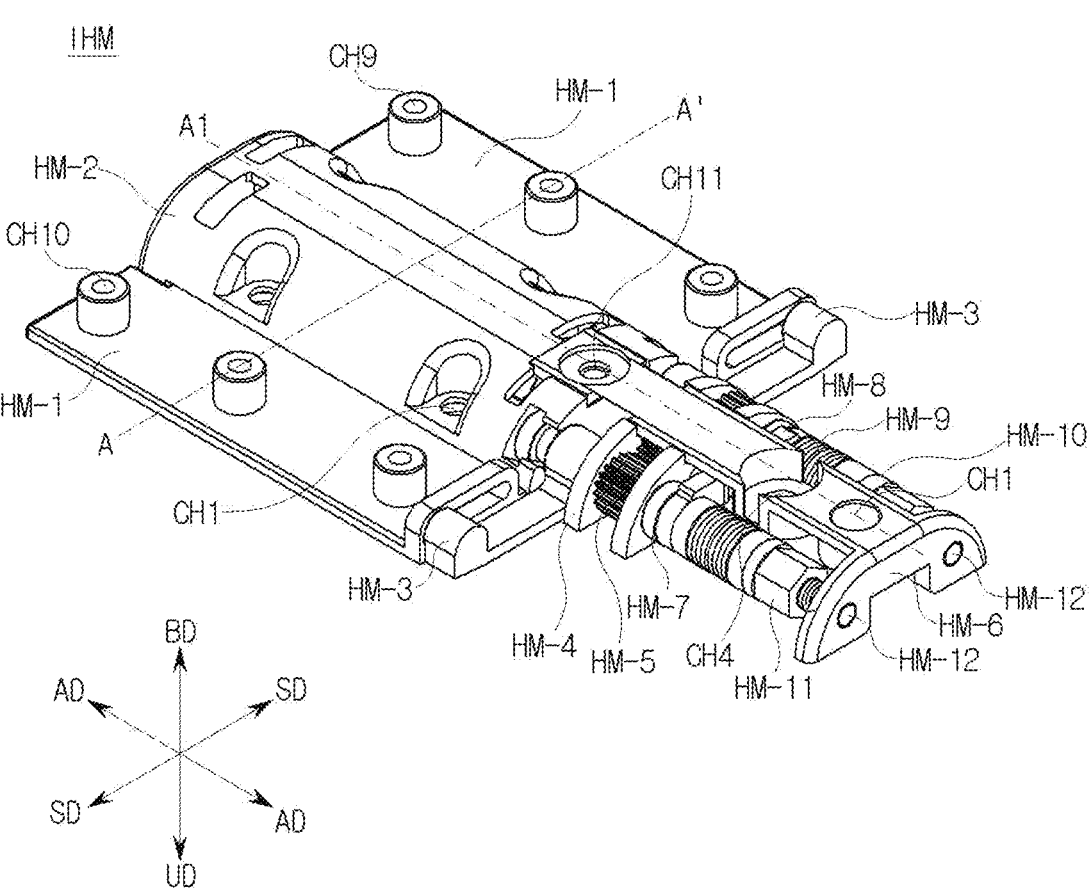
FIG. 5C is a perspective view of an in-folding hinge module IHM viewed from a rear surface according to an exemplary embodiment of the present disclosure.

FIG. 5C is a perspective view of an in-folding hinge module IHM viewed from a rear surface according to exemplary an embodiment of the present disclosure.

FIGS. 5A to 5C illustrate an unfolding state of the in-folding hinge module IHM. Referring to FIGS. 5A to 5C, an in-folding hinge module IHM according to an exemplary embodiment of the present disclosure will be described. For clarity of explanation, unnecessary components are omitted.

Referring to FIGS. 5A to 5C, the in-folding hinge module IHM includes a pair of lever wings HM-1, a wing bottom HM-2, a pair of wing guides HM-3, a plurality of gear guides HM-4, a plurality of gears HM-5, a shaft bottom HM-6, a pair of lift washers HM-7, a lift washer guide HM-8, a plurality of disc springs HM-9, a plurality of washers HM-10, a pair of press nuts HM-11 and a pair of shafts HM-12.

A pair of lever wings HM-1 has a plate shape with a relatively large area. A pair of lever wings HM-1 is rotatably coupled to the wing bottom HM-2. Referring to FIG. 5B, a pair of lever wings HM-1 includes a rotation protrusion RB. The rotation protrusion RB may have a half cylinder shape. As illustrated, each of the pair of lever wings HM-1 may include two rotation protrusions RB, which is an exemplary number, but the number of rotation protrusions RB of each of the pair of lever wings HM-1 is not limited to two, for example, the number of rotation protrusions RB may be three or more. A rotation guide RG having a shape corresponding to the rotation protrusion RB is formed inside the wing bottom HM-2. As illustrated, an exemplary number of four rotation guides RG may be formed inside the wing bottom HM-2, but the number of rotation guides RG is not limited to four, and the number of rotation guides RG corresponds to the number of rotation protrusions RB. The pair of lever wings HM-1 and the wing bottom HM-2 are coupled to each other so that the rotation protrusion RB and the rotation guide RG are engaged with each other. The pair of lever wings HM-1 rotates to face each other during a folding operation of the display apparatus 10. The pair of lever wings HM-1 rotates 180 degrees to each other when the display apparatus 10 is unfolded.

As illustrated in FIG. 5C, the pair of lever wings HM-1 includes a plurality of fastening holes CH9 and CH10 on the downward direction BD. The fastening hole CH9 is connected to the first cover frame CF1 (see FIG. 3). The fastening hole CH10 is connected to the second cover frame CF2 (see FIG. 3). As illustrated, each of the pair of lever wings HM-1 includes an exemplary number of three fastening holes CH9 and CH10. The cover frames CF1 and CF2 may rotate in association with the rotation of the pair of lever wings HM-1. Accordingly, the display apparatus 10 may perform folding and unfolding operations.

The wing bottom HM-2 is disposed in the downward direction BD of the pair of lever wings HM-1. The wing bottom HM-2 is coupled to the pair of lever wings HM-1. The wing bottom HM-2 does not rotate and is fixed during a folding operation of the display apparatus 10. The rotation guide RG is formed inside the wing bottom HM-2.

The wing bottom HM-2 is accommodated in the accommodation space of the hinge cover HC. The wing bottom HM-2 includes a plurality of fastening holes CH1. The hinge cover HC includes the plurality of fastening holes CH2 (see FIG. 4B). The wing bottom HM-2 may be fixed in the accommodation space of the hinge cover HC through the fastening hole CH1 and CH2. As an exemplary number, the wing bottom HM-2 is illustrated as including four fastening holes CH1. For reference, the fastening hole CH1 is also formed in the downward direction BD of the shaft bottom HM-6, which will be described later, and the shaft bottom HM-6 is coupled to the hinge cover HC through the fastening hole CH1.

The wing bottom HM-2 includes an opening OP1. The head portion SH of the pair of shafts HM-12 is fastened to the opening OP1.

The pair of wing guides HM-3 may have a shape having a length in the side direction SD. The pair of wing guides HM-3 is coupled with the pair of lever wings HM-1. Each of the pair of wing guides HM-3 includes a sliding protrusion SB (see FIG. 6C). Each of the pair of lever wings HM-1 includes a sliding guide SG (see FIG. 6C). The sliding protrusion SB is fastened to the sliding guide SG. When the pair of lever wings HM-1 rotates, the pair of wing guides HM-3 rotates in conjunction with the pair of lever wings HM-1.

Each of the pair of wing guides HM-3 includes an opening OP2. The pair of shafts HM-12 passes through the opening OP2. When the pair of wing guides HM-3 rotates, the pair of shafts HM-12 rotates. The rotation operation of the pair of shafts HM-12 is a rotation operation that rotates around the axis of the shaft.

The plurality of gear guides HM-4 and the plurality of gears HM-5 are disposed in the upward direction UD of the shaft bottom HM-6. As for the plurality of gear guides HM-4, two may be arranged as an exemplary number along the axial direction AD. The plurality of gears HM-5 is disposed between the two gear guides HM-4. Illustratively, the plurality of gears HM-5 is illustrated as four. However, the number of gear guides HM-4 is not limited to two, the number of gears HM-5 is not limited to four, for example, the number of gear guides HM-4 may be four or more, the number of gears HM-5 may be greater than four.

The plurality of gear guides HM-4 includes openings OP3. The plurality of gears HM-5 includes openings OP4. The pair of shafts HM-12 passes through the openings OP3 and OP4. Referring to FIG. 5B, the pair of shafts HM-12 passes through two openings OP3 formed on the outermost side of the openings OP3 formed in the gear guide HM-4 in the side direction SD. In addition, the pair of shafts HM-12 passes through openings OP4 formed in two outermost gears HM-5 of the plurality of gears HM-5 in the side direction SD. When the pair of shafts HM-12 rotates, the plurality of gears HM-5 rotates. When the pair of shafts HM-12 rotates, the plurality of gear guides HM-4 does not rotate.

The pair of lift washers HM-7 and the lift washer guide HM-8 are disposed on the upper portion of the shaft bottom HM-6. Each of the pair of lift washers HM-7 is disposed on both sides of the folding axis A1.

Each of the pair of lift washers HM-7 includes an opening OP5. The pair of shafts HM-12 passes through the opening OP5. When the pair of shafts HM-12 rotates, the pair of lift washers HM-7 rotates. The lift washer guide HM-8 contacts the pair of lift washers HM-7. The lift washer guide HM-8 includes an opening OP6. Even when the pair of shafts HM-12 rotates, the lift washer guide HM-8 does not rotate.

Figure 7A:
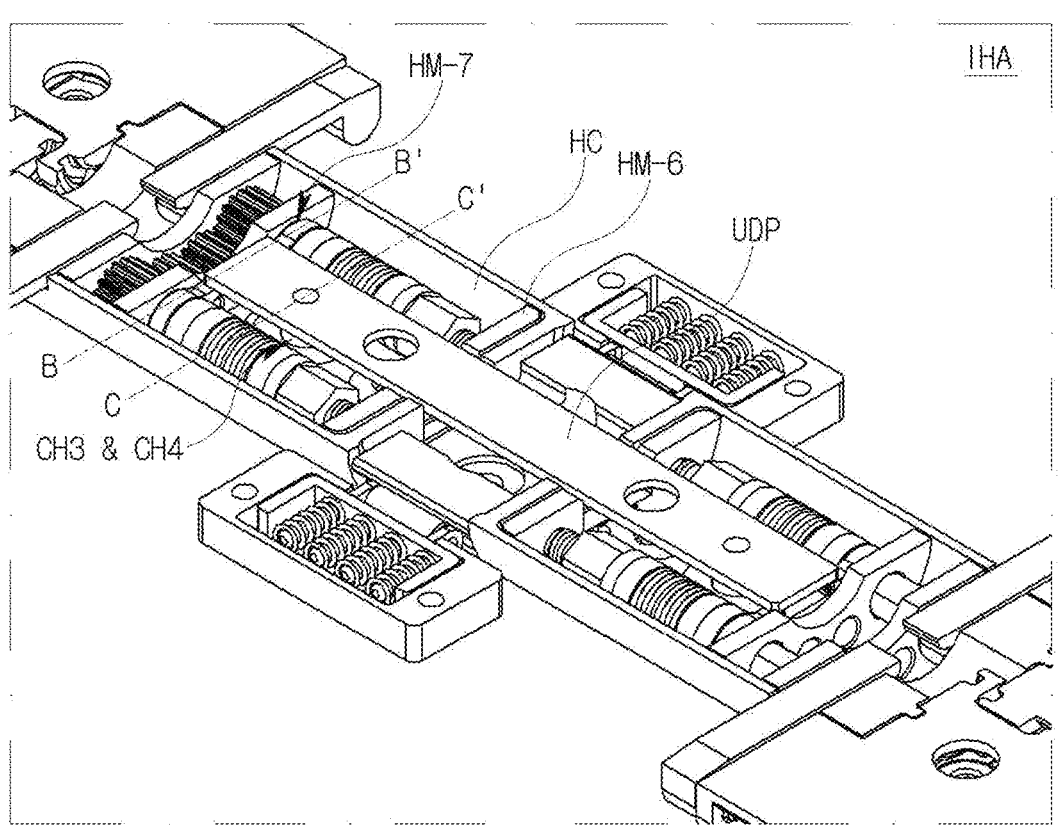
FIG. 7A is a perspective view of a portion of an in-folding hinge assembly IHA according to an exemplary embodiment of the present disclosure.
Figure 7A:
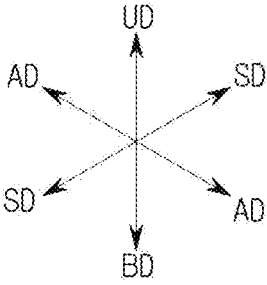
Figure 7B:
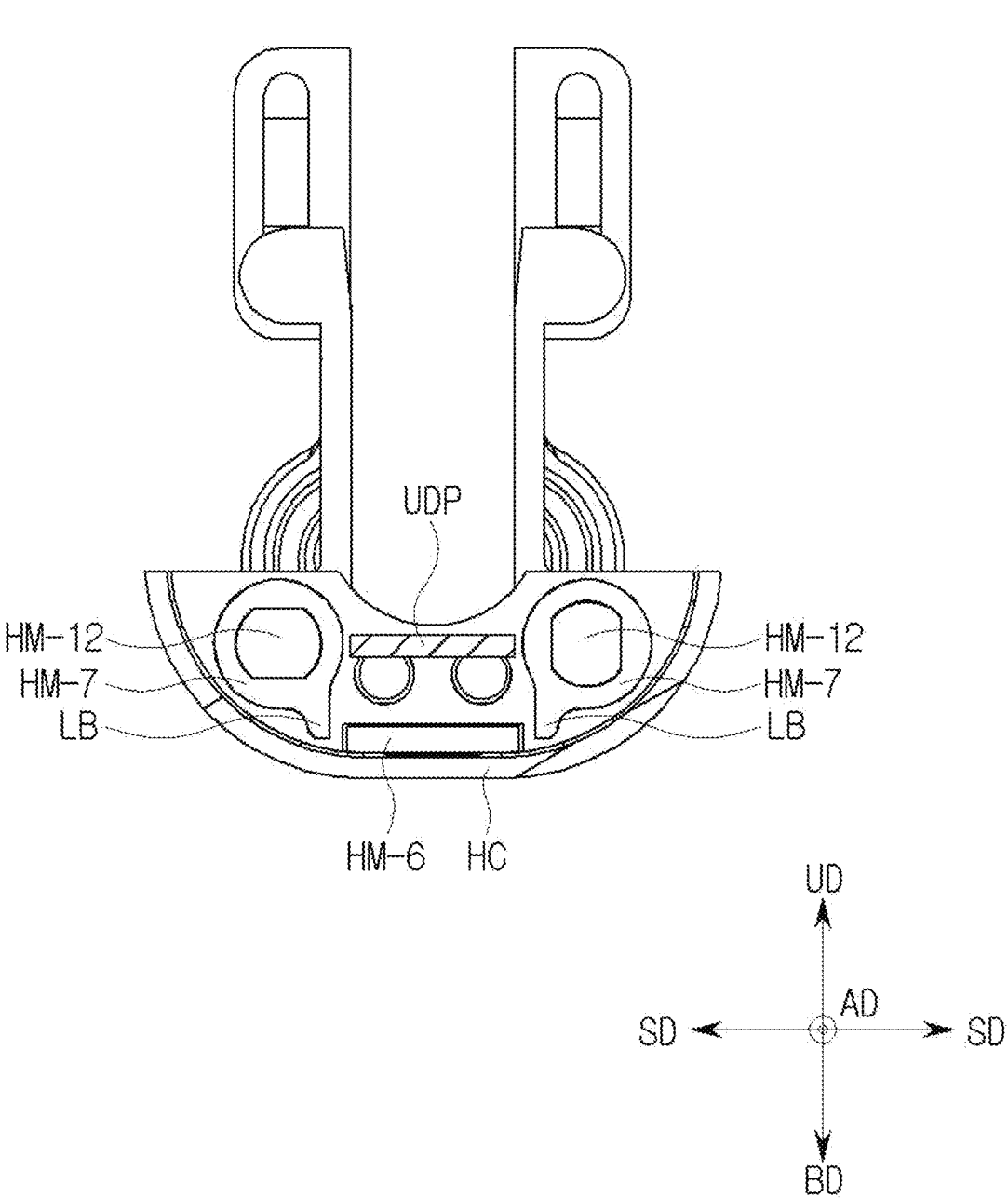
FIG. 7B is a view illustrating a folding state of an in-folding hinge assembly IHA accordance to an exemplary embodiment of the present disclosure, which is a cross-sectional view taken in a direction B-B' in FIG. 7A.
Figure 7C:
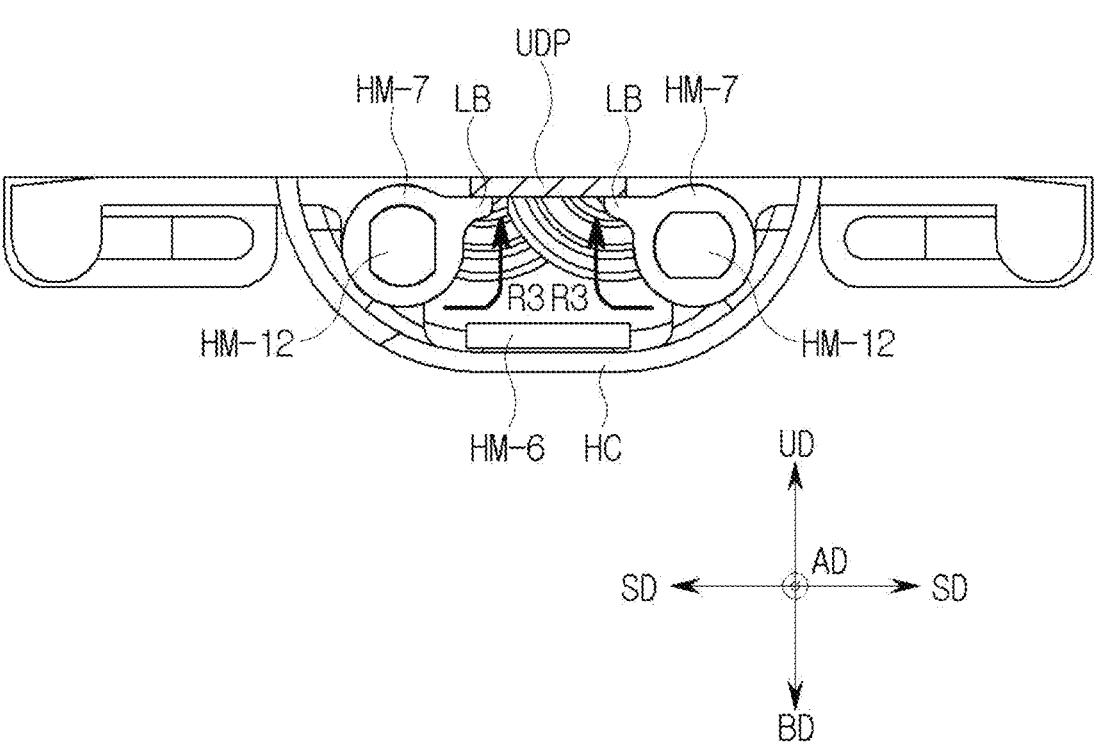
FIG. 7C is a view illustrating an unfolding state of an in-folding hinge assembly IHA accordance to an exemplary embodiment of the present disclosure, which is a cross-sectional view taken in a direction B-B' in FIG. 7A.

The pair of lift washers HM-7 includes a lift protrusion LB (see FIG. 7C). The lift protrusion LB contacts the up-down plate UDP. Referring to FIGS. 7B and 7C to be described later, when the display apparatus 10 is folded, the lift protrusion LB rotates downward and does not come into contact with the up-down plate UDP, and the up-down plate UDP descends. When the display apparatus 10 is unfolded, the lift protrusion LB rotates upward, comes into contact with the up-down plate UDP, and raises the up-down plate UDP.

The plurality of disc springs HM-9, the plurality of washers HM-10, and the pair of press nuts HM-11 are disposed on the upper portion of the shaft bottom HM-6. The plurality of disc springs HM-9 includes openings OP7. The plurality of washers HM-10 includes openings OP8. The pair of press nuts HM-11 includes openings OP9. The pair of shafts HM-12 penetrates through the openings OP7, OP8 and OP9. The pair of press nuts HM-11 brings the plurality of disc springs HM-9 into close contact with each other. When the plurality of disc springs HM-9 is compressed, torque that hinders rotation of the pair of shafts HM-12 is generated due to frictional force. This enables a so-called free stop in an intermediate state between folding and unfolding.

The pair of shafts HM-12 has a length in the axial direction AD. The pair of shafts HM-12 is disposed on the upper portion of the shaft bottom HM-6. The pair of shafts HM-12 includes a head SH and a tail ST. The head SH is fastened to the opening OP1 of the wing bottom HM-2. The tail ST is fastened to the opening OP10 of the shaft bottom HM-6. The body between the head SH and tail SD of the pair of shafts HM-12 passes through the pair of wing guides HM-3, the plurality of gear guides HM-4, the plurality of gears HM-5, the pair of lift washers HM-7, the lift washer guide HM-8, the plurality of disc springs HM-9, the plurality of washers HM-10, and the pair of press nuts HM-11.

When folding and unfolding operations of the display apparatus 10 occur, the cover frame CF rotates. When the cover frame (CF) rotates, the pair of coupled lever wings HM-1 rotates. When the pair of lever wings HM-1 rotates, the pair of coupled wing guides HM-3 rotates. When the pair of wing guides HM-3 rotates, the pair of shafts HM-12 rotates. When the pair of shafts HM-12 rotates, the plurality of gears HM-5 rotates. The folding and unfolding of the display apparatus 10 may be synchronized by rotating the plurality of gears HM-5. When the pair of shafts HM-12 rotates, the pair of lift washers HM-7 rotates. When the pair of lift washers HM-7 is rotated, the lift protrusion LB rotates and the up-down plate UDP may ascend.

The shaft bottom HM-6 is disposed on the lower portion of the pair of shafts HM-12. The shaft bottom HM-6 includes an opening OP10. The tail ST of the pair of shafts HM-12 is fastened to the opening OP10. The shaft bottom HM-6 includes the fastening hole CH11. Referring to FIG. 5C, the wing bottom HM-2 and the shaft bottom HM-6 may be coupled to each other through the fastening hole CH11.

The shaft bottom HM-6 includes the fastening hole CH1. The shaft bottom HM-6 may be coupled to the hinge cover HC through the fastening hole CH1.

Referring to FIG. 5B, the shaft bottom HM-6 includes the fastening hole CH4. As described above with reference to FIG. 4C, the up-down plate UDP includes the fastening hole CH3. The fastening hole CH3 and the fastening hole CH4 are coupled to each other, and the spring Spr1 and the fixing screw SCR are coupled together therewith. Due to this, the up-down plate UDP is coupled to the shaft bottom HM6 so as to be able to ascend and descend. The ascending and descending operations of the up-down plate UDP will be described later with reference to FIGS. 7A to 7G and the like.

Figure 6A:
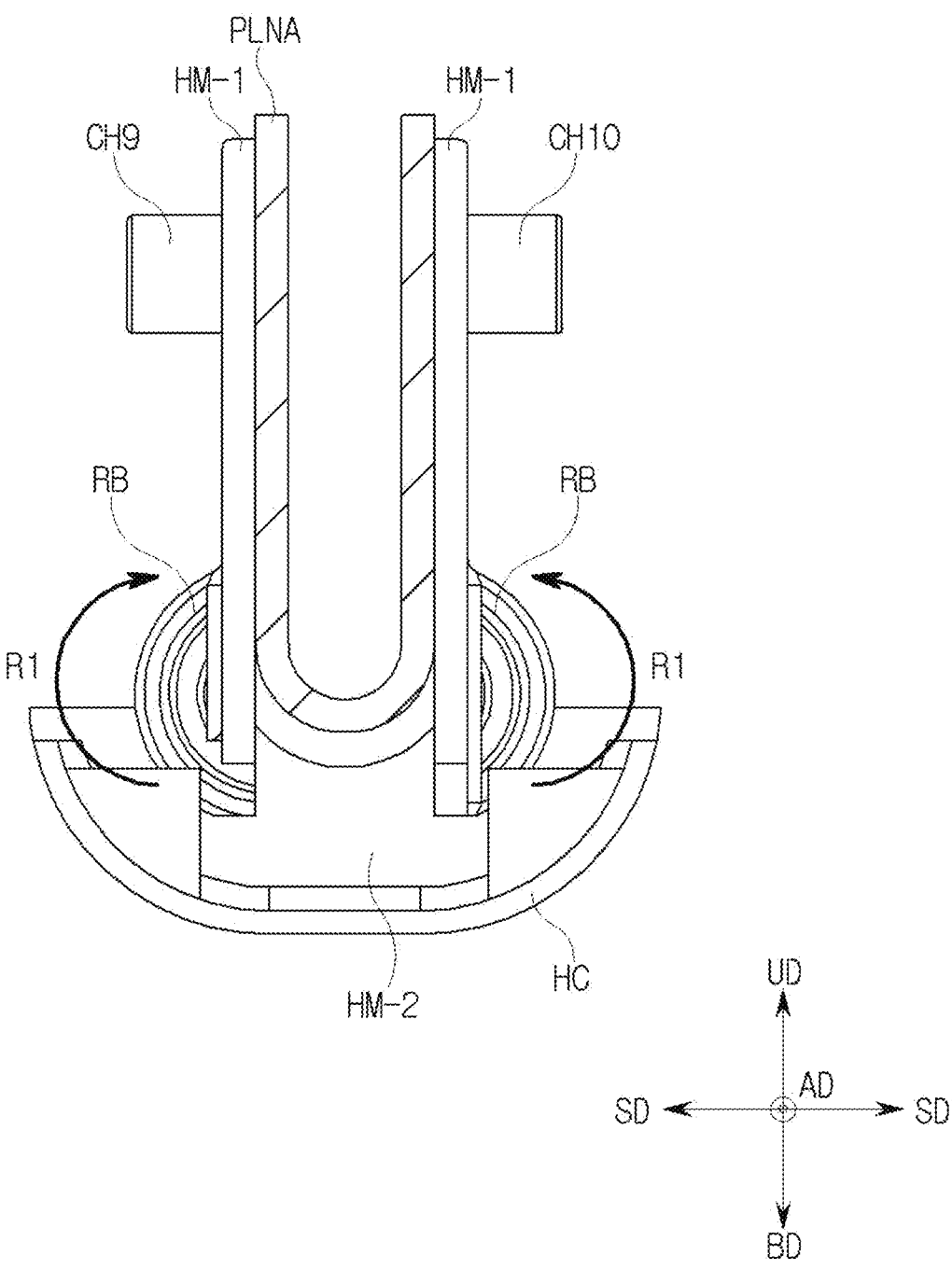
FIG. 6A is a view illustrating a folding state of a display apparatus 10 according to an exemplary embodiment of the present disclosure, which is a cross-sectional view taken in a direction A-A' in FIGS. 5A and 5C.

FIG. 6A is a view illustrating a folding state of a display apparatus 10 according to an exemplary embodiment of the present disclosure, which is a cross-sectional view taken in a direction A-A' in FIGS. 5A and 5C.

Figure 6B:
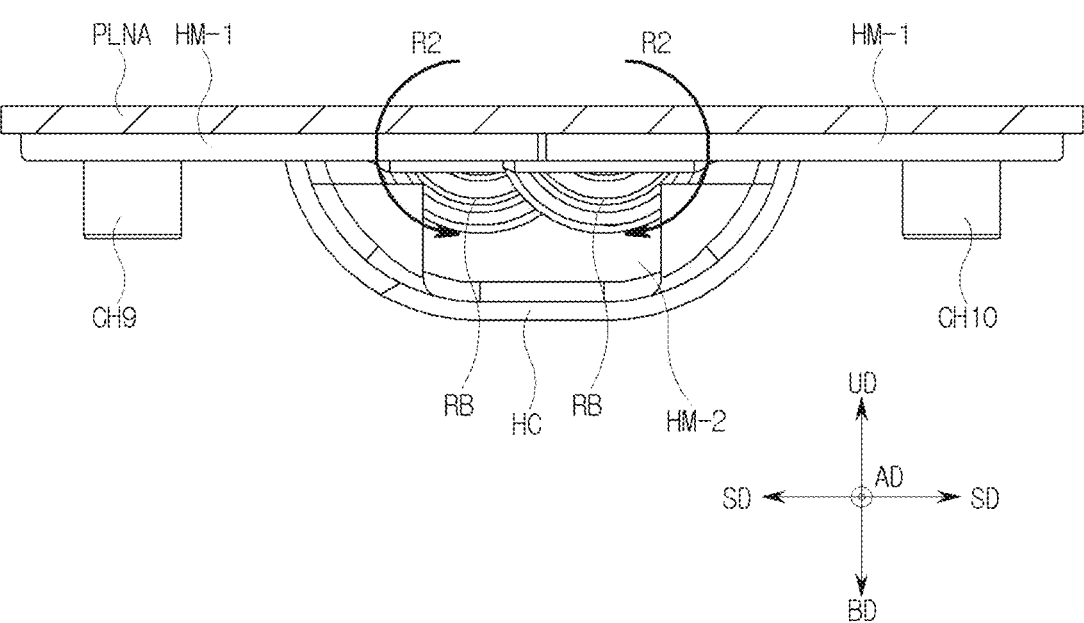
FIG. 6B is a view illustrating an unfolding state of a display apparatus 10 according to an exemplary embodiment of the present disclosure, which is a cross-sectional view taken in a direction A-A' in FIGS. 5A and 5C.

FIG. 6B is a view illustrating an unfolding state of a display apparatus 10 according to an exemplary embodiment of the present disclosure, which is a cross-sectional view taken in a direction A-A' in FIGS. 5A and 5C.

Referring to FIGS. 6A and 6B, the folding and unfolding operation of the display apparatus 10 will also be described in FIG. 6A. For clarity of explanation, unnecessary components are omitted. For clarity of explanation, a portion of the panel assembly PNLA is additionally illustrated.

The wing bottom HM-2 is seated in the hinge cover HC. The pair of lever wings HM-1 is rotated to face each other. This is because each of the rotation protrusions RB of the pair of lever wings HM-1 rotates in the R1 direction. The pair of lever wings HM-1 is connected to the cover frame CF (see FIG. 4D). The fastening hole CH9 is a hole for connecting the first cover frame CF1 (see FIG. 4D) and one of the pair of lever wings HM-1, and the fastening hole CH10 is a hole for connecting the second cover frame CF2 (see FIG. 4D) and the other one of the pair of lever wings HM-1. Since the pair of lever wings HM-1 is disposed to face each other, the first cover frame CF1 and the second cover frame CF2 face each other. The panel assembly PNLA includes the panel PNL (see FIG. 3) and one or more plates PLT (see FIG. 3). The panel assembly PNLA is supported by the first cover frame CF1 and the second cover frame CF2. Accordingly, the panel assembly PNLA is in a folding state as illustrated in FIG. 6A.

Referring to FIG. 6B, the wing bottom HM-2 is seated in the hinge cover HC. The pair of lever wings HM-1 is located at an angle of 180 to each other. This is because each of the rotation protrusions RB of the pair of lever wings HM-1 rotates in the R2 direction. The pair of lever wings HM-1 is connected to the cover frame CF (see FIG. 4D). The fastening hole CH9 is a hole for connecting the first cover frame CF1 (see FIG. 4D) and one of the pair of lever wings HM-1, and the fastening hole CH10 is a hole for connecting the second cover frame CF2 (see FIG. 4D) and the other one of the pair of lever wings HM-1. Since the pair of lever wings HM-1 is disposed at an angle of 180 degrees to each other, the first cover frame CF1 and the second cover frame CF2 are disposed at an angle of 180 degrees to each other. The panel assembly PNLA includes a panel PNL (see FIG. 3) and one or more plates PLT (see FIG. 3). The panel assembly PNLA is supported by the first cover frame CF1 and the second cover frame CF2. Accordingly, the panel assembly PNLA is in an unfolding state as illustrated in FIG. 6B.

That is, each of the rotation protrusions RB of the pair of lever wings HM-1 rotates in the R1 direction as shown in FIG. 6A, such that the first cover frame CF1 and the second cover frame CF2 face each other, thus the panel assembly PNLA is in a folding state as illustrated in FIG. 6A. Each of the rotation protrusions RB of the pair of lever wings HM-1 rotates in the R2 direction as shown in FIG. 6B, such that the first cover frame CF1 and the second cover frame CF2 are disposed at an angle of 180 degrees to each other, thus the panel assembly PNLA is in an unfolding state as illustrated in FIG. 6B.

Figure 6C:
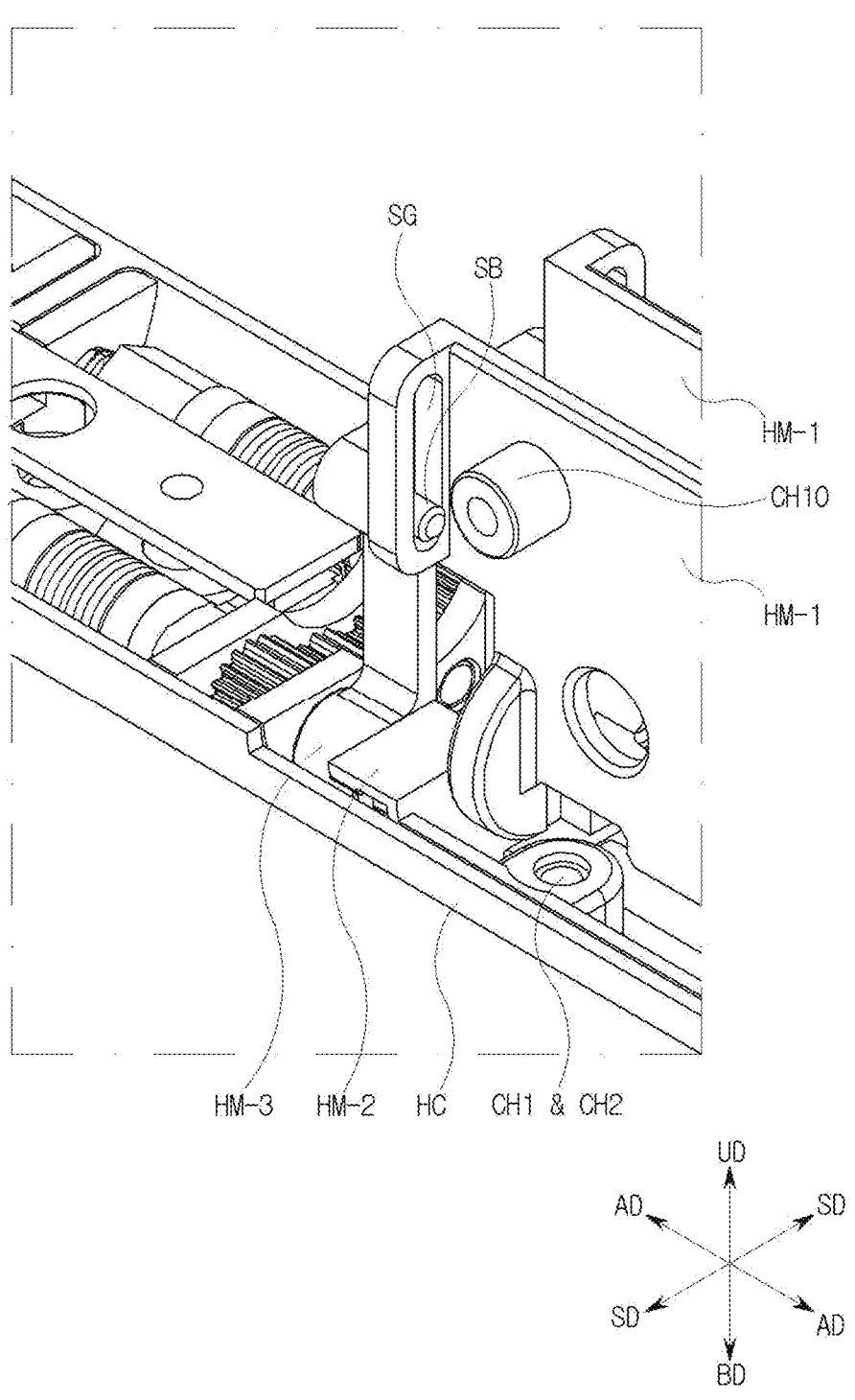
FIG. 6C is a perspective view illustrating a folding state of a display apparatus 10 according to an exemplary embodiment of the present disclosure.

FIG. 6C is a perspective view illustrating a folding state of a display apparatus 10 according to an exemplary embodiment of the present disclosure.

Figure 6D:
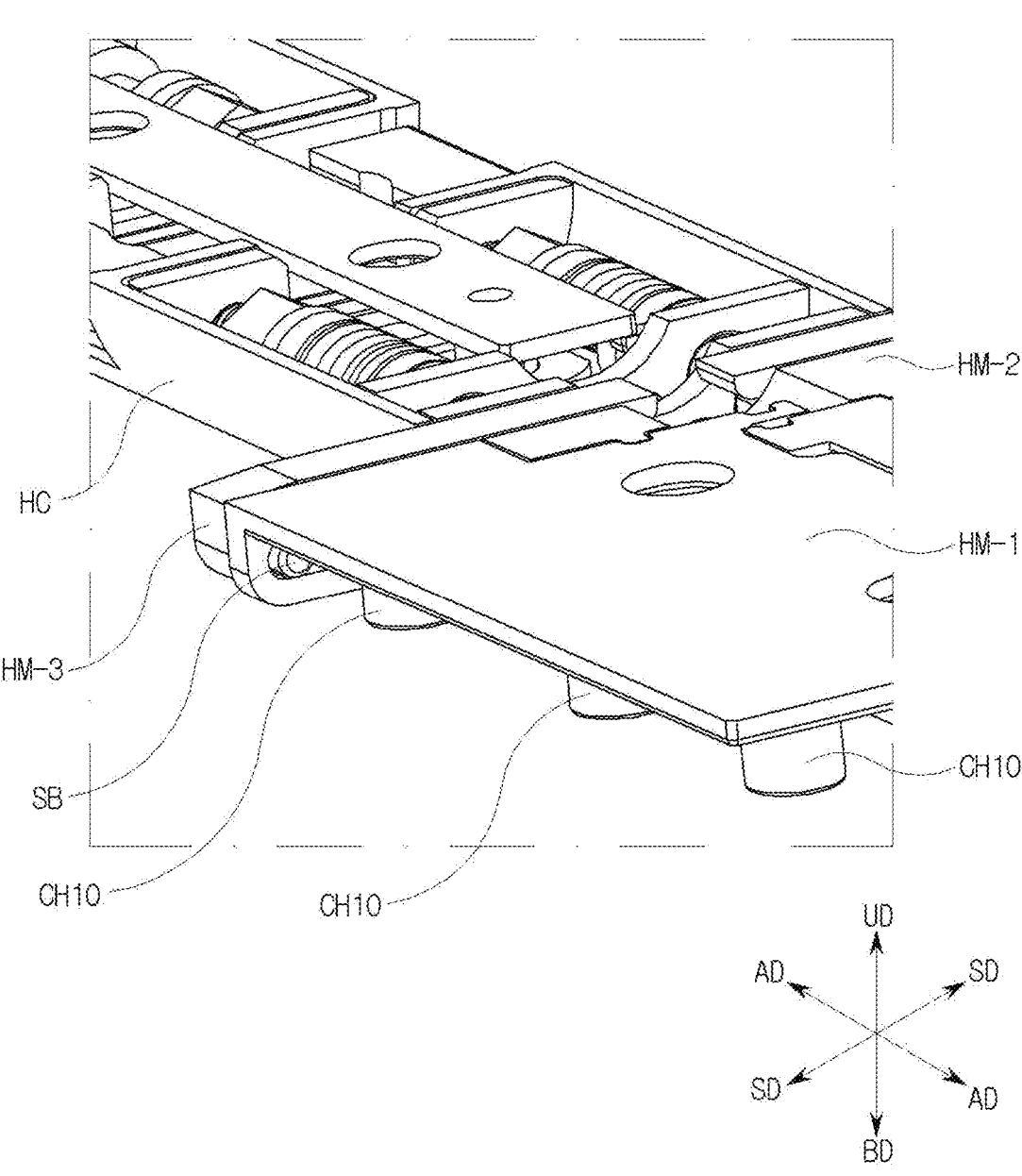
FIG. 6D is a perspective view illustrating an unfolding state of a display apparatus 10 according to an exemplary embodiment of the present disclosure.

FIG. 6D is a perspective view illustrating an unfolding state of a display apparatus 10 according to an exemplary embodiment of the present disclosure.

Referring to FIGS. 6C and 6D, the pair of lever wings HM-1 and the pair of wing guides HM-3 during folding and unfolding operations of the display apparatus 10 will be described.

Referring to FIGS. 6C and 6D, the wing bottom HM-2 is seated in the hinge cover HC. The fastening hole CH1 formed in the wing bottom HM-2 and the fastening hole CH2 formed in the hinge cover HC are coupled to each other. By a coupling between the fastening holes CH1 and CH2, the wing bottom HM-2 may be fixed in the hinge cover HC. The cover frame CF (see FIG. 4D) is connected to the pair of lever wings HM-1 through the fastening hole CH10. The pair of lever wings HM-1 is coupled to the pair of wing guides HM-3. The wing guide HM-3 includes the sliding protrusion SB, and the lever wing HM-1 includes the sliding guide SG. Comparing the folding state with reference to FIG. 6C and the unfolding state with reference to FIG. 6D, the sliding protrusion SB slides within the sliding guide SG according to the folding and unfolding states. The display apparatus 10 according to the present disclosure is folded or unfolded around the folding axis A1. The in-folding hinge module IHM according to the present disclosure has two rotational axes by the pair of shafts HM-12. The sliding protrusion SB and the sliding guide SG may enable interlocking between the two rotational axes and the one folding axis A1 as described above.

FIG. 7A is a perspective view of a portion of an in-folding hinge assembly IHA according to an exemplary embodiment of the present disclosure.

FIG. 7B is a view illustrating a folding state of an in-folding hinge assembly IHA accordance to an exemplary embodiment of the present disclosure, which is a cross-sectional view taken in a direction B-B' in FIG. 7A.

FIG. 7C is a view illustrating an unfolding state of an in-folding hinge assembly IHA accordance to an exemplary embodiment of the present disclosure, which is a cross-sectional view taken in a direction B-B' in FIG. 7A.

Figure 7D:
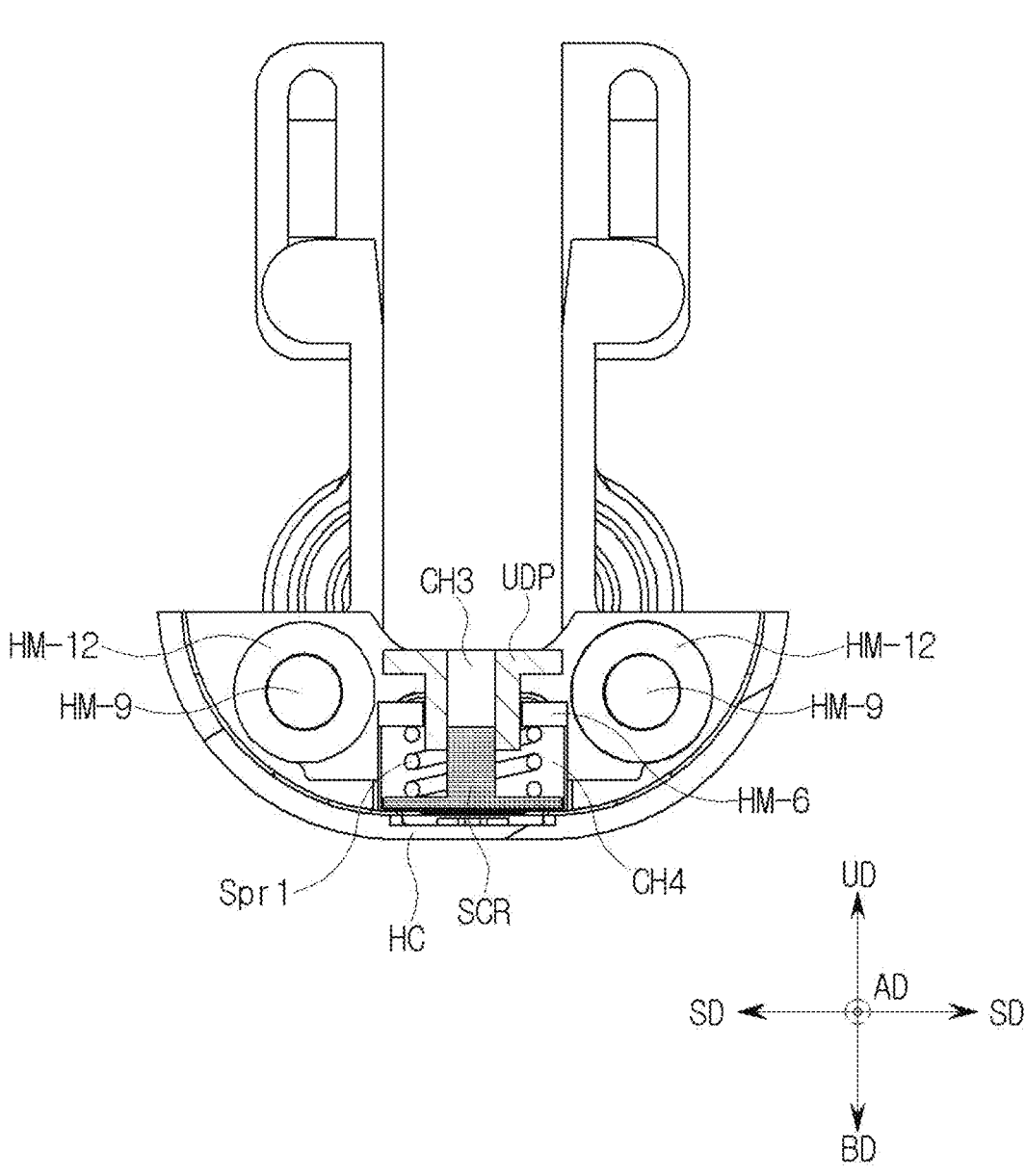
FIG. 7D is a view illustrating a folding state of an in-folding hinge assembly IHA accordance to an exemplary embodiment of the present disclosure, which is a cross-sectional view taken in a direction C-C' in FIG. 7A.

FIG. 7D is a view illustrating a folding state of an in-folding hinge assembly IHA accordance to an exemplary embodiment of the present disclosure, which is a cross-sectional view taken in a direction C-C' in FIG. 7A.

Figure 7E:
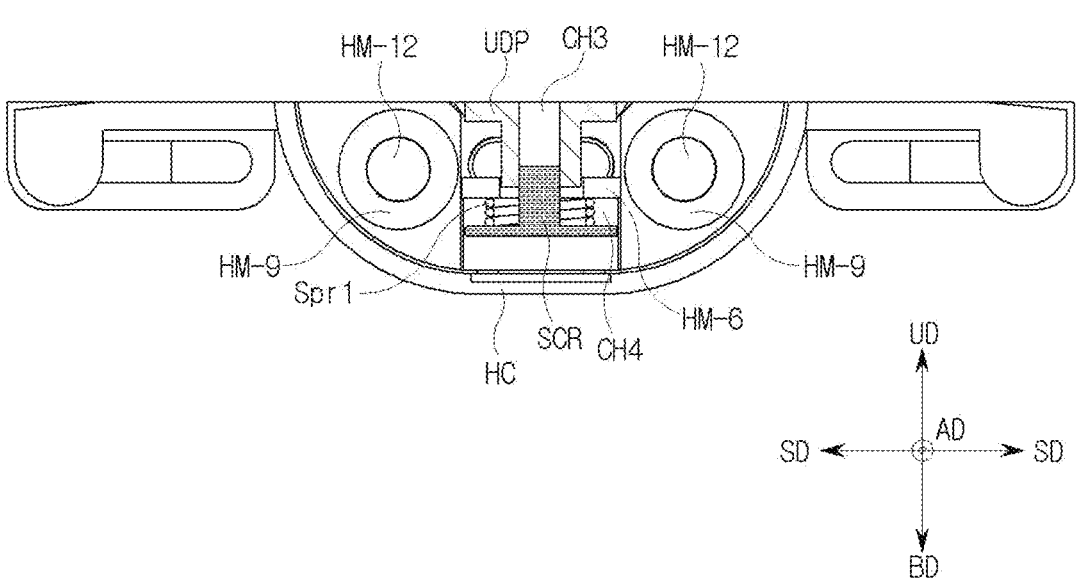
FIG. 7E is a view illustrating an unfolding state of an in-folding hinge assembly IHA accordance to an exemplary embodiment of the present disclosure, which is a cross-sectional view taken in a direction C-C' in FIG. 7A.

FIG. 7E is a view illustrating an unfolding state of an in-folding hinge assembly IHA accordance to an exemplary embodiment of the present disclosure, which is a cross-sectional view taken in a direction C-C' in FIG. 7A.

Referring to FIGS. 7A to 7E, an operation of the up-down plate UDP in the folding and unfolding states of the in-folding hinge assembly IHA according to an exemplary embodiment of the present disclosure will be described. For clarity of explanation, unnecessary components are omitted.

Referring to FIG. 7A, the hinge cover HC is illustrated, and the shaft bottom HM-6 is seated inside the hinge cover HC. The pair of lift washers HM-7 is disposed inside the shaft bottom HM-6. The lift washer HM-7 may support the up-down plate UDP. The up-down plate UDP includes the fastening hole CH3 (see FIG. 4B), and the shaft bottom HM-6 includes the fastening hole CH4 (see FIG. 4B). The fastening hole CH3 and the fastening hole CH4 are coupled to each other, and at this time are coupled by the spring Spr1 (see FIG. 4B) and the fixing screw SCR (see FIG. 4B). The up-down plate UDP is coupled to the shaft bottom HM-6 so that the up-down plate UDP may ascend and descend. The cut line B-B' to mark the cross section is a line cutting the lift washer HM-7. The cut line C-C' for indicating the cross section is a line cutting through the fastening holes CH3 and CH4.

Referring to FIG. 7B, the shaft bottom HM-6 is seated inside the hinge cover HC. The pair of lift washers HM-7 is illustrated. Each of the pair of lift washers HM-7 includes a lift protrusion LB. For illustrative purposes, the lift washer HM-7 may have a substantially circular outer circumferential surface and a polygonal inner circumferential surface. Accordingly, the opening OP5 of the lift washer HM-7 may have a polygonal shape, for example, the opening OP5 of the lift washer HM-7 may have a regular polygonal shape, or may have a polygonal shape consisting of a plurality of straight lines and a plurality of curve lines, but not limited thereto. The lift protrusion LB is a protruding shape formed on the outer circumferential surface of the lift washer HM-7. The outer circumferential surface of the lift washer HM-7 partially has a larger radius due to the lift protrusion LB. The pair of lift washers HM-7 is interlocked and rotated by the rotation of the pair of shafts HM-12. The outer circumferential surface of the pair of shafts HM-12 may have a polygonal shape corresponding to the inner circumferential surface of the pair of lift washers HM-7. In the folding state, the lift protrusion LB may be positioned to face the downward direction BD. The lift protrusion LB does not contact the up-down plate UDP.

Referring to FIG. 7C, the shaft bottom HM-6 is seated inside the hinge cover HC. In the unfolding state, the pair of shafts HM-12 rotates in the direction of R3. As the pair of shafts HM-12 rotates, the pair of lift washers HM-7 also rotates in the R3 direction. Due to the rotation of the pair of lift washers HM-7, the lift protrusion LB comes into contact with the up-down plate UDP to raise the up-down plate UDP.

Referring to FIGS. 7D and 7E, the shaft bottom HM-6 is seated inside the hinge cover HC. The shaft bottom HM-6 includes the fastening hole CH4. The fastening hole CH4 may be an empty space. The up-down plate UDP is disposed on the upper portion of the shaft bottom HM-6. The up-down plate UDP includes the fastening hole CH3. The fastening hole CH3 and the fastening hole CH4 may have a cylindrical shape. The diameter of the fastening hole CH3 may be smaller than that of the fastening hole CH4. Accordingly, the fastening hole CH3 may have a shape passing through the fastening hole CH4.

The fixing screw SCR is disposed inside the fastening hole CH4 of the shaft bottom HM-6. The fixing screw SCR may be fastened to the up-down plate UDP. For illustrative purposes, a screw thread may be formed on an inner circumferential surface of the fastening hole CH3 of the up-down plate UDP, and the fixing screw SCR may be a screw with a screw thread. When the fixing screw SCR rotates, the fixing screw SCR may be screwed into the fastening hole CH3. Accordingly, when the up-down plate UDP ascends or descends, the fixing screw SCR ascends or descends together with the up-down plate UDP. The spring Spr1 is disposed inside the fastening hole CH4. One end of the spring Spr1 is fixed to the shaft bottom HM-6 and the other end of the spring Spr1 is fixed to the fixing screw SCR.

The pair of shafts HM-12 may pass through the plurality of disc springs HM-9.

Referring to FIG. 7D, when the display apparatus 10 is folded, the up-down plate UDP may descend. When the up-down plate UDP descends, the fixing screw SCR also descends. Accordingly, the spring Spr1 is in a relaxed state. Referring to FIG. 7E, when the display apparatus 10 is unfolded, the up-down plate UDP may ascend. When the up-down plate (UDP) ascends, the fixing screw SCR also ascends. Accordingly, the spring Spr1 is in a contracted state. That is, as the spring Spr1 is in a contracted state (i.e., the display apparatus is in an unfolding state) and is in a relaxed state (i.e., the display apparatus is in a folding state), the spring Spr1 may naturally apply a force to lower the up-down plate UDP.

The up-down plate UDP is disposed in the folding area FA of the display apparatus 10 (see FIGS. 3 and 4D). The up-down plate UDP descends in the folding state but ascends in the unfolding state. When the up-down plate UDP ascend, it may support the panel assembly PNLA thereon. When the display apparatus 10 repeats folding and unfolding operations, in particular, wrinkles are generated in the folding area FA in an unfolding state, which is visually recognized by a user. In addition, wrinkles in the folding area FA may cause discomfort in a user's touch operation or pencil input operation. According to the present disclosure, folding wrinkles may be improved by raising and supporting the panel assembly PNLA in an unfolding state by the up-down plate UDP.

In addition, the up-down plate UDP is connected to the fixing screw SCR. The fixing screw SCR is connected to the spring Spr1. When the fixing screw SCR descends during folding, the spring Spr1 relaxes, so that the up-down plate UDP may descend smoothly.

Figure 7F:
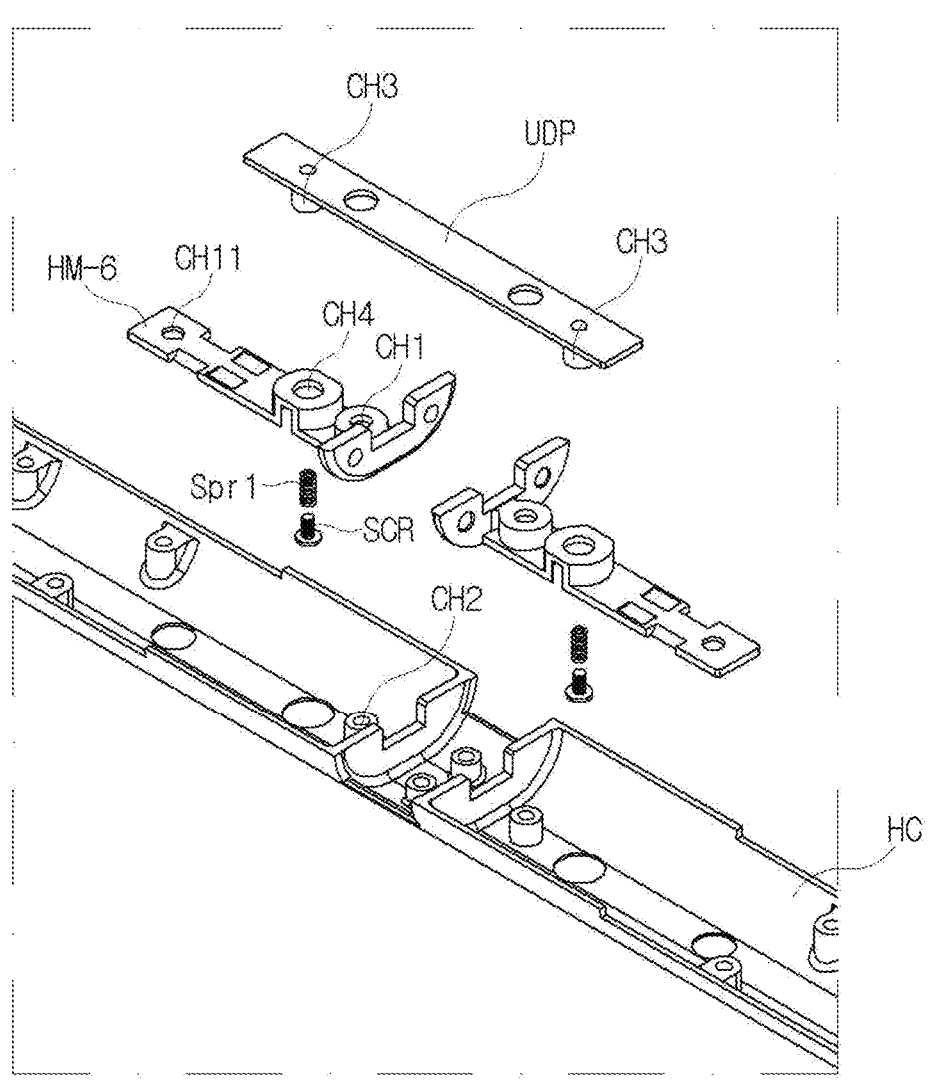
FIG. 7F is a perspective view illustrating a coupling of an up-down plate UDP, a shaft bottom HM-6, and a hinge cover HC according to an exemplary embodiment of the present disclosure.
Figure 7F:
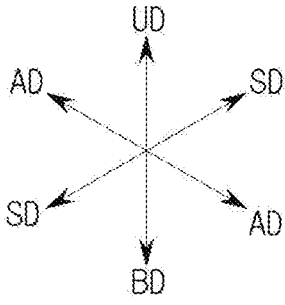

FIG. 7F is a perspective view illustrating a coupling of an up-down plate UDP, a shaft bottom HM-6, and a hinge cover HC according to an exemplary embodiment of the present disclosure.

Figure 7G:
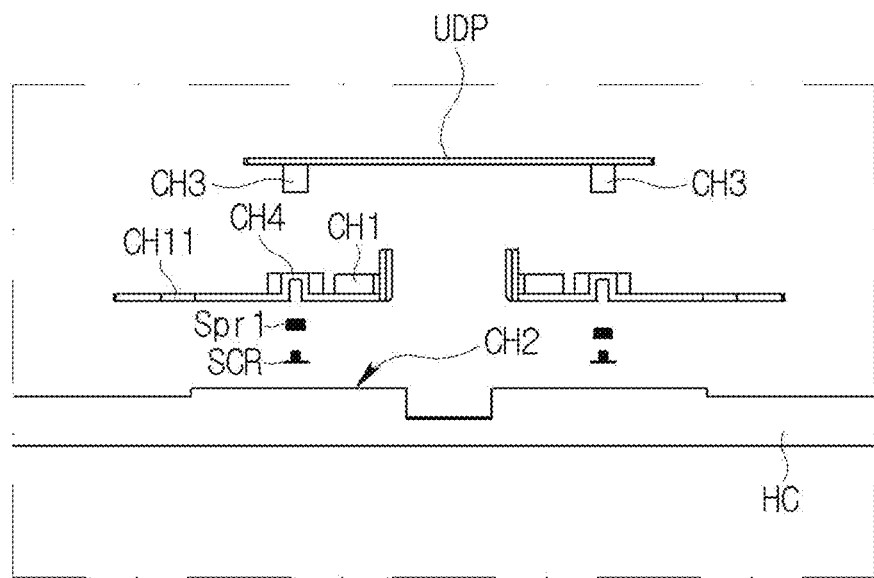
FIG. 7G is a cross-sectional view illustrating a coupling of an up-down plate UDP, a shaft bottom HM-6, and a hinge cover HC according to an exemplary embodiment of the present disclosure.
Figure 7G:
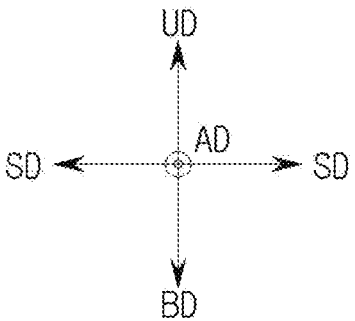

FIG. 7G is a cross-sectional view illustrating a coupling of an up-down plate UDP, a shaft bottom HM-6, and a hinge cover HC according to an exemplary embodiment of the present disclosure.

The coupling of the up-down plate UDP, shaft bottom HM-6, and hinge cover HC will be described with reference to FIGS. 7F and 7G.

Referring to FIGS. 7F and 7G, the up-down plate UDP includes the fastening hole CH3 formed in the downward direction BD. As illustrated, the up-down plate UDP may illustratively include two fastening holes CH3, but the number of the fastening holes CH3 is not limited thereto.

The shaft bottom HM-6 is disposed in the downward direction BD of the up-down plate UDP. The shaft bottom HM-6 includes the plurality of fastening holes CH1, CH4, CH11. As illustrated, one shaft bottom HM-6 illustratively includes one fastening hole CH1, one fastening hole CH4 and one fastening hole CH11. The fastening hole CH1 is a hole for fixing the shaft bottom HM-6 to the hinge cover HC. The fastening hole CH4 is a hole for coupling the shaft bottom HM-6 and the up-down plate UDP to each other. The fastening hole CH11 is a hole for coupling the shaft bottom HM-6 and the wing bottom HM-2 (see FIG. 5C) to each other. The numbers of each of the fastening holes CH1, CH4, CH11 is not limited thereto.

The hinge cover HC is disposed in the downward direction BD of the shaft bottom HM-6. The hinge cover HC includes the fastening hole CH2. As illustrated, the hinge cover HC includes one fastening hole CH2.

The spring Spr1 and the fixing screw SCR are disposed between the lower portion of the shaft bottom HM-6 and the hinge cover HC. Specifically, the spring Spr1 and the fixing screw SCR are disposed to be inserted into the fastening hole CH4 of the shaft bottom HM-6 in the downward direction BD of the fastening hole CH4.

The fastening hole CH3 of the up-down plate UPD is fastened to the fastening hole CH4 of the shaft bottom HM-6. Specifically, the fastening hole CH3 is inserted into the fastening hole CH4. Each of the fastening hole CH3 and CH4 may have a cylindrical shape, but not limited thereto. The radius of the fastening hole CH3 may be smaller than the radius of the fastening hole CH4. Accordingly, the fastening hole CH3 may ascend and descend within the fastening hole CH4.

The fixing screw SCR may be fastened to the up-down plate UDP. For illustrative purposes, a screw thread may be formed on an inner surface of the fastening hole CH3 of the up-down plate UDP, and the fixing screw SCR may be a screw with a screw thread. While being rotated, the fixing screw SCR may be screwed into the fastening hole CH3. Therefore, when the up-down plate UDP ascends and descends, the fixing screw SCR ascends or descends in association with the up-down plate UDP.

One end of the spring Spr1 is fixed to the shaft bottom HM-6 and the other end of the spring Spr1 is connected to the fixing screw SCR. When the display apparatus 10 is folded, the up-down plate UDP may descend. When the up-down plate UDP descends, the fixing screw SCR also descends together with the up-down plate UDP. Accordingly, the spring Spr1 is in a relaxed state. When the display apparatus 10 is unfolded, the up-down plate UDP ascends. When the up-down plate UDP ascends, the fixing screw SCR also ascends together with the up-down plate UDP. Accordingly, the spring Spr1 is in a contracted state.

That is, as the spring Spr1 is in a relaxed state and a contracted state, the up-down plate UDP descend s and ascends, such that the display apparatus 10 is in a folded state and an unfolded state.

The fastening hole CH1 of the shaft bottom HM-6 and the fastening hole CH2 of the hinge cover HC are coupled to each other. Accordingly, the shaft bottom HM-6 may be fixed to the inner accommodation space of the hinge cover HC through the fastening holes CH1 and CH2. The fastening hole CH11 of the shaft bottom HM-6 is a hole for coupling with the wing bottom HM-2 (see FIG. 5C).

Figure 8A:
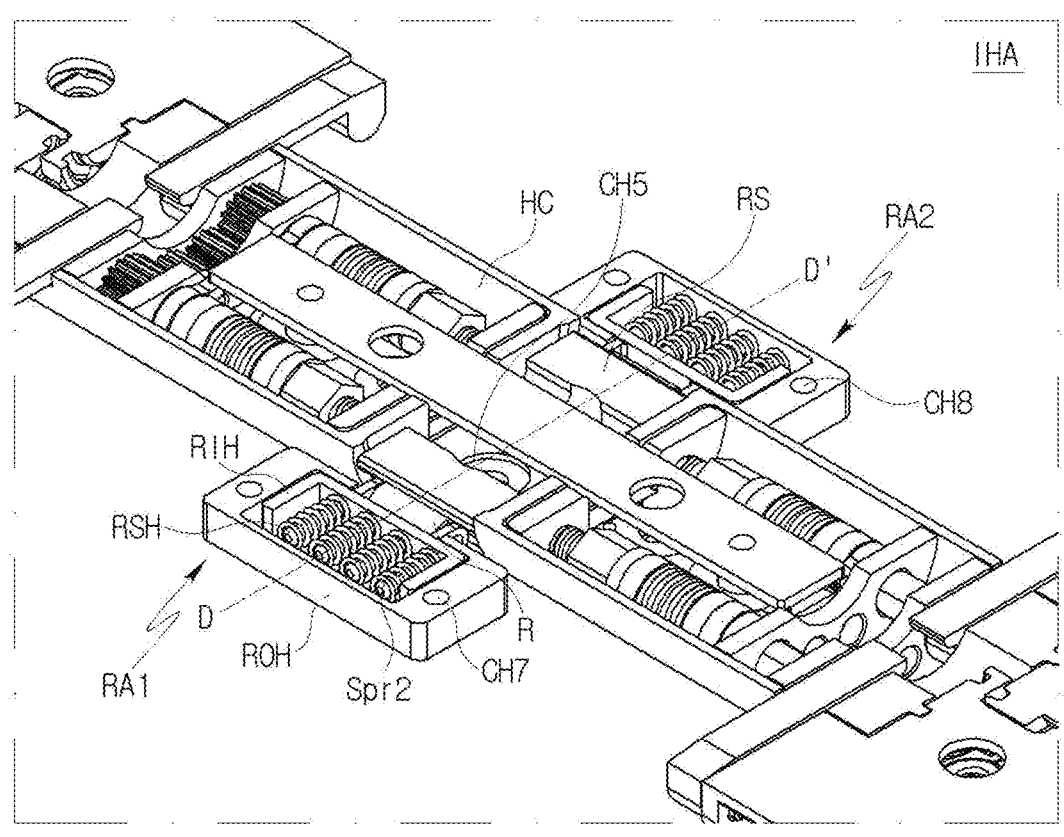
FIG. 8A is a perspective view illustrating a portion of an in-folding hinge assembly IHA according to an exemplary embodiment of the present disclosure.
Figure 8A:
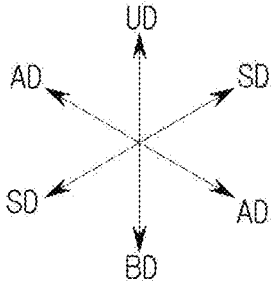

FIG. 8A is a perspective view illustrating a portion of an in-folding hinge assembly IHA according to an exemplary embodiment of the present disclosure.

Figure 8B:
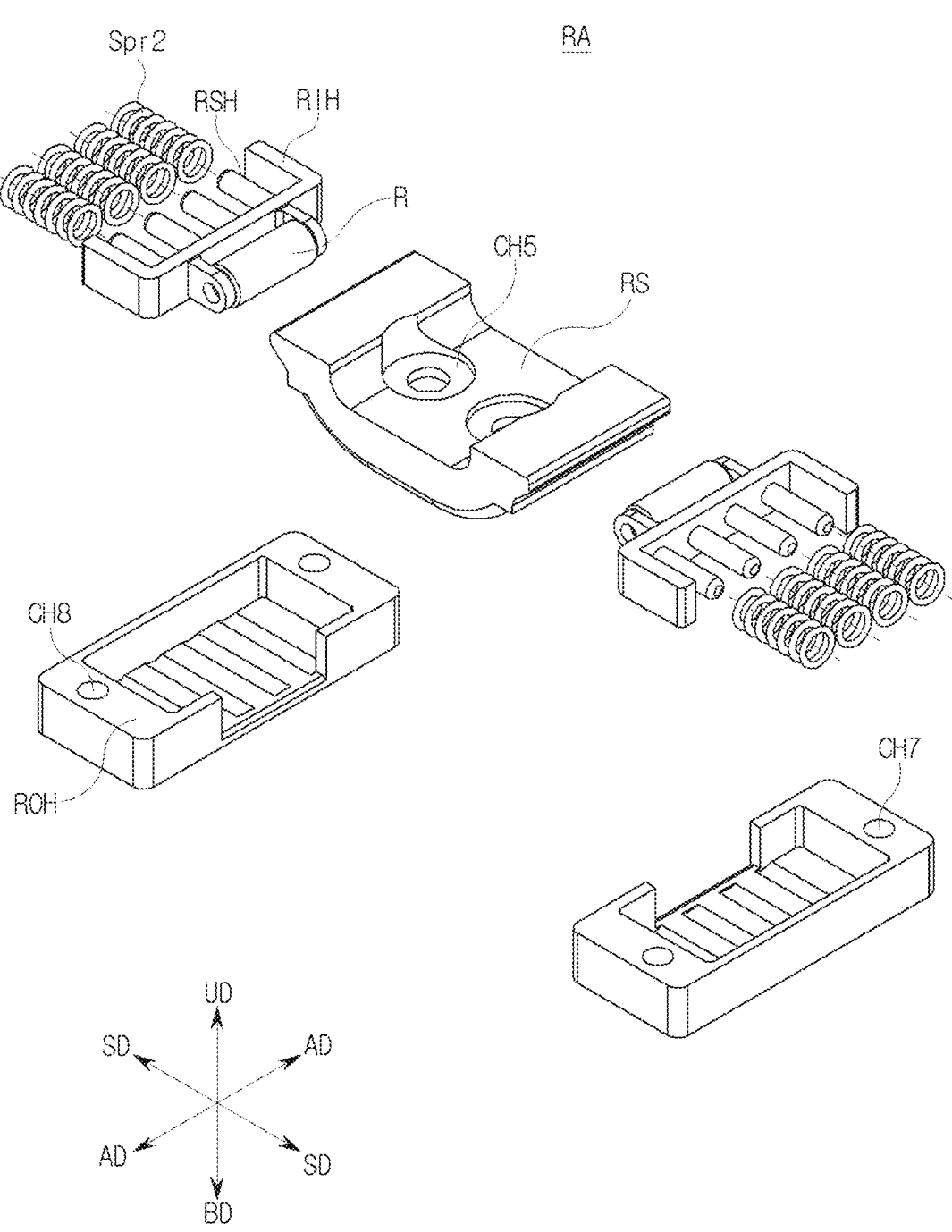
FIG. 8B is a perspective view illustrating an exploded state of a roller assembly RA and a roller stopper RS according to an exemplary embodiment of the present disclosure.

FIG. 8B is a perspective view illustrating an exploded state of a roller assembly RA and a roller stopper RS according to an exemplary embodiment of the present disclosure.

Figure 8C:
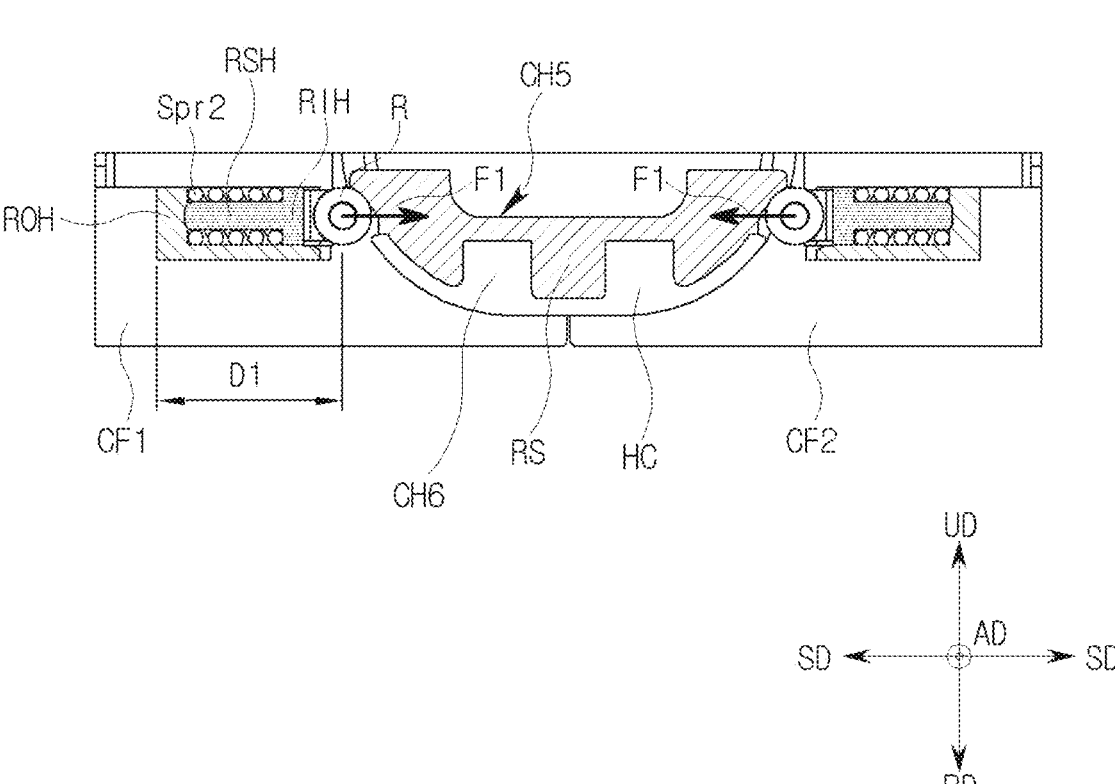
FIG. 8C is a view illustrating an unfolding state of an in-folding hinge assembly IHA according to an exemplary embodiment of the present disclosure, which is a cross-sectional view taken in a direction D-D' in FIG. 8A.

FIG. 8C is a view illustrating an unfolding state of an in-folding hinge assembly IHA according to an exemplary embodiment of the present disclosure, which is a cross-sectional view taken in a direction D-D' in FIG. 8A.

Figure 8D:
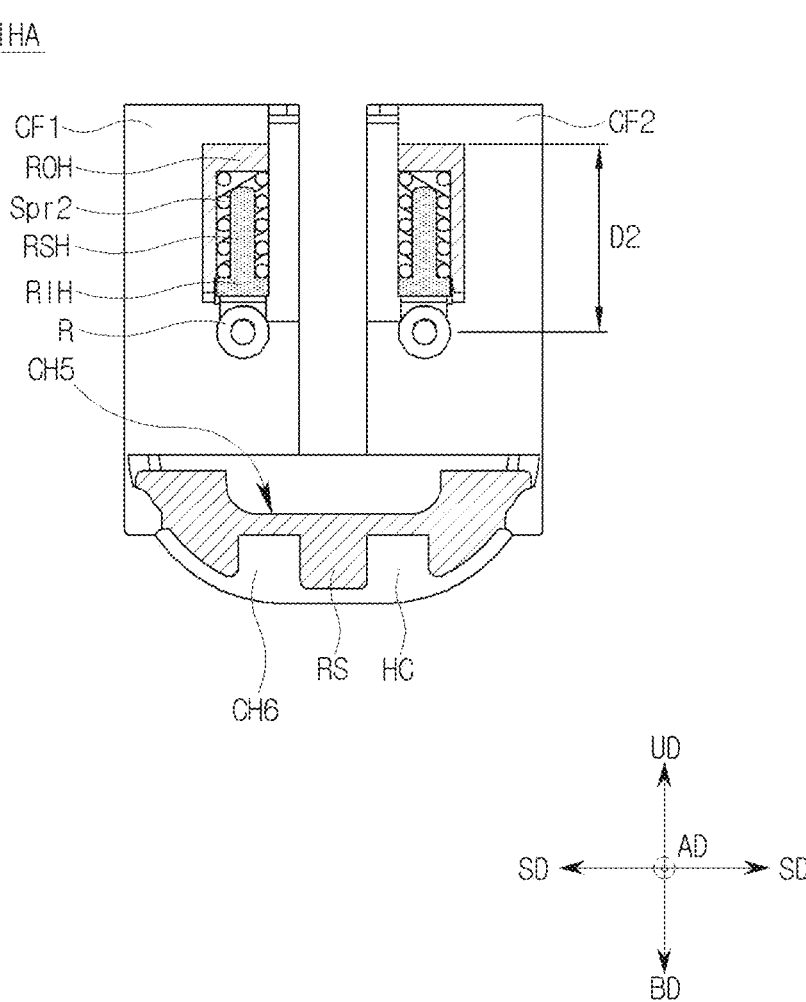
FIG. 8D is a view illustrating a folding state of an in-folding hinge assembly IHA according to an exemplary embodiment of the present disclosure, which is a cross-sectional view taken in a direction D-D' in FIG. 8A.

FIG. 8D is a view illustrating a folding state of an in-folding hinge assembly IHA according to an exemplary embodiment of the present disclosure, which is a cross-sectional view taken in a direction D-D' in FIG. 8A.

Referring to FIGS. 8A to 8D, operations in the folding and unfolding states of the roller assembly RA and roller stopper RS according to an exemplary embodiment of the present disclosure will be described. For clarity of explanation, unnecessary components are omitted.

Referring to FIG. 8A, the hinge cover HC is illustrated, and the roller stopper RS is seated inside the hinge cover HC. The roller stopper RS includes the fastening hole CH5. The hinge cover HC includes the fastening hole CH6 (see FIG. 4B). The fastening hole CH5 and the fastening hole CH6 may be coupled to each other, and thus, the roller stopper RS may be fixed in the inner accommodation space of the hinge cover HC. As illustrated, each of the fastening hole CH5 and the fastening hole CH6 may be illustratively two, but the number of each of the fastening hole CH5 and the fastening hole CH6 is not limited thereto.

As illustrated, a pair of roller assemblies RA1 and RA2 may be disposed for one roller stopper RS. Each of the pair of roller assemblies RA1 and RA2 may be disposed at symmetrical positions with respect to the axial direction AD. Each of the pair of roller assemblies RA1 and RA2 may have the same and symmetrical shapes.

The roller assembly RA includes a roller R, an inner housing RIH, an outer housing ROH, a spring Spr2 and a spring holder RSH.

The roller R may be a cylindrical roller having a length in the axial direction AD. The roller R may rotate about a rolling axis. The rolling axis is in the same direction as the axial direction AD. The outer circumferential surface of the roller R may contact the side surface of the roller stopper RS in an unfolding state, and may not contact the side surface of the roller stopper RS in a folding state. The roller R may be formed of a material having elasticity. For example, the roller R may be formed of rubber or elastic foam. If the roller R is formed of a material having elasticity, its adhesive force may be strengthened when the roller R contacts the roller stopper RS.

The roller R is fixed to the inner housing RIH. When the inner housing RIH moves, the roller R moves along with the movement of inner housing RIH.

The inner housing RIH and the outer housing ROH are disposed in the side direction SD of the roller R. The inner housing RIH may be inserted into the outer housing ROH, and the outer housing ROH may surround the inner housing RIH. The inner housing RIH may reciprocate in the side direction SD inside the outer housing ROH. For example, the length of the inner housing RIH in the side direction SD is shorter than the length of the outer housing ROH in the side direction SD.

The outer housing ROH includes fastening holes CH7 and CH8. As illustrated, two fastening holes CH7 and two fastening holes CH8 may be formed as an exemplary number, but the number of each of fastening holes CH7 and CH8 is not limited thereto. Although not illustrated, the cover frame CF (see FIG. 3) includes a fastening hole corresponding to the fastening hole CH7 and a fastening hole corresponding to the fastening hole CH8. The roller assembly RA may be coupled to the cover frame CF through the fastening holes CH7 and CH8. The roller assembly RA1 disposed on one side may be coupled to the first cover frame CF1 (see FIG. 3) through the fastening hole CH7. The roller assembly RA2 disposed on the other side may be coupled to the second cover frame CF2 (see FIG. 3) through the fastening hole CH8.

A spring holder RSH is disposed inside the inner housing RIH. The spring holder RSH may be integral with the inner housing RIH. For example, the spring holder RSH may have a pillar shape from which the inner housing RIH protrudes. In addition, the spring holder RSH may be a pillar having a long shape in the side direction SD.

A spring Spr2 is inserted into the spring holder RSH. The spring Spr2 is not limited to that term and may be of another type having elasticity. The spring Spr2 may be disposed to have a length in the side direction SD. One side of the spring Spr2 contacts the outer housing ROH, and the other side of the spring Spr2 contacts the inner housing RIH. As described above, the length of the inner housing RIH in the side direction SD may be shorter than the length of the outer housing ROH in the side direction SD. Accordingly, the inner housing RIH may reciprocate inside the outer housing ROH.

The spring Spr2 may apply an elastic force to the reciprocating motion of the inner housing RIH. When the inner housing RIH moves and the distance between the roller R and the outer housing ROH becomes short, the spring Spr2 is in a contracted state. This state is the unfolding state described with reference to FIG. 8C.

When the inner housing RIH moves and the distance between the roller R and the outer housing ROH becomes large, the spring Spr2 is in a relaxed state. This state is the folding state described with reference to FIG. 8D.

On the other hand, in the present disclosure, the respective four spring holders RSH and the respective four springs Spr2 are illustrated as an exemplary number, but the numbers of spring holders RSH and springs Spr2 are not limited thereto, and the number of spring holders RSH corresponds to the number of springs Spr2.

Referring to FIG. 8C, the in-folding hinge assembly IHA is in an unfolding state. In the unfolding state, the first cover frame CF1 and the second cover frame CF2 are disposed to form 180 degrees from each other.

As described above, the outer housing ROH is fixed to the cover frames CF1 and CF2. Therefore, in the unfolding state, the outer housing ROH is fixed without moving in the side direction SD. The inner housing RIH is disposed within the outer housing ROH. The inner housing RIH may reciprocate in the side direction SD inside the outer housing ROH. The roller R is fixed to the inner housing RIH. Accordingly, the roller R reciprocates with the inner housing RIH. The spring Spr2 is inserted into the spring holder RSH. One side of the spring Spr2 contacts the outer housing ROH, and the other side of the spring Spr2 contacts the inner housing RIH. The spring Spr2 generates a force for the reciprocating motion of the inner housing RIH.

When the in-folding hinge assembly IHA is unfolded, the roller R contacts the roller stopper RS while being disposed in the side direction SD of the roller stopper RS. Since the roller stopper RS is fixed while the roller R is movable, the roller R moves in the direction of the outer housing ROH. Thus, the distance D1 between the roller R and the outer housing ROH is reduced. As the roller R moves, the inner housing RIH also moves in the direction of the outer housing ROH. Accordingly, the spring Spr2 contracts. When compared with the distance D2 described later with reference to FIG. 8D, the distance D1 is shorter than the distance D2.

When the spring Spr2 is contracted (i.e., compressed), the spring Spr2 generates a repulsive force F1. The repulsive force F1 is a force that compresses the roller R with the roller stopper RS. Due to the repulsive force F1, the display apparatus 10 may be more firmly fixed in the unfolding state. Also, the display apparatus 10 may implement a substantially perfect plane in an unfolding state. In addition, the above-described up-down plate UDP (see FIG. 7A) may be further raised. Accordingly, it is possible to completely remove folding wrinkles that may occur in the folding area FA (see FIG. 3).

Referring to FIG. 8D, the in-folding hinge assembly IHA is in a folding state. In the folding state, the first cover frame CF1 and the second cover frame CF2 are disposed to face each other.

As described above, the outer housing ROH is fixed to the cover frames CF1 and CF2. Therefore, in the folding state, the outer housing ROH is fixed without moving in the upward direction UD and the downward direction BD. The inner housing RIH is disposed within the outer housing ROH. The inner housing RIH may reciprocate in the upward direction UD and the downward direction BD within the outer housing ROH. The roller R is fixed to the inner housing RIH. Accordingly, the roller R reciprocates with the inner housing RIH. The spring Spr2 is inserted into spring holder RSH. One side of the spring Spr2 contacts the outer housing ROH, and the other side of the spring Spr2 contacts the inner housing RIH. The spring Spr2 generates a force for the reciprocating movement of the inner housing RIH.

When the in-folding hinge assembly IHA is folded, the roller R is disposed in the upward direction UD of the roller stopper RS and does not contact the roller stopper RS. Thus, the spring Spr2 relaxes. When the spring Spr2 is relaxed, the spring Spr2 moves the inner housing RIH in the downward direction BD. Accordingly, the distance D2 between the outer housing ROH and the roller R is greater than distance D1 in the unfolding state.

As described above, when the in-folding hinge assembly IHA is unfolded, the spring Spr2 contracts, the distance between the roller R and the outer housing ROH is D1, the display apparatus 10 is in the unfolding state. When the in-folding hinge assembly IHA is folded, the spring Spr2 relaxes, the distance between the outer housing ROH and the roller R is D2, which is greater than the distance D1, the display apparatus 10 is in the folding state.

Figure 8E:
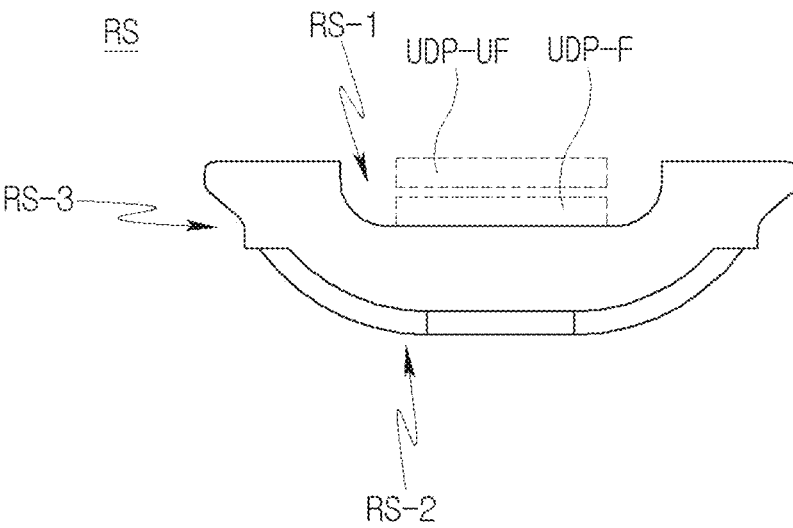
FIG. 8E is a front view illustrating a roller stopper RS according to an exemplary embodiment of the present disclosure.
Figure 8E:
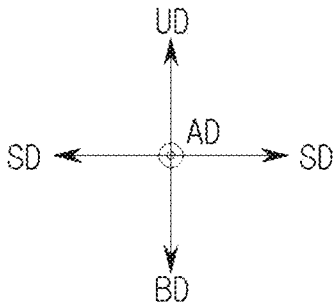

FIG. 8E is a front view illustrating a roller stopper RS according to an exemplary embodiment of the present disclosure. For clarity of explanation, the components illustrated are illustrated in a more enlarged state compared to other figures.

Referring to FIG. 8E, the roller stopper RS includes a concave portion RS-1 on a surface in the upward direction UD. The up-down plates UDF-UF and UDP-F may be disposed in the concave portion RS-1. The up-down plates UDP-UF and UDP-F may ascend in the upward direction UD or descend in the downward direction BD from the inside of the concave portion RS-1. To this end, the height of the concave portion RS-1 may be higher than that of sum of the up-down plates UDP-UF and UDP-F.

In an unfolding state, the up-down plate UDP-UF may be positioned relatively high within the concave portion RS-1. A surface of the up-down plate UDP-UF in the upward direction UD may be substantially the same as a surface of the roller stopper RS in the upward direction UD.

In the folding state, the up-down plate UDP-F may be positioned relatively low in the concave portion RS-1. The surface of the up-down plate UDP-F in the upward direction UD may be lower than the surface of the roller stopper RS in the upward direction UD.

The roller stopper RS includes a convex portion RS-2 on the surface in the downward direction BD. The convex portion RS-2 may have, for example, a half cylinder shape, but not limited thereto. The convex portion RS-2 may have a shape corresponding to the hinge cover HC (see FIG. 4B).

In addition, the hinge cover HC may include the fastening hole CH6 (see FIG. 4B), and the roller stopper RS may include the fastening hole CH5 (see FIG. 4C). The hinge cover HC and the roller stopper RS may be coupled to each other through the fastening holes CH5 and CH6. Specifically, the roller stopper RS may be fixed to the hinge cover HC.

The roller stopper RS includes an inclined portion RS-3 in the surface in the side direction SD. As described above with reference to FIGS. 8C and 8D, in the folding state, the roller R is disposed in the upward direction UD of the roller stopper RS, but in the unfolding state, the roller R is disposed in the side direction SD of the roller stopper RS. When switching from a folding state to an unfolding state, the roller R may move along the inclined portion. Therefore, natural movement of the roller R is possible. Conversely, natural movement of the roller R is possible even when switching from the unfolding state to the folding state. Due to the natural movement of the roller R, it is possible to smoothly switch between the folding state and unfolding state of the display apparatus 10.

Figure 9:
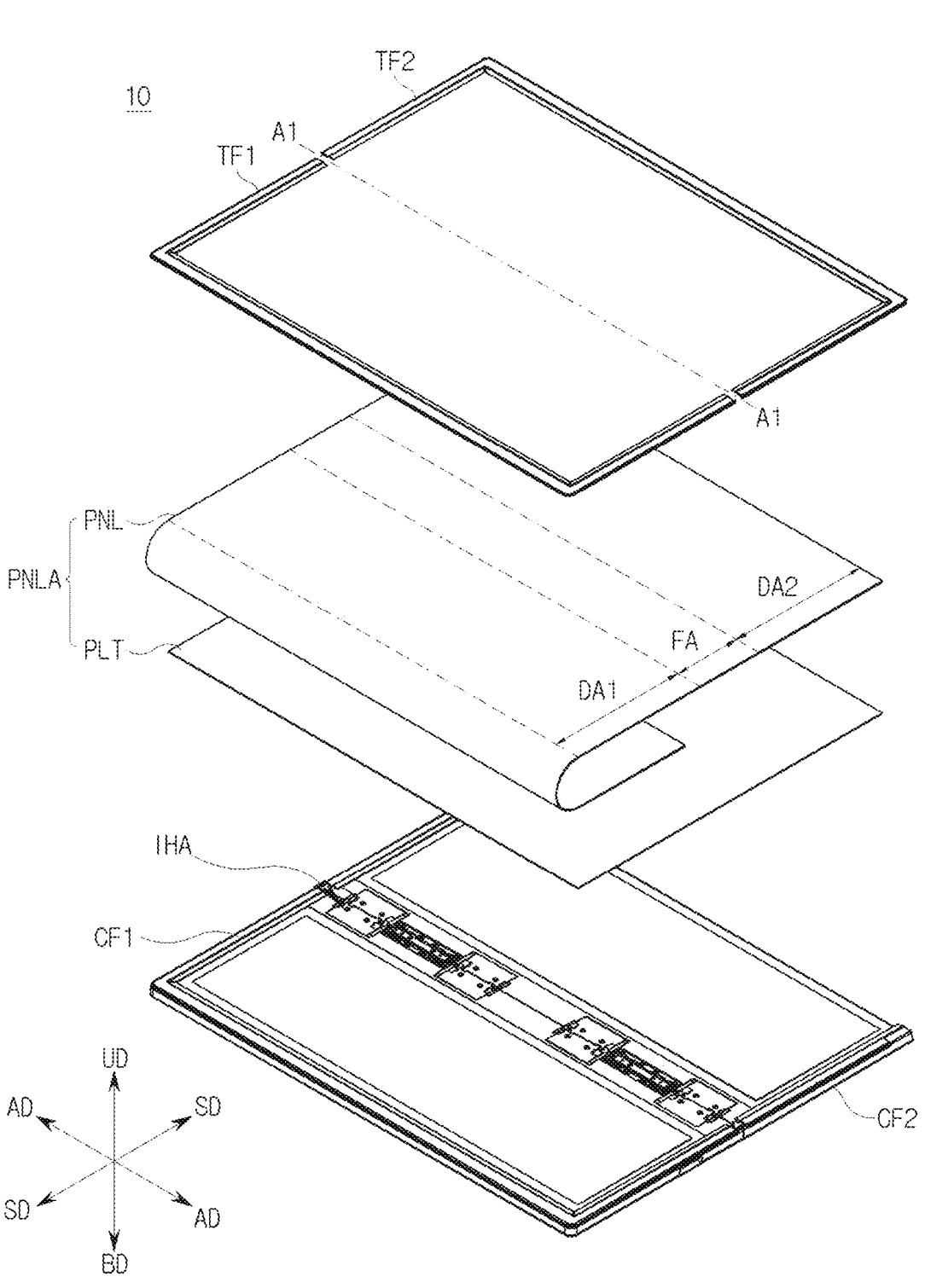
FIG. 9 is an exploded perspective view of a display apparatus 10 according to another embodiment of the present disclosure.

FIG. 9 is an exploded perspective view of a display apparatus 10 according to another embodiment of the present disclosure.

The display apparatus 10 illustrated in FIG. 9 may include a configuration corresponding to the display apparatus 10 described above with reference to FIG. 3 and the like. Components defined by the same terms and components indicated using the same reference numerals may correspond to each other. In describing other embodiments of the present disclosure, descriptions overlapping with those described above may be omitted within a necessary range.

In the present disclosure, a direction along the folding axis A1 in which the display apparatus 10 is folded is defined as an axial direction AD. A direction starting from the first display area DA1, passing through the folding area FA and arriving at the second display area DA2 in the display apparatus 10 is defined as a side direction SD. A direction in which the panel PNL of the display apparatus 10 faces is defined as an upward direction UD. A direction opposite to the upward direction UD is defined as a downward direction BD.

The top frame TF is disposed at the top of the display apparatus 10 in the upward direction UD. The top frame TF includes a first top frame TF1 disposed on one side of the folding axis A1 and a second top frame TF2 disposed on the other side of the folding axis A1. The top frame TF is disposed to cover the edge of the panel PNL. The top frame TF may protect the panel PNL from external impact. The top frame TF may form a bezel of the display apparatus.

The panel assembly PNLA is disposed on the lower portion of the top frame TF. The panel assembly PNLA includes a panel PNL and one or more plates PLTs. The panel PNL may include a flexible substrate, a circuit element layer disposed on the flexible substrate and including transistors, a light emitting layer disposed on the circuit element layer and including light emitting elements, an encapsulation layer disposed on the light emitting layer, and a touch layer disposed on the encapsulation layer or disposed inside the encapsulation layer. The panel PNL may include a first display area DA1, a folding area FA, and a second display area DA2.

A display element and various driving elements for driving the display element may be disposed in the first display area DA1 and the second display area DA2 of the panel PNL. For example, when the display apparatus 10 is an organic light emitting display apparatus, the display element may be configured by a light emitting diode including a first electrode, an organic layer, and a second electrode. Further, various driving elements for driving the display element, such as transistors, capacitors, or wiring lines may be disposed in the first display area DA1 and the second display area DA2. For example, the transistors may include switching transistors and driving transistors, the active layer of the switching transistor and the driving transistor may be formed of an oxide semiconductor material, an amorphous semiconductor material, a polycrystalline semiconductor material, or an organic semiconductor material, but the present disclosure is not limited thereto.

Further, Pixels PX for displaying images may be disposed in the first display area DA1 and the second display area DA2 of the panel PNL. Also, a plurality of gate lines GL and a plurality of data lines DL may be disposed in the first display area DA1 and the second display area DA2 of the panel PNL.

As illustrated, one end of the panel PNL may be bent. Specifically, the panel PNL is bent and the bent portion extends in the downward direction BD of the at least one plate PLT. An integrated circuit may be disposed on a portion of the panel PNL positioned below the at least one plate PLT in a chip on glass scheme. The integrated circuit may be electrically connected to the printed circuit board through a flat cable FFC or FPC. The technical spirit of the present disclosure is not limited to the chip on glass scheme. The integrated circuit may also be applied to other schemes of similar form (e.g., a chip on film scheme).

For example, one or more plates PLTs may include various plates disposed on the lower portion of the panel PNL to support the panel PNL. For example, the one or more plates may include a back plate to support the panel PNL, a top plate disposed on the lower portion of the back plate and formed of a SUS material, a bottom plate disposed on the lower portion of the top plate, formed with a pattern on a folding portion and formed of a SUS material, a heat dissipation sheet with heat dissipation function, and a middle plate to cover non-leveled planes due to various configurations of the hinge assembly.

The in-folding hinge assembly IHA is disposed on the lower portion of the folding area FA. The in-folding hinge assembly IHA may have a long shape along the axial direction AD. The in-folding hinge assembly IHA may perform folding and unfolding operations based on the folding axis A1.

The cover frame CF is a frame covering the side surface and lower surface of the display apparatus 10. An accommodation groove in which the in-folding hinge assembly IHA may be seated may be formed on the upper surface of the cover frame CF. The cover frame CF includes a first cover frame CF1 disposed on one side and a second cover frame CF2 disposed on the other side, based on the folding axis A1. The cover frame CF is coupled to the in-folding hinge assembly IHA. Therefore, when a folding operation is performed so that the first cover frame CF1 and the second cover frame CF2 face each other or an unfolding operation is performed so that the first cover frame CF1 and the second cover frame CF2 make an angle of 180 degrees to each other, the in-folding hinge assembly IHA is folded or unfolded so that the display apparatus 10 can be folded or unfolded.

Figure 10:
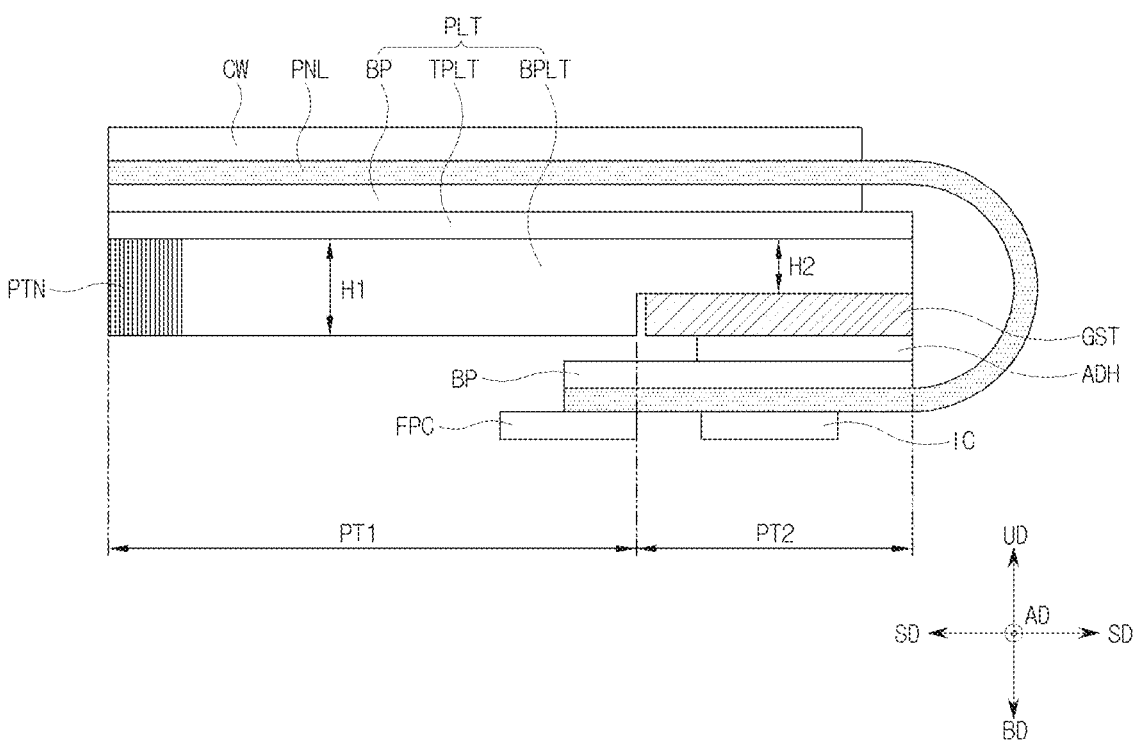
FIG. 10 is a cross-sectional view of a display apparatus 10 according to another embodiment of the present disclosure.

FIG. 10 is a cross-sectional view of a display apparatus 10 according to another embodiment of the present disclosure.

Figure 11:
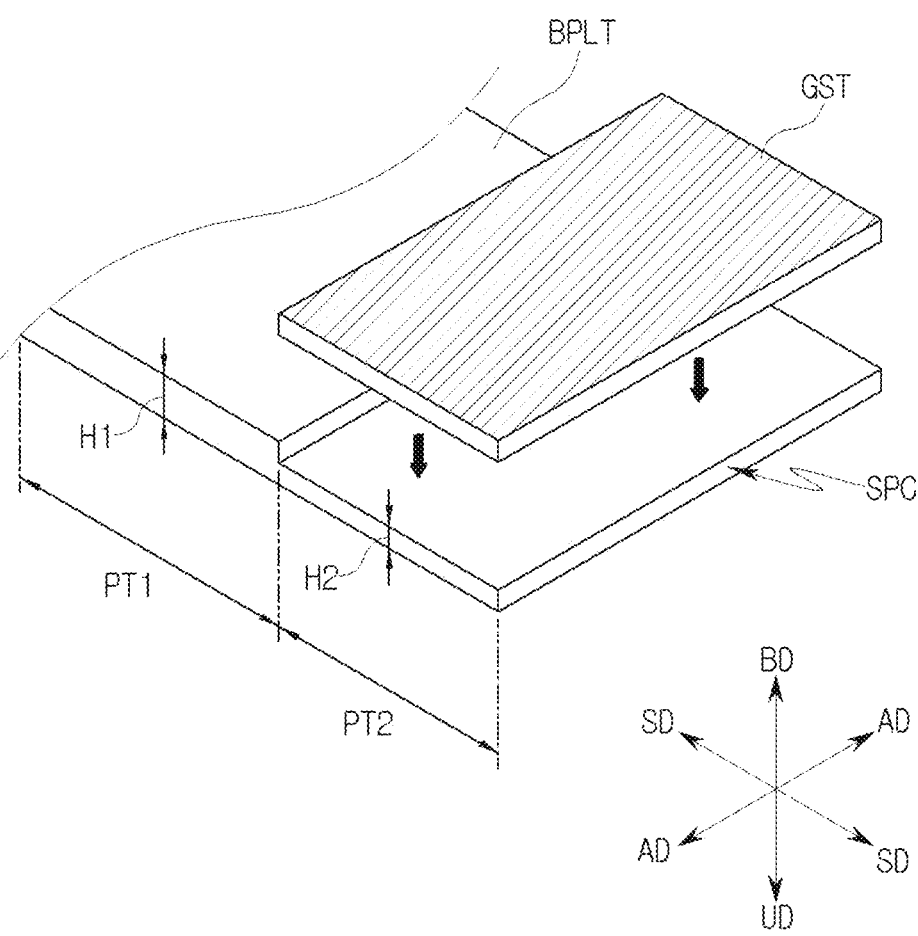
FIG. 11 is a perspective view of a display apparatus 10 according to another embodiment of the present disclosure.

FIG. 11 is a perspective view of a display apparatus 10 according to another embodiment of the present disclosure.

A display apparatus 10 according to another embodiment of the present disclosure will be described with reference to FIGS. 10 and 11. In describing other embodiments of the present disclosure, descriptions overlapping with those described above may be omitted within a necessary range. In addition, for clarity of description, embodiments may be illustrated or described with deletion of some components. Also, within a necessary range, embodiments may be illustrated or described with addition of some components.

Referring to FIG. 10, a cover window CW is disposed. The cover window CW may be formed of glass or plastic material. A recent foldable display apparatus adopts a cover window CW made of plastic or polymer material to secure flexibility. For example, the cover window CW is formed of a polymer, the polymer may be made of any one of polyimide (PI), polyethylene terephthalate (PET), acrylonitrile-butadiene-styrene copolymer (ABS), polymethyl methacrylate (PMMA), polyethylene naphthalate (PEN), polycarbonate (PC), polyethersulfone (PES), polyarylate (PAR), polysulfone (PSF), cyclic olefin copolymer (COC), triacetylcellulose (TAC), polyvinyl alcohol (PVA), polystyrene (PS) and the like, and the present disclosure is not limited thereto. In some cases, ultra-thin glass (UTG) is used to secure rigidity and increase transparency.

A panel PNL is disposed on the lower portion of the cover window CW. As illustrated, the panel PNL may have a bent end. The panel PNL may be formed of a flexible material.

One or more plates PLTs are disposed on the lower portion of the panel PNL. One or more plates PLT may include a back plate BP, a top plate TPLT, and a bottom plate BPLT.

The back plate BP may be formed of a relatively hard material to supplement the rigidity of the flexible panel PNL. For example, the back plate BP may be formed of a plastic material or a metal material.

The top plate TPLT is a plate for supplementing the rigidity of the panel PNL while supplementing the foldable characteristics of the display apparatus 10. The top plate TPLT may be formed of a plastic or metal material. For example, the top plate TPLT may be formed of a SUS material. The SUS material may be a stainless steel material.

The bottom plate BPLT is a plate for supplementing the rigidity of the panel PNL while supplementing the foldable characteristics of the display apparatus 10. The bottom plate BPLT may be formed of a plastic or metal material. The bottom plate BPLT may be formed of a SUS material. The bottom plate BPLT may be formed thicker than that of the top plate TPLT. In order to complement the folding characteristics of the bottom plate BPLT, the bottom plate BPLT may include a slit pattern PTN in a portion corresponding to the folding area FA (see FIG. 9).

The bottom plate BPLT may include a first part PT1 and a second part PT2. The first part PT1 is a portion of the bottom plate BPLT having a first height H1. The second part PT2 is a portion of the bottom plate BPLT having a second height H2. The first part PT1 and the second part PT2 may not be physically separated portions. The first part PT1 and the second part PT2 may refer to the portions of the bottom plate BPLT that are physically integral with each other. For example, the second part PT2 having the second height H2 may be formed by performing a half etching process on a portion of the heat dissipation sheet GST having the first height H1 as a whole.

An accommodation space SPC (see FIG. 11) may be formed in the bottom plate BPLT due to a height difference between the first part PT1 and the second part PT2. The heat dissipation sheet GST may be disposed in the accommodation space SPC.

The heat dissipation sheet GST may be a sheet that prevents the spread of heat. For example, the heat radiation sheet may be formed of a material having excellent heat resistance. The heat dissipation sheet GST may be a graphite sheet typically formed of a graphite material, but not limited thereto. As will be described later, the second part PT2 of the bottom plate BPLT may be an upper portion of a position where the integrated circuit IC is disposed. Heat is generated due to the operation of the integrated circuit IC. The panel PNL is positioned on the upper portion of the second part PT2. A large number of transistors and light emitting devices are disposed on the panel PNL. These transistors and light emitting devices are vulnerable to heat. Therefore, there is a need to prevent heat generated in the integrated circuit IC from being transferred to the panel PNL.

According to the present disclosure, heat directed toward the panel PNL may be blocked by disposing the heat dissipation sheet GST on the second part PT2, which is the upper portion of the integrated circuit IC.

Also, according to the present disclosure, the heat dissipation sheet GST is disposed in the second part PT2 where a step difference occurs due to its height. Accordingly, an increase in the thickness of the display apparatus 10 due to the attachment of the heat dissipation sheet GST may be prevented. If the height H2 of the second part PT2 is the same as the height H1 of the first part PT1, an increase in the height of the display apparatus 10 may be unavoidable due to the attachment of the heat dissipation sheet GST.

An adhesive member ADH is disposed on the lower portion of the heat dissipation sheet GST. The adhesive member ADH may serve to adhere the heat dissipation sheet GST and the back plate BP to each other. The adhesive member ADH may be, for example, a foam tape or a pressure sensitive adhesive PSA, but is not limited thereto.

The integrated circuit IC is disposed on the lower portion of the bent portion of the panel PNL. The integrated circuit IC may be formed using a chip on glass (COG) scheme. The integrated circuit IC may be, for example, a source driver. Alternatively, the integrated circuit IC may be a gate driver or a power control circuit. The integrated circuit IC may be positioned on the second part PT2 of the bottom plate BPLT.

A connector FPC is disposed on the lower portion of the bent portion of the panel PNL. One end of the connector FPC may be connected to the integrated circuit IC, and the other end of the connector FPC may be connected to a printed circuit board (not illustrated). Elements such as a timing controller and a memory for driving the display apparatus 10 may be disposed on the printed circuit board.

Referring to FIG. 11, the bottom plate BPLT is illustrated. The bottom plate BLPT may include the first part PT1 having a first height H1 and the second part PT2 having a second height H2. As described above, the second part PT2 may be a portion where the integrated circuit IC is located. Since the height of the second part PT2 is lower than that of the first part PT1, the accommodation space SPC may be formed in the second part. The heat dissipation sheet GST may be disposed in the accommodation space SPC.

Figure 12:
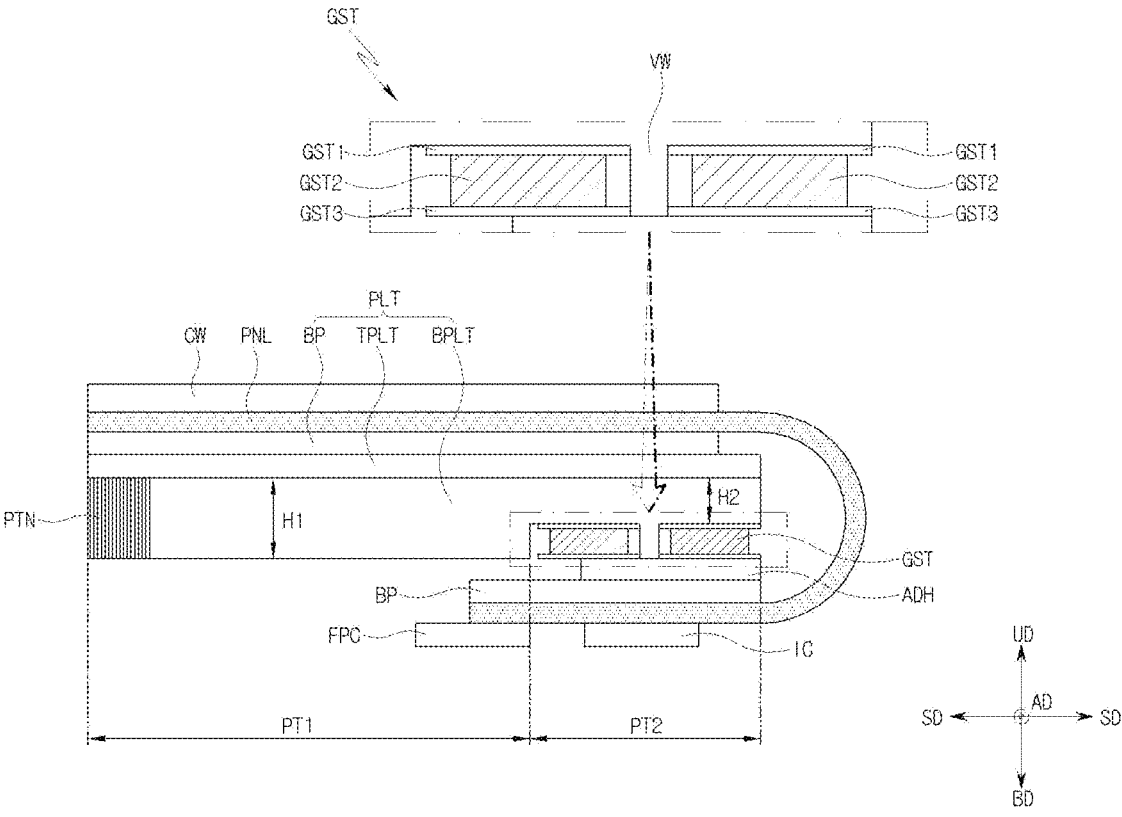
FIG. 12 is a cross-sectional view of a display apparatus 10 according to an exemplary embodiment of the present disclosure.

FIG. 12 is a cross-sectional view of a display apparatus 10 according to an exemplary embodiment of the present disclosure.

Figure 13:
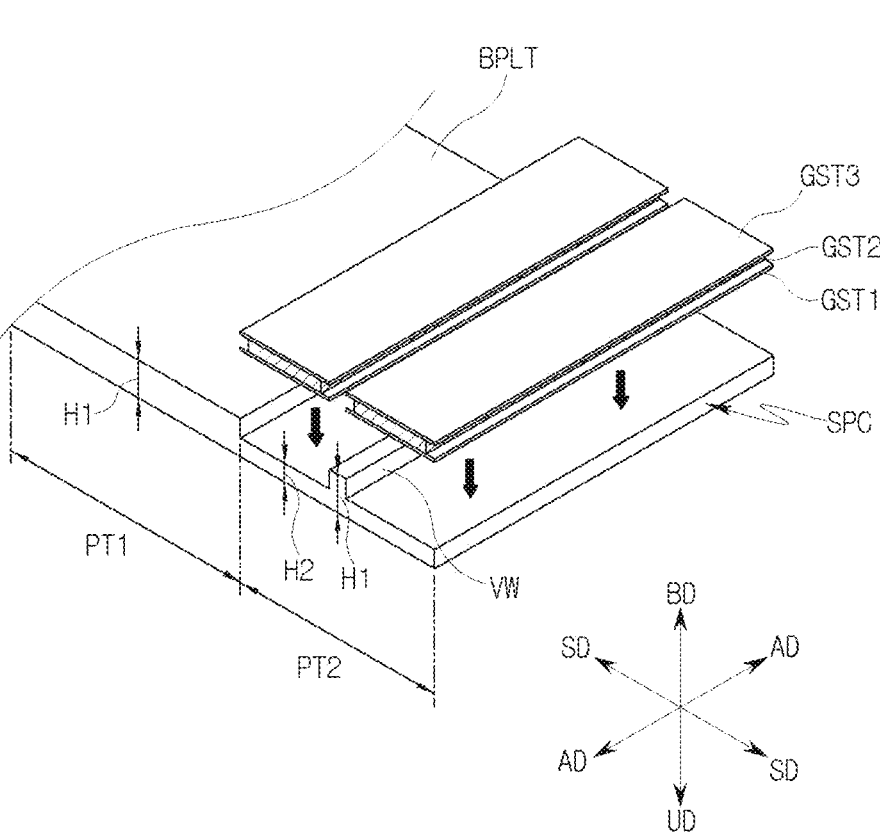
FIG. 13 is a perspective view of a display apparatus 10 according to an exemplary embodiment of the present disclosure.

FIG. 13 is a perspective view of a display apparatus 10 according to an exemplary embodiment of the present disclosure.

Figure 14:
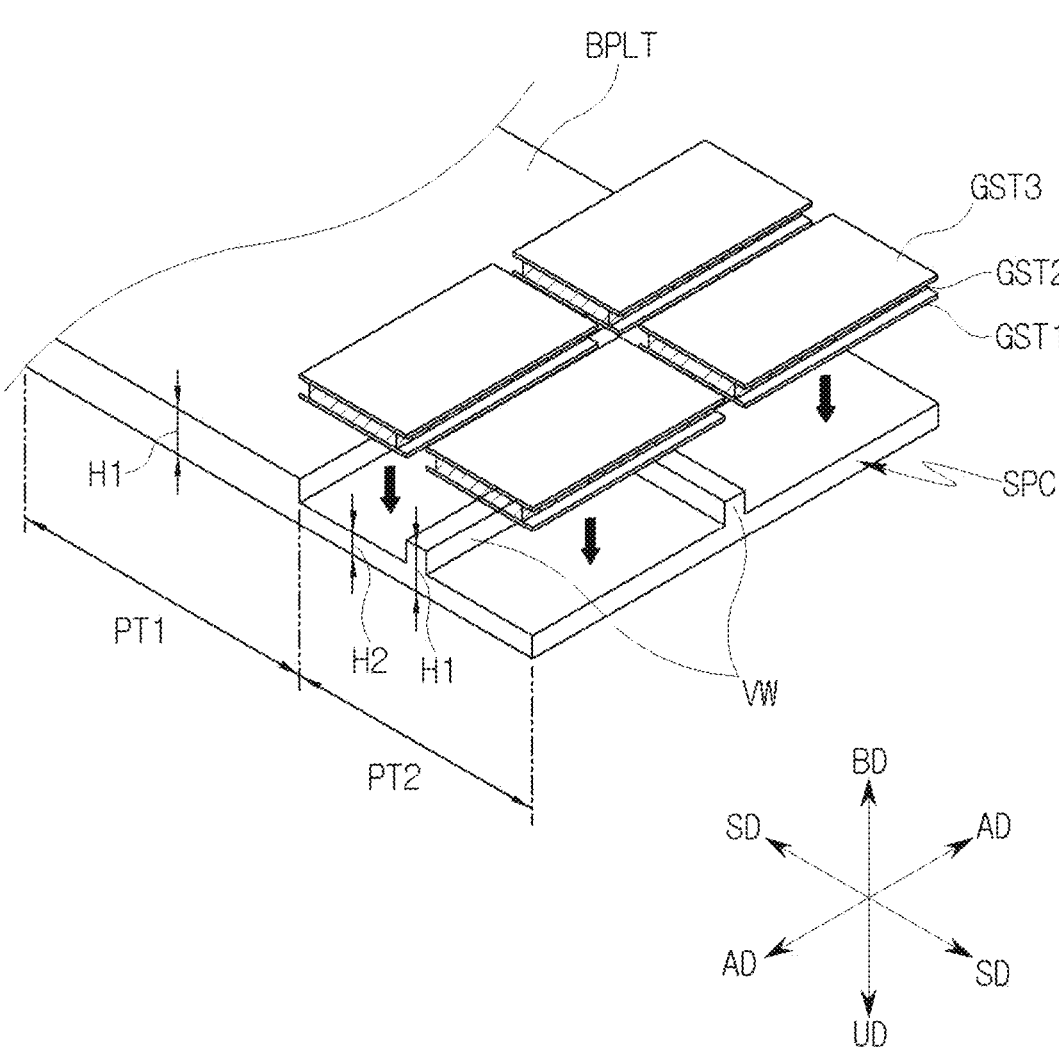
FIG. 14 is a perspective view of a display apparatus 10 according to an exemplary embodiment of the present disclosure.

FIG. 14 is a perspective view of a display apparatus 10 according to an exemplary embodiment of the present disclosure.

Referring to FIGS. 12 to 14, an exemplary embodiment of the present disclosure will be described. In describing the present embodiment, the same or similar figures and the same or similar reference numerals may refer to the same or similar configurations as those of the foregoing embodiment. For clarity of description, some components may be omitted. For clarity of description, some components may be added and illustrated or described.

Referring to FIG. 12, a cover window CW, a panel PNL, and one or more plates PLTs are disposed from an upward direction UD to a downward direction BD. One or more plates PLTs may include a back plate BP, a top plate TPLT, and a bottom plate BPLT. The bottom plate BPLT may include a slit pattern PTN in a portion corresponding to the folding area FA (see FIG. 9).

The bottom plate BPLT includes a first part PT1 and a second part PT2. The first part PT1 is a portion having a first height H1, and the second part PT2 is a portion having a second height H2. The second part PT2 is a portion where the integrated circuit IC is disposed.

A vertical wall VW is disposed on the second part PT2. The vertical wall VW may have a first height H1. Accordingly, the accommodation space SPC (see FIGS. 13 and 14) formed in the second part PT2 may be divided by the vertical wall VW.

As described above, the bottom plate BPLT serves to supplement rigidity to the flexible characteristics of the panel PNL. According to the present disclosure, the height H2 of the second part PT2 is reduced compared to the height of the first part PT1. Accordingly, the rigidity of the bottom plate BPLT may be weakened at the second part PT2. The vertical wall VW may be formed in the second part PT2 to compensate for the weakened rigidity. The vertical wall VW may be formed by omitting an etching process for a portion corresponding to the vertical wall VW in the half etching process described above.

A heat dissipation sheet GST is disposed on the second part PT2. Referring to an enlarged portion of the heat dissipation sheet GST, the heat dissipation sheet GST may include a first adhesive surface GST1, a heat dissipation material GST2 and a second adhesive surface GST3. For example, the heat dissipation sheet GST includes a plurality of heat dissipation sheets, and each heat dissipation sheet GST includes a first adhesive surface GST1, a heat dissipation material GST2, and a second adhesive surface GST3. The number of heat dissipation sheets GSTs is equal to the number of accommodation spaces SPC generated by the vertical walls WV.

The first adhesive surface GST1 and the second adhesive surface GST3 may be made of an adhesive material. The adhesive material may include, for example, a foam tape or a double-sided tape, but is not limited thereto. The first adhesive surface GST1 may attach the heat dissipation sheet GST to the bottom plate BPLT. The second adhesive surface GST3 may attach the heat dissipation sheet GST to the adhesive member ADH.

The heat dissipation material GST2 may be a material having heat dissipation properties. For example, the heat dissipation material GST2 may be a graphite material. The heat dissipation material is not limited thereto and may be other materials having heat dissipation properties.

For example, the heat dissipation material GST2 may be in the form of compressed dust. Dust in compressed form may be crushed. The first adhesive surface GST1 and second adhesive surface GST3 disposed on the upper and lower portions of the heat dissipation material GST2 may serve to seal the heat dissipation material GST2.

Referring to FIG. 13, the vertical wall VW may be formed along the axial direction AD. Accordingly, a plurality of accommodation spaces SPCs may be formed in a shape having a length in the axial direction AD. A heat dissipation sheet GST may be disposed in each of the plurality of accommodation spaces SPCs. The heat dissipation sheet GST has a length in the axial direction AD and may be plural. The heat dissipation sheet GST may include a first adhesive surface GST1, a heat dissipation material GST2, and a second adhesive surface GST2. As shown in FIG. 13, a plurality of heat dissipation sheets GST are dispose on the second part PT2 of bottom plate BPLT and separated by the vertical wall VW.

Referring to FIG. 14, the vertical wall VW may be formed along the axial direction AD and the side direction SD. Accordingly, a plurality of accommodation spaces SPCs may be formed in a matrix form. A heat dissipation sheet GST may be disposed in each of the plurality of accommodation spaces SPCs. A plurality of heat dissipation sheets GST may be formed in a matrix form. The heat dissipation sheet GST may include a first adhesive surface GST1, a heat dissipation material GST2, and a second adhesive surface GST3. As shown in FIG. 14, a plurality of heat dissipation sheets GST formed in a matrix form are dispose on the second part PT2 of bottom plate BPLT and separated by the vertical wall VW.

Figure 15:
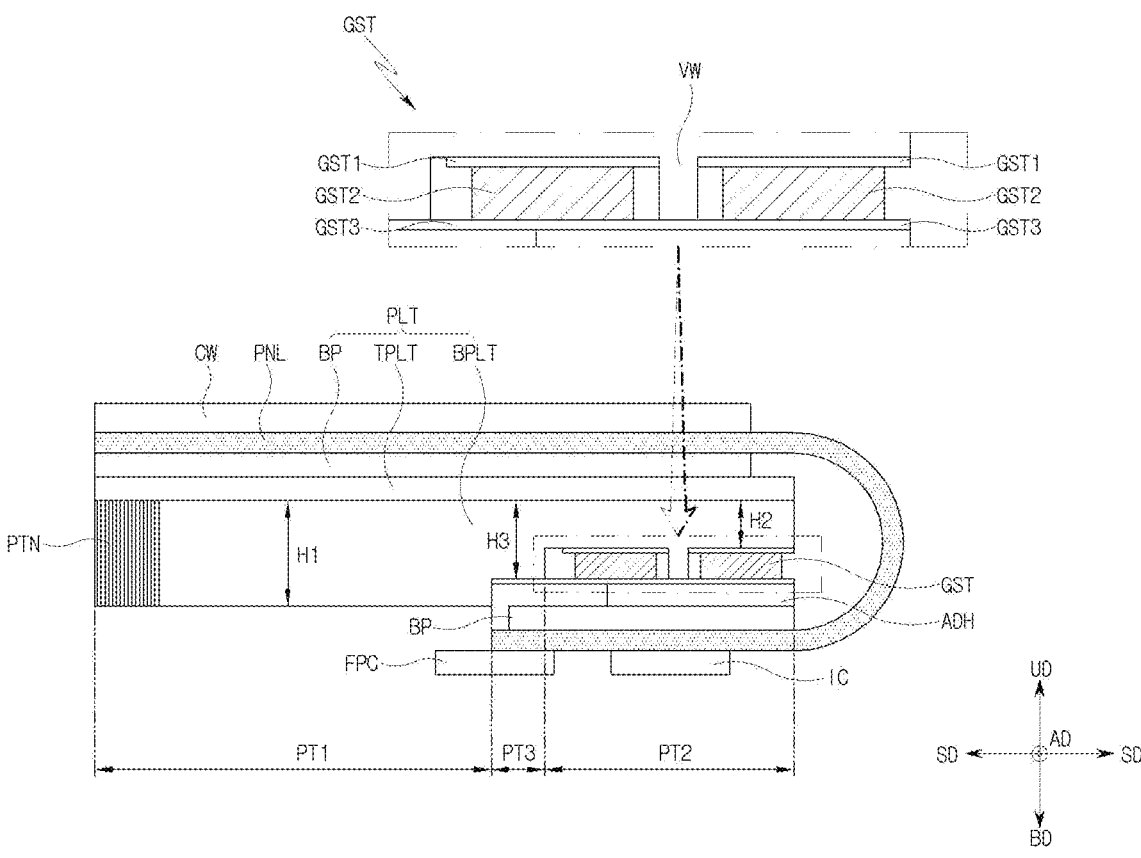
FIG. 15 is a cross-sectional view of a display apparatus 10 according to another embodiment of the present disclosure.

FIG. 15 is a cross-sectional view of a display apparatus 10 according to another embodiment of the present disclosure.

Figure 16:
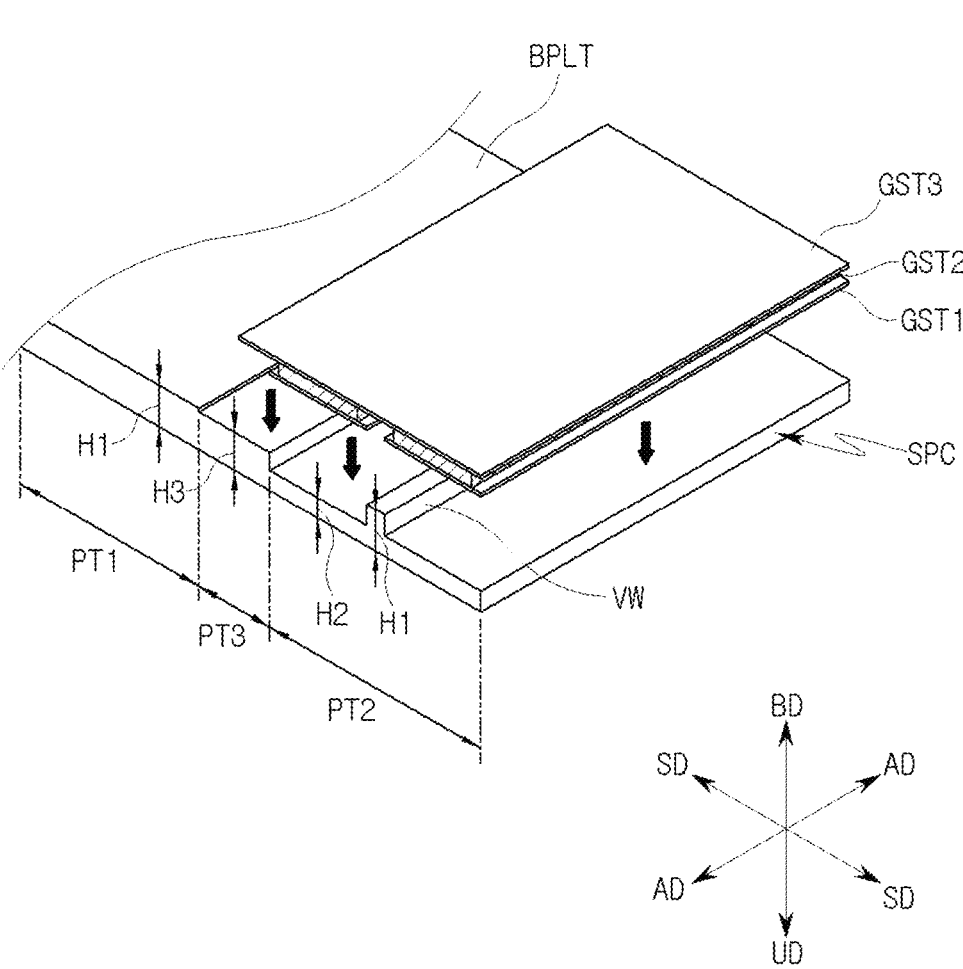
FIG. 16 is a perspective view of a display apparatus 10 according to another embodiment of the present disclosure.

FIG. 16 is a perspective view of a display apparatus 10 according to another embodiment of the present disclosure.

Figure 17:
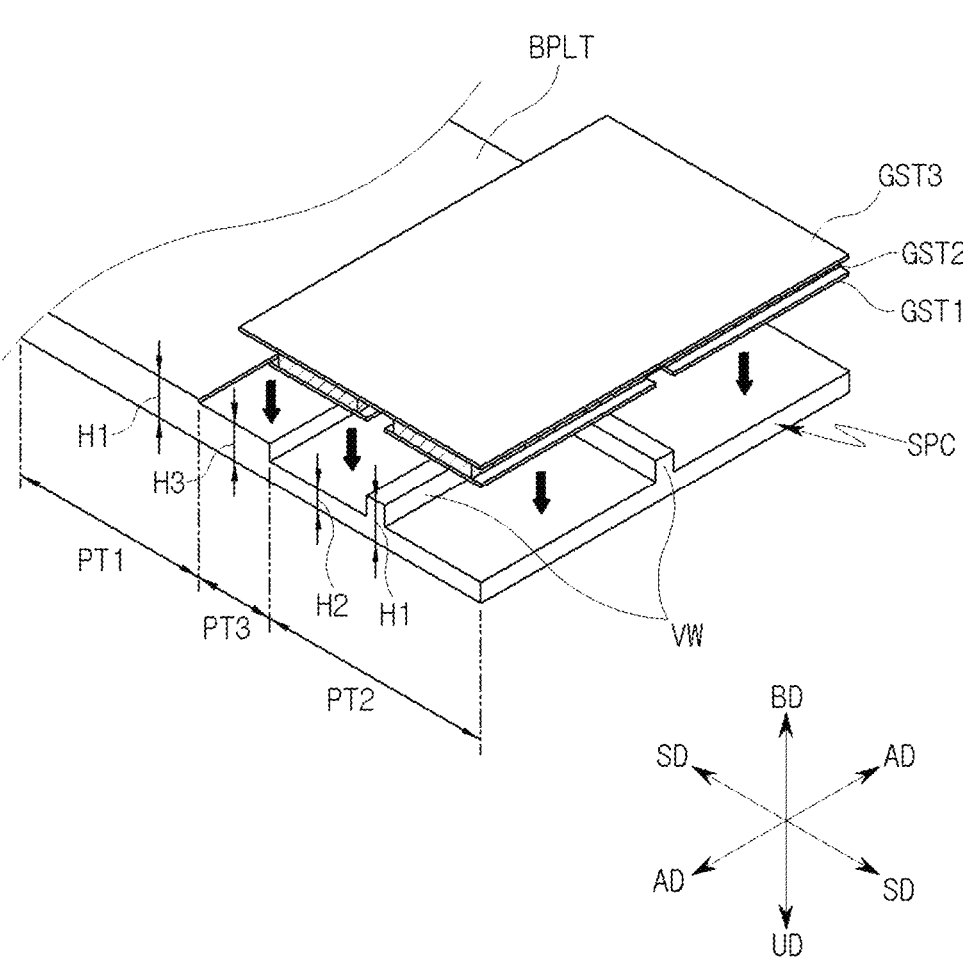
FIG. 17 is a perspective view of a display apparatus 10 according to another embodiment of the present disclosure.

FIG. 17 is a perspective view of a display apparatus 10 according to another embodiment of the present disclosure.

Another embodiment of the present disclosure will be described with reference to FIGS. 15 to 17. In describing the present embodiment, the same or similar figures and the same or similar reference numerals may refer to the same or similar configurations as those of the foregoing embodiment. For clarity of description, the embodiment may be illustrated or described with omission of some components. For clarity of description, the embodiment may be illustrated or described without addition of some components.

Referring to FIG. 15, a cover window CW, a panel PNL, and one or more plates PLTs are disposed from an upward direction UD to a downward direction BD. One or more plates PLTs may include a back plate BP, a top plate TPLT, and a bottom plate BPLT. The bottom plate BPLT may include a slit pattern PTN in a portion corresponding to the folding area FA (see FIG. 9).

The bottom plate BPLT includes a first part PT1 and a second part PT2. The first part PT1 is a portion having a first height H1, and the second part PT2 is a portion having a second height H2. The second part PT2 is a portion where an integrated circuit IC is disposed.

According to the present embodiment, the bottom plate BPLT includes a third part PT3. The third part PT3 is positioned between the first part PT1 and the second part PT2 and has a third height H3. The third height H3 is lower than the first height H1 and higher than the second height H2.

A vertical wall VW is disposed on the second part PT2. The vertical wall VW may have a first height H1. Accordingly, the accommodation space SPC (see FIGS. 16 and 17) formed in the second part PT2 may be divided by the vertical wall VW.

According to the embodiment with reference to FIG. 12 or the like, the heat dissipation sheet GST has a divided shape into a plurality of pieces. Accordingly, the heat dissipation function between one of the divided heat dissipation sheets GST and the other adjacent heat dissipation sheet GST may be reduced. This embodiment proposes a heat dissipation sheet GST connected as one in order to minimize the deterioration of the functionality of the heat dissipation sheet GST which will be described below.

A heat dissipation sheet GST is disposed on the second part PT2. Referring to an enlarged portion of the heat dissipation sheet GST, the heat dissipation sheet GST may include a first adhesive surface GST1, a heat dissipation material GST2, and a second adhesive surface GST3. For example, the second adhesive surface GST3 is one surface. The heat dissipation material GST2 may be formed of a plurality of heat dissipation materials contacting the second adhesive surface GST3. The first adhesive surface GST1 may be a plurality of adhesive surfaces contacting each of the plurality of heat dissipation materials GST2. The first adhesive surface GST1 and the second adhesive surface GST3 may be made of an adhesive material. The adhesive material may include, for example, a foam tape or a double-sided tape, but is not limited thereto. The first adhesive surface GST1 may attach the heat dissipation sheet GST to the bottom plate BPLT. The second adhesive surface GST3 may attach the heat dissipation sheet GST to the adhesive member ADH.

The second adhesive surface GST3 may also be adhered to the third part PT3.

The heat dissipation material GST2 may be a material having heat dissipation properties. For example, the heat dissipation material GST2 may be a graphite material. It is not limited thereto and may be other materials having heat dissipation properties.

For example, the heat dissipation material GST2 may be in the form of compressed dust. Dust in compressed form may be crushed. The first adhesive surface GST1 and second adhesive surface GST3 disposed on the upper and lower portions of the heat dissipation material GST2 may serve to seal the heat dissipation material GST2.

Referring to FIG. 16, the vertical wall VW may be formed along the axial direction AD. Accordingly, a plurality of accommodation spaces SPC may be formed in a shape having a length in the axial direction AD. A first adhesive surface GST1 and a heat dissipation material GST2 are disposed in the plurality of accommodation spaces SPCs. The second adhesive surface GST3 is disposed to cover the second part PT2 and the third part PT3.

According to this embodiment, the heat dissipation sheet GST is not divided into a plurality of portions, but is integrated into a whole one. Accordingly, deterioration in heat dissipation performance caused by spaces between the divided heat dissipation sheets GSTs may be prevented.

Referring to FIG. 17, a vertical wall VW may be formed along the axial direction AD and the side direction SD. Accordingly, a plurality of accommodation spaces SPCs may be formed in a matrix form. A first adhesive surface GST1 and heat dissipation material GST2 of the heat dissipation sheet GST may be disposed in each of the plurality of accommodation spaces SPCs. A second adhesive surface GST3 is formed to cover the plurality of heat dissipation materials GST2s. Also, the second adhesive surface GST3 is disposed to cover the second part PT2 and the third part PT3.

As described above, as shown in FIG. 16 and FIG. 17, the divided first adhesive surface GST1 and heat dissipation material GST2 of the heat dissipation sheet GST are dispose on the second part PT2 of bottom plate BPLT and separated by the vertical wall VW, and the second adhesive surface GST3 of the heat dissipation sheet GST is disposed to cover both the second part PT2 and the third part PT3 of bottom plate BPLT. Accordingly, deterioration in heat dissipation performance caused by spaces between the divided heat dissipation sheets GSTs may be prevented.

According to the present disclosure, a foldable display apparatus comprising a panel assembly PNLA including a panel PNL including a first display area, a second display area, and a folding area, and one or more plates PLTs disposed on a lower portion of the panel; an in-folding hinge assembly IHA that is disposed in the folding area under the panel assembly PNLA and includes a hinge cover HC; and first and second cover frames CF1 and CF2 that are coupled to the in-folding hinge assembly IHA wherein the in-folding hinge assembly IHA includes an up-down plate UDP having a length in an axial direction is disclosed.

The in-folding hinge assembly IHA may further include a lift washer HM-7 including a lift protrusion LB.

The lift protrusion LB may rotate between a downward direction position and a side direction position.

When the foldable display apparatus is folded, the lift protrusion LB is positioned in a downward direction, and the lift protrusion LB may not contact the up-down plate UDP.

When the foldable display apparatus is unfolded, the lift protrusion LB is positioned in a side direction, and the lift protrusion LB may support the up-down plate UPD.

The in-folding hinge assembly IHA may further include a shaft HM-12, and the shaft HM-12 may be disposed to pass through an opening OP5 formed in the lift washer HM-7.

The opening OP5 may have a polygonal shape, and an outer circumferential surface of the shaft HM-12 may have the polygonal shape.

The in-folding hinge assembly IHA may further include a shaft bottom HM-6 disposed in a downward direction of the up-down plate UDP and an upward direction of the hinge cover HC.

The up-down plate UDP may include a fastening hole CH3 protruding in a downward direction, and the shaft bottom HM-6 may include a fastening hole CH4 that protrudes in a upward direction and is coupled with the fastening hole CH3. The fastening hole CH3 may be disposed to pass through the fastening hole CH4.

The foldable display apparatus may further comprise a fixing screw SCR that is fixed to the fastening hole CH3 and is disposed inside the fastening hole CH4; and a spring Spr1 that includes one end fixed to the shaft bottom HM-6 and the other end fixed to the fixing screw SCR, and is disposed inside the fastening hole CH4.

When the foldable display apparatus is folded, the spring Spr1 may be relaxed, and the spring Spr1 may lower the up-down plate UDP.

The shaft bottom HM-6 may include a fastening hole CH1, the hinge cover HC may include a fastening hole CH2, and the fastening hole CH1 and the fastening hole CH2 may be coupled to each other.

The in-folding hinge assembly IHA may include a first in-folding hinge module IHM1 and second in-folding hinge module IHAM disposed adjacently along the axial direction, and the up-down plate may be coupled to each of the first in-folding hinge module IHM1 and the second in-folding hinge module IHM2.

The in-folding hinge assembly IHA may further include a pair of roller assemblies RA1 and RA2 including rollers and a roller stopper RS.

The roller assembly RA1 may be coupled to the first cover frame CF1 through a fastening hole CH7, and the roller assembly RA2 may be coupled to the second cover frame CF2 through a fastening hole CH8.

The roller stopper RS may include a fastening hole CH5, the hinge cover HC may include a fastening hole CH6, and the fastening hole CH5 and the fastening hole CH6 may be coupled to each other.

The roller assemblies RA1 and RA2 may include an outer housing ROH; an inner housing RIH inserted into the outer housing ROH; a spring holder RSH integrally formed with the inner housing RIH; and a spring Spr2 inserted into the spring holder RSH.

A length of the inner housing RIH in a side direction may be shorter than a length of the outer housing ROH in a side direction.

One side of the spring Spr2 may contact the outer housing ROH, and the other side of the spring Spr2 may contact the inner housing RIH.

The spring Spr2 may have a length in a side direction.

When the foldable display apparatus is unfolded, the roller may be disposed in a side direction of the roller stopper RS.

The spring Spr2 is contracted, and the spring Spr2 may generate a force to close the roller to the roller stopper RS.

When the foldable display apparatus is folded, the roller may be disposed in the upward direction of the roller stopper RS.

The spring Spr2 may be relaxed.

A distance D1 between the roller and the roller stopper RS when the foldable display apparatus is unfolded may be shorter than a distance D2 between the roller and the roller stopper when the foldable display apparatus is folded.

The roller stopper RS may include a concave portion RS-1 on a surface of an upward direction, and the up-down plate UDP may be disposed within the concave portion RS-1.

The height of the concave portion RS-1 may be higher than that of the up-down plate UDP.

When the foldable display apparatus is unfolded, the up-down plate UDP may be positioned relatively high in the concave portion RS-1, and when the foldable display apparatus is folded, the up-down plate UDP may be positioned relatively low in the concave portion RS-1.

The roller stopper RS may include an inclined portion RS-3 on a surface of a side direction.

The in-folding hinge assembly (IHA) may include a first in-folding hinge module IHM1 and second in-folding hinge module IHM2 disposed adjacently along the axial direction, and the roller stopper RS may be disposed between the first in-folding hinge module IHM1 and the second in-folding hinge module IHM2.

According to the present disclosure, a foldable display apparatus comprising a panel assembly including a panel including a first display area, a second display area, and a folding area, and one or more plates disposed on a lower portion of the panel; an in-folding hinge assembly that is disposed in the folding area under the panel assembly and includes a hinge cover, wherein the one or more plates include a bottom plate, the bottom plate includes a first part having a first height and a second part having a second height lower than the first height, is disclosed.

First and second cover frames may be coupled to the in-folding hinge assembly.

The bottom plate may be formed of a Sus material.

The bottom plate may include a slit pattern corresponding to the folding area.

An integrated circuit may be disposed on a lower portion of the second part.

The foldable display apparatus may further comprise a heat dissipation sheet disposed in an accommodation space formed in the second part.

The heat dissipation sheet may include a graphite material.

The heat dissipation sheet may include a first adhesive surface, a heat dissipation material, and a second adhesive surface.

The bottom plate may further include a vertical wall formed in the second part.

The vertical wall may be formed along a axial direction.

The vertical wall may be formed along an axial direction and a side direction.

The bottom plate may further include a third part that is formed between the first part and the second part and has a third height lower than the first height and higher than the second height.

The foldable display apparatus may further comprise a heat dissipation sheet.

The heat dissipation sheet may include a plurality of first adhesive surfaces, a plurality of heat dissipation materials, and a second adhesive surface attached to the plurality of heat dissipation materials.

The plurality of first adhesive surfaces and the plurality of heat dissipation materials are disposed in an accommodation space formed in the second part, and the second adhesive surface is disposed over the second part and the third part.

The second adhesive surface may be formed in plurality, and each of the second adhesive surfaces may be attached to each of the plurality of heat dissipation materials.

The second adhesive surface may be integrally formed, and the plurality of heat dissipation materials may be attached to the integral second adhesive surface.

The in-folding hinge assembly may further include an up-down plate having a length in an axial direction.

The in-folding hinge assembly may further include a lift washer having a lift protrusion.

The lift protrusion may rotate between a downward direction position and a side direction position.

When the foldable display device is folded, the lift protrusion is positioned in a downward direction, and the lift protrusion may not contact the up-down plate.

When the foldable display device is unfolded, the lift protrusion is positioned in a side direction, and the lift protrusion may support the up-down plate.

It will be apparent to those skilled in the art that various modifications and variations can be made in the foldable display apparatus of the present disclosure without departing from the technical idea or scope of the disclosure. Thus, it is intended that the present disclosure cover the modifications and variations of this disclosure provided they come within the scope of the appended claims and their equivalents.

DESCRIPTION OF REFERENCE NUMERALS

10: display apparatus
PNL: panel
PLT: one or more plates
TF: top frame
BPLT: bottom plate
PT1: first part
PT2: second part
GST: heat dissipation sheet

What is claimed is:
1. A foldable display apparatus, comprising:
  a panel assembly including a panel including a first display area, a second display area, and a folding area, and one or more plates disposed on a lower portion of the panel;

an in-folding hinge assembly that is disposed in the folding area under the panel assembly and includes a hinge cover; and first and second cover frames that are coupled to the in-folding hinge assembly, wherein the one or more plates include a bottom plate, the bottom plate includes a first part having a first height and a second part having a second height lower than the first height;

a heat dissipation sheet disposed in an accommodation space formed in the second part;

wherein an integrated circuit is disposed on a lower portion of the second part, overlapping the heat dissipation sheet in a plane view.

2. The foldable display apparatus of claim 1, wherein the bottom plate is formed of a Sus material.

3. The foldable display apparatus of claim 1, wherein the bottom plate includes a slit pattern corresponding to the folding area.

4. The foldable display apparatus of claim 1, wherein the heat dissipation sheet includes a graphite material.

5. The foldable display apparatus of claim 1, wherein the heat dissipation sheet includes a first adhesive surface, a heat dissipation material, and a second adhesive surface.

6. The foldable display apparatus of claim 1, wherein the bottom plate further includes a vertical wall formed in the second part.

7. The foldable display apparatus of claim 6, wherein the vertical wall is formed along a axial direction.

8. The foldable display apparatus of claim 6, wherein the vertical wall is formed along an axial direction and a side direction.

9. The foldable display apparatus of claim 1, wherein the bottom plate further includes a third part that is formed between the first part and the second part and has a third height lower than the first height and higher than the second height.

10. The foldable display apparatus of claim 9, wherein the heat dissipation sheet is further disposed in the third part.

11. The foldable display apparatus of claim 10, wherein the heat dissipation sheet includes a plurality of first adhesive surfaces, a plurality of heat dissipation materials, and a second adhesive surface attached to the plurality of heat dissipation materials.

12. The foldable display apparatus of claim 11, wherein the second adhesive surface is formed in plurality, and each of the second adhesive surfaces is attached to each of the plurality of heat dissipation materials.

13. The foldable display apparatus of claim 11, wherein the second adhesive surface is integrally formed, and the plurality of heat dissipation materials is attached to the integral second adhesive surface.

14. The foldable display apparatus of claim 13, wherein when the foldable display device is unfolded, the lift protrusion is positioned in a side direction, and the lift protrusion supports the up-down plate.

15. The foldable display apparatus of claim 1, wherein the in-folding hinge assembly further includes an up-down plate having a length in an axial direction.

16. The foldable display apparatus of claim 15, wherein the in-folding hinge assembly further includes a lift washer having a lift protrusion.

17. The foldable display apparatus of claim 16, wherein the lift protrusion rotates between a downward direction position and a side direction position.

18. The foldable display apparatus of claim 16, wherein when the foldable display device is folded, the lift protrusion is positioned in a downward direction, and the lift protrusion does not contact the up-down plate.

* * * * *